United States Patent
Ikegawa et al.

(10) Patent No.: US 9,777,387 B2
(45) Date of Patent: Oct. 3, 2017

(54) METHOD OF MANUFACTURING A THIN-FILM MAGNETIC HEAD INCLUDING A COIL AND A MAGNETIC PATH FORMING SECTION

(71) Applicants: Yukinori Ikegawa, Milpitas, CA (US); Yoshitaka Sasaki, Santa Clara, CA (US); Hiroyuki Ito, Milpitas, CA (US); Hironori Araki, Milpitas, CA (US); Seiichiro Tomita, Milpitas, CA (US); Hideo Mamiya, Milpitas, CA (US)

(72) Inventors: Yukinori Ikegawa, Milpitas, CA (US); Yoshitaka Sasaki, Santa Clara, CA (US); Hiroyuki Ito, Milpitas, CA (US); Hironori Araki, Milpitas, CA (US); Seiichiro Tomita, Milpitas, CA (US); Hideo Mamiya, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 244 days.

(21) Appl. No.: 14/523,415

(22) Filed: Oct. 24, 2014

(65) Prior Publication Data
US 2016/0115612 A1 Apr. 28, 2016

(51) Int. Cl.
*C25D 7/00* (2006.01)
*G11B 5/31* (2006.01)
*C25D 5/02* (2006.01)

(52) U.S. Cl.
CPC ............. *C25D 7/001* (2013.01); *C25D 5/022* (2013.01); *G11B 5/3123* (2013.01)

(58) Field of Classification Search
CPC ........ C25D 5/02; C25D 5/001; G11B 5/3123; G11B 5/3163
See application file for complete search history.

(56) References Cited

U.S. PATENT DOCUMENTS

| | | | | |
|---|---|---|---|---|
| 8,441,755 B2* | 5/2013 | Sasaki | ...................... | G11B 5/17 360/123.03 |
| 2003/0107842 A1* | 6/2003 | Sasaki | .................. | G11B 5/3163 360/235.8 |
| 2003/0174435 A1* | 9/2003 | Dinan | .................... | G11B 5/313 360/97.11 |
| 2008/0149490 A1* | 6/2008 | Bonhote | .................. | C25D 5/02 205/183 |

* cited by examiner

*Primary Examiner* — Louis Rufo
(74) *Attorney, Agent, or Firm* — Oliff PLC

(57) ABSTRACT

A thin-film magnetic head includes a coil, a magnetic path forming section, and an insulating film. The magnetic path forming section includes first and second magnetic material portions. The coil includes first and second coil elements located between the first and second magnetic material portions. The insulating film includes an underlying portion located under the first and second coil elements. In a method of manufacturing the thin-film magnetic head, the insulating film is formed to cover the first and second magnetic material portions, and then a seed layer is formed selectively on the underlying portion of the insulating film. The coil is formed by plating using the seed layer.

7 Claims, 36 Drawing Sheets

METHOD OF MANUFACTURING A THIN-FILM MAGNETIC HEAD INCLUDING A COIL AND A MAGNETIC PATH FORMING SECTION

BACKGROUND OF THE INVENTION

1. Field of the Invention

The present invention relates to a method of manufacturing a thin-film magnetic head including a coil and a magnetic path forming section, the magnetic path forming section being provided for forming a magnetic path for passing a magnetic flux corresponding to a magnetic field produced by the coil.

The recording systems of magnetic read/write apparatuses include a longitudinal magnetic recording system in which signals are magnetized in a direction along the plane of the recording medium (the longitudinal direction) and a perpendicular magnetic recording system in which signals are magnetized in a direction perpendicular to the plane of the recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil produces a magnetic field corresponding to data to be written on a recording medium. The magnetic path forming section is formed of a magnetic material, and forms a magnetic path for passing a magnetic flux corresponding to the magnetic field produced by the coil. The magnetic path forming section includes a main pole having an end face located in a medium facing surface configured to face the recording medium. The main pole produces, from the aforementioned end face, a write magnetic field for writing the data on the recording medium.

With increases in frequency of write signals to achieve higher recording densities, it is required of the write head unit to provide an improved rate of change in the write magnetic field. To meet such a requirement, it is effective to reduce the length of the magnetic path formed by the magnetic path forming section.

One of approaches to reducing the length of the aforementioned magnetic path is to form the coil in a self-aligned manner, as disclosed in U.S. Pat. No. 8,441,755 B2, for example. The coil formation method disclosed therein is applicable to a write head unit whose structure is such that the magnetic path forming section includes a first magnetic material portion located away from the medium facing surface, a second magnetic material portion spaced from the first magnetic material portion and located between the first magnetic material portion and the medium facing surface, and a coupling portion for coupling the first magnetic material portion and the second magnetic material portion to each other, and the coil includes one or more coil elements located between the first magnetic material portion and the second magnetic material portion. A coil element refers to a portion of the winding of the coil. The first magnetic material portion has a first sidewall facing toward the one or more coil elements. The second magnetic material portion has a second sidewall facing toward the one or more coil elements. The one or more coil elements have a first side surface opposed to the first sidewall, and a second side surface opposed to the second sidewall.

Now, the conventional method for forming a coil in a self-aligned manner will be described in detail. In the conventional method, first, a thin insulating film is formed to cover the first and second magnetic material portions. Then, a seed layer is formed from a conductive material on the insulating film. On the seed layer, formed is a mask having an opening that exposes a portion of the seed layer on which the coil is to be disposed. Part of the edge of the opening is located above the first and second magnetic material portions. The mask is formed by patterning a photoresist layer by photolithography. Using the seed layer as a seed and a cathode, a conductive layer for forming the coil is then formed in the opening of the mask by plating. The conductive layer is formed to include portions that ride over the first and second magnetic material portions. The mask is then removed. Next, unwanted portions of the seed layer, which are portions of the seed layer other than the portion lying under the conductive layer, are removed by wet etching, for example. Next, an insulating layer is formed to cover the conductive layer. The insulating layer, the conductive layer, the first magnetic material portion and the second magnetic material portion are then polished to make their top surfaces even with each other.

According to the conventional method for forming a coil in a self-aligned manner, the coil is formed such that the first side surface and the second side surface of the one or more coil elements are opposed to the first sidewall and the second sidewall, respectively, with the insulating film interposed between the first side surface and the first sidewall, and between the second side surface and the second sidewall. This makes it possible to reduce the length of the magnetic path formed by the magnetic path forming section.

However, the conventional method for forming a coil in a self-aligned manner has the following first to third problems associated with the seed layer.

The first problem will be described first. According to the conventional method, the seed layer is formed to cover the first and second magnetic material portions, and then the mask is formed on the seed layer by photolithography. In the mask forming process, an unpatterned photoresist layer is exposed to light in a predetermined pattern. In the course of the exposure, unwanted reflected light results from the light for exposure being reflected off the portions of the seed layer covering the first and second magnetic material portions. The first problem is that the unwanted reflected light causes a reduction in precision of the mask pattern, which results in a smaller process margin for forming the mask.

Next, the second problem will be described. According to the conventional method, in the step of forming the conductive layer by plating, the conductive layer grows not only from the portion of the seed layer lying between the first and second magnetic material portions but also from the portions of the seed layer covering the first and second magnetic material portions. Consequently, the conductive layer becomes thick in its portions riding over the first and second magnetic material portions. The portion of the conductive layer lying between the first and second magnetic material portions will be polished later into the coil. On the other hand, the portions of the conductive layer riding over the first and second magnetic material portions are unwanted portions, and will thus be removed in the polishing process later.

Attempts to provide the coil with a sufficiently large thickness and attain a sufficiently large polishing margin would increase the thickness of the portions of the conductive layer riding over the first and second magnetic material portions. In such a case, the mask needs to have a large thickness so that the opening of the mask can accommodate the thick conductive layer. This results in a reduced process margin for forming the mask. Further, an increase in the thickness of the portions of the conductive layer riding over the first and second magnetic material portions would increase the amount of polishing that the conductive layer requires in order that such unwanted portions be removed. This results in a reduced process margin for the polishing. The second problem is the reductions in the process margin for forming the mask and the process margin for the polishing.

The third problem relates to the removal of the unwanted portions of the seed layer as described below. According to the conventional method, the unwanted portions of the seed layer include portions of the seed layer covering the first and second magnetic material portions, and thus extend over a large area. The conventional method removes the unwanted portions by, for example, wet etching, which gives rise to problems that the conductive layer is also etched to result in a smaller width of the coil winding, and voids are created inside the coil. The conventional method also has the problem that the unwanted portions of the seed layer may not be completely removed, and the remainder of the unwanted portions may cause a short circuit between a plurality of conductor portions that should be insulated from each other.

In the conventional method, if the removal of the unwanted portions of the seed layer is performed by dry etching such as ion beam etching instead of wet etching, a problem arises. The problem is that, in the step of removing the unwanted portions of the seed layer, flying substances generated by the etching may deposit onto the insulating film that covers the first and second magnetic material portions, thereby forming a redeposit film having conductivity, and the redeposit film may cause a short circuit between a plurality of conductor portions that should be insulated from each other.

OBJECT AND SUMMARY OF THE INVENTION

It is an object of the present invention to provide a method of manufacturing a thin-film magnetic head that makes it possible to form a coil in a self-aligned manner while preventing the problems associated with the seed layer.

A thin-film magnetic head to be manufactured by the manufacturing method of the present invention includes: a medium facing surface configured to face a recording medium; a coil for producing a magnetic field corresponding to data to be written on the recording medium; a magnetic path forming section formed of a magnetic material, for forming a magnetic path for passing a magnetic flux corresponding to the magnetic field produced by the coil; and an insulating film for insulating the coil from the magnetic path forming section. The magnetic path forming section has a first end face located in the medium facing surface, and produces, from the first end face, a write magnetic field for writing the data on the recording medium. The magnetic path forming section includes a first magnetic material portion located away from the medium facing surface, a second magnetic material portion spaced from the first magnetic material portion and located between the first magnetic material portion and the medium facing surface, and a coupling portion for coupling the first magnetic material portion and the second magnetic material portion to each other. The coil includes one or more coil elements located between the first magnetic material portion and the second magnetic material portion. The first magnetic material portion has a first sidewall facing toward the one or more coil elements. The second magnetic material portion has a second sidewall facing toward the one or more coil elements. The one or more coil elements have a first side surface opposed to the first sidewall, and a second side surface opposed to the second sidewall. The insulating film includes a first interposition portion interposed between the first sidewall and the first side surface, a second interposition portion interposed between the second sidewall and the second side surface, and an underlying portion contiguous with the first and second interposition portions. The one or more coil elements are located on the underlying portion.

The method of manufacturing the thin-film magnetic head of the present invention includes the steps of forming the magnetic path forming section; forming the insulating film; and forming the coil. The step of forming the magnetic path forming section includes the step of forming the first and second magnetic material portions. The step of forming the insulating film forms the insulating film after the step of forming the first and second magnetic material portions.

The step of forming the coil includes the steps of forming a first mask after the step of forming the insulating film, the first mask covering the first and second magnetic material portions and exposing at least part of the underlying portion of the insulating film; forming a seed layer of a conductive material selectively on the underlying portion by using the first mask; removing the first mask after the step of forming the seed layer; forming a second mask after the step of removing the first mask, the second mask having an opening intended to receive a conductive layer for forming the coil; forming the conductive layer by plating using the seed layer such that the conductive layer is received in the opening of the second mask; removing the second mask after the step of forming the conductive layer; and removing unwanted portions of the seed layer after the step of removing the second mask, the unwanted portions being portions of the seed layer other than a portion lying under the conductive layer.

In the method of manufacturing the thin-film magnetic head of the present invention, the coil may be wound around the first magnetic material portion.

In the method of manufacturing the thin-film magnetic head of the present invention, the one or more coil elements may be a plurality of coil elements including a first coil element and a second coil element. In such a case, the first coil element has the first side surface, and the second coil element has the second side surface.

In the method of manufacturing the thin-film magnetic head of the present invention, the magnetic path forming section may include a main pole and a return path section, the main pole having the first end face, the return path section being connected to the main pole and having a second end face located in the medium facing surface. In such a case, the return path section may include the first magnetic material portion and the coupling portion, and may further include the second magnetic material portion.

In the method of manufacturing the thin-film magnetic head of the present invention, the step of forming the coil may further include, after the step of removing the unwanted portions of the seed layer, the step of forming an insulating layer for covering the conductive layer, and the step of polishing the insulating layer, the conductive layer, the first magnetic material portion and the second magnetic material portion to make their top surfaces even with each other.

In the method of manufacturing the thin-film magnetic head of the present invention, the step of removing the unwanted portions of the seed layer may remove the unwanted portions by ion beam etching.

In the method of manufacturing the thin-film magnetic head of the present invention, the seed layer may be formed such that a gap is created between the seed layer and each of the first and second interposition portions.

According to the method of manufacturing the thin-film magnetic head of the present invention, the seed layer is formed selectively on the underlying portion of the insulating film, among the first interposition portion, the second interposition portion and the underlying portion of the insulating film. Consequently, according to the present invention, it is possible to form the coil in a self-aligned manner while preventing the problems associated with the seed layer.

Other and further objects, features and advantages of the present invention will appear more fully from the following description.

DETAILED DESCRIPTION OF THE PREFERRED EMBODIMENTS

First Embodiment

Figure 1:
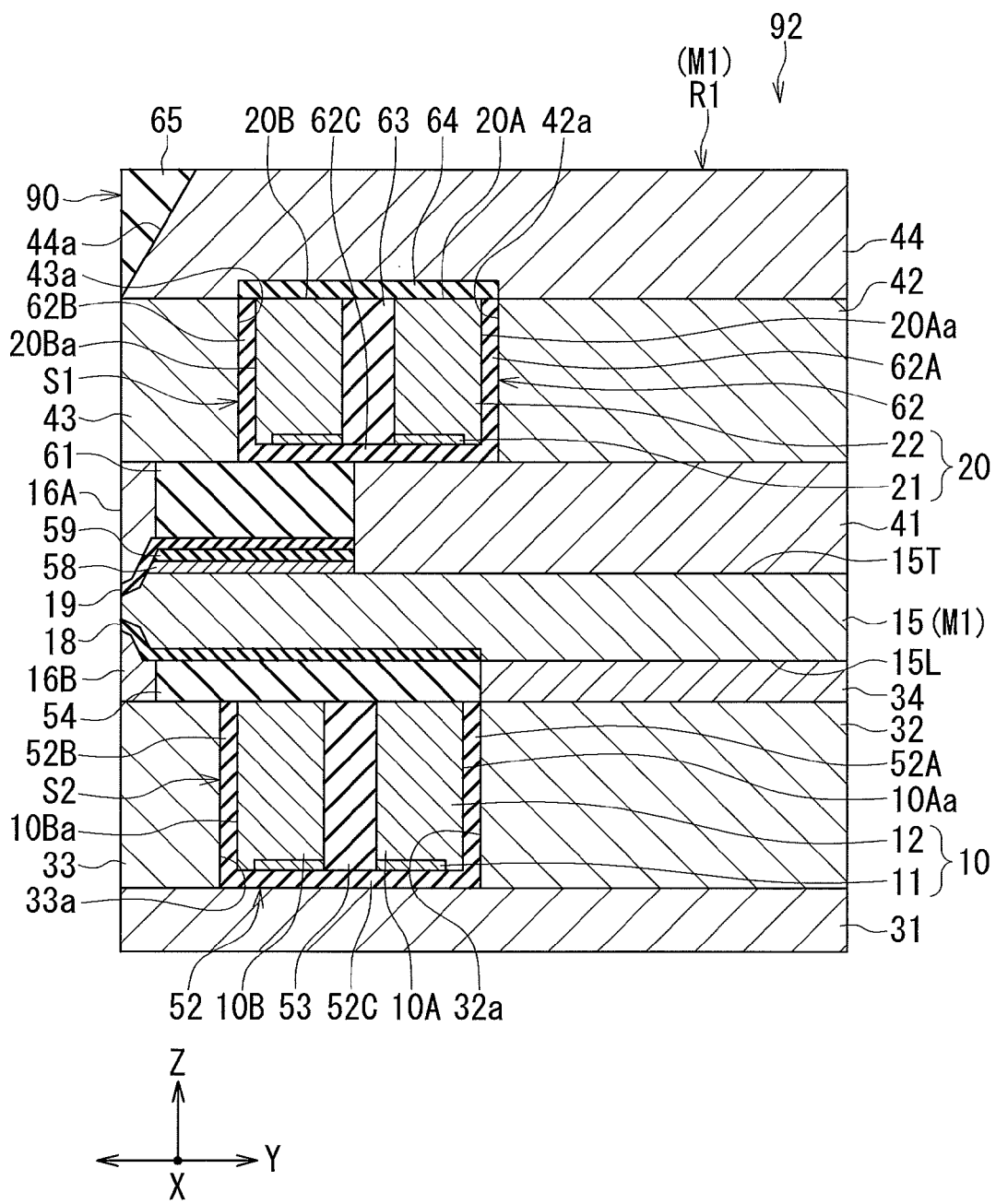
FIG. 1 is a cross-sectional view showing a write head unit of a magnetic head according to a first embodiment of the invention.
Figure 2:
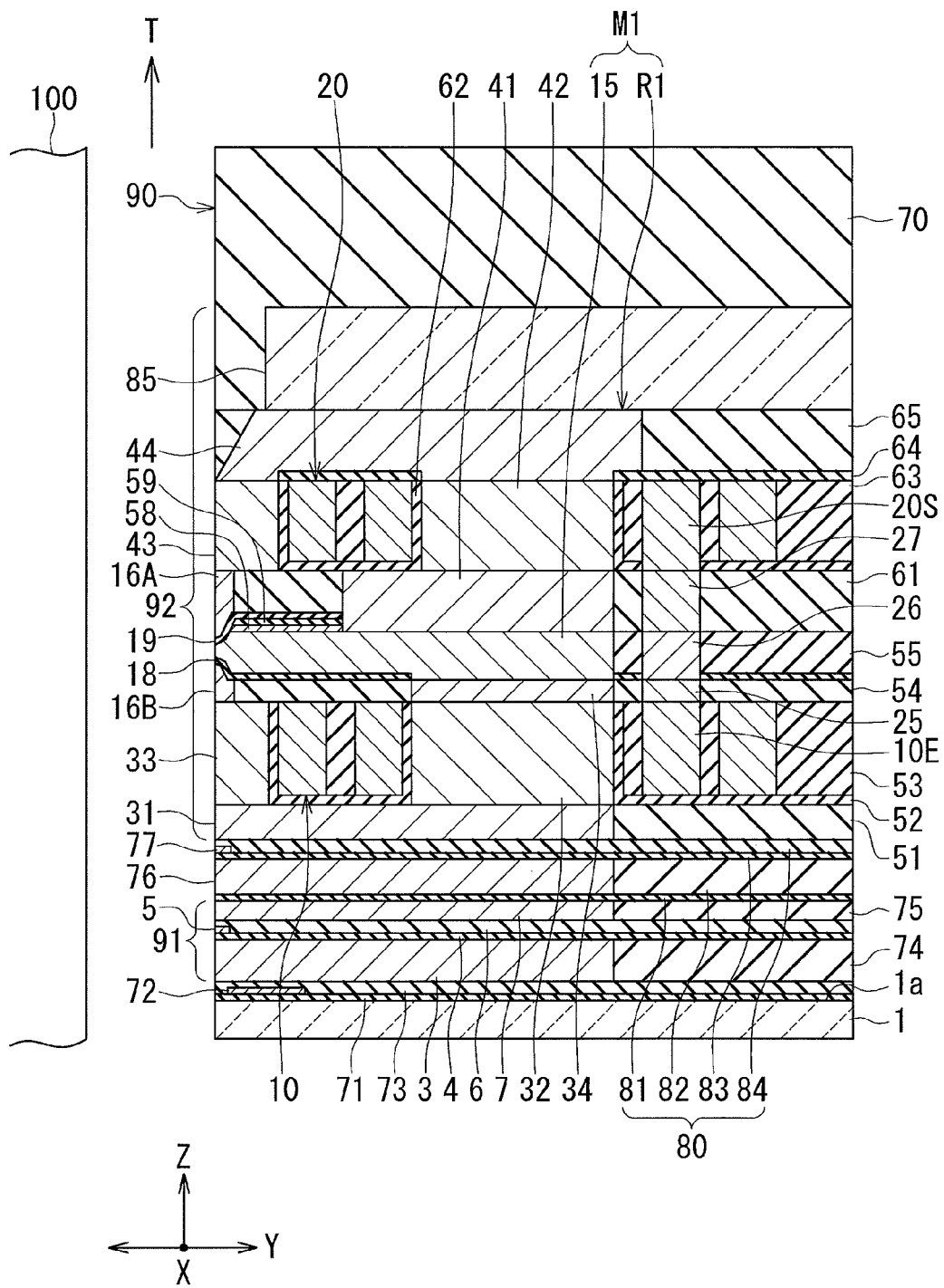
FIG. 2 is a cross-sectional view showing the configuration of the magnetic head according to the first embodiment of the invention.
Figure 3:
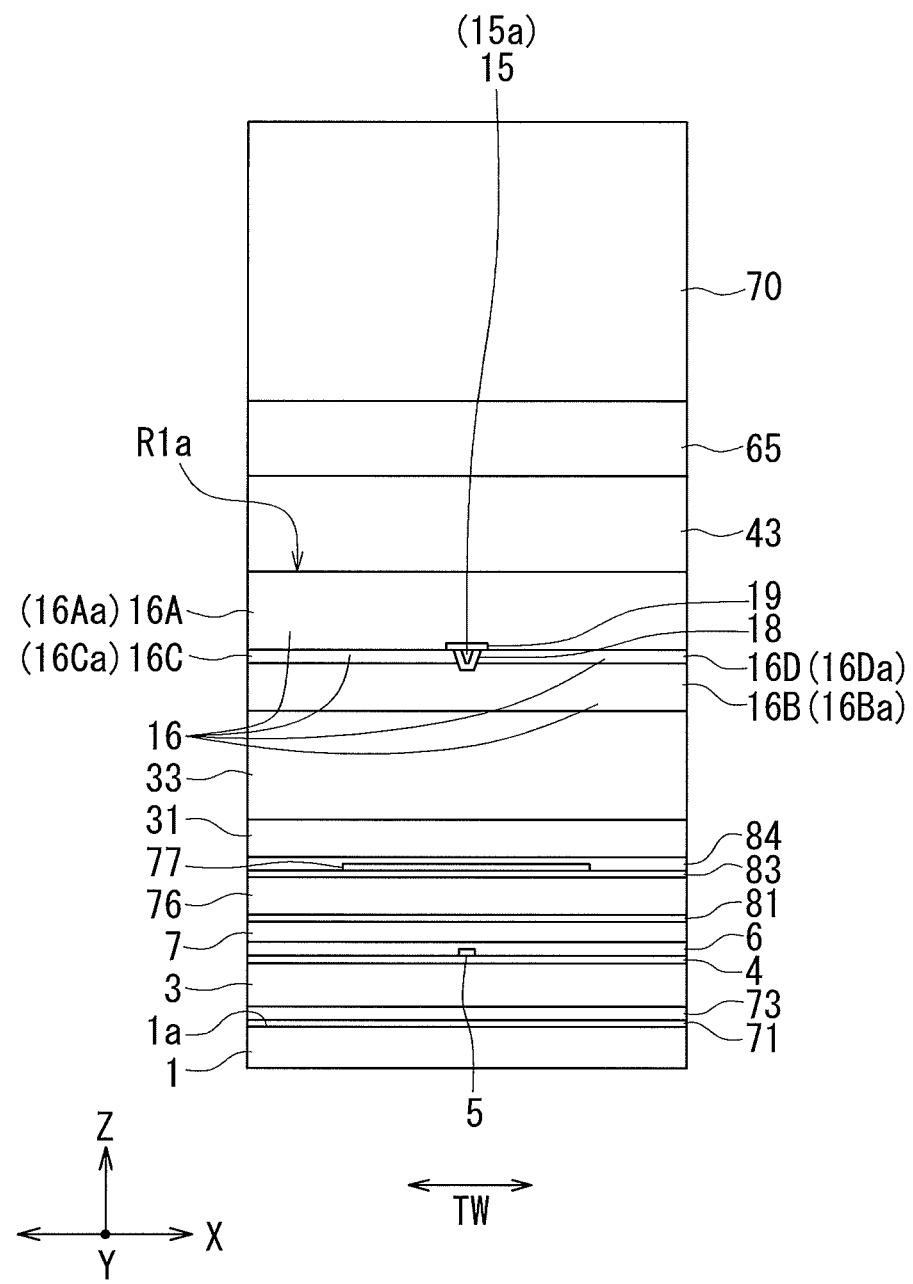
FIG. 3 is a front view showing the medium facing surface of the magnetic head according to the first embodiment of the invention.
Figure 4:
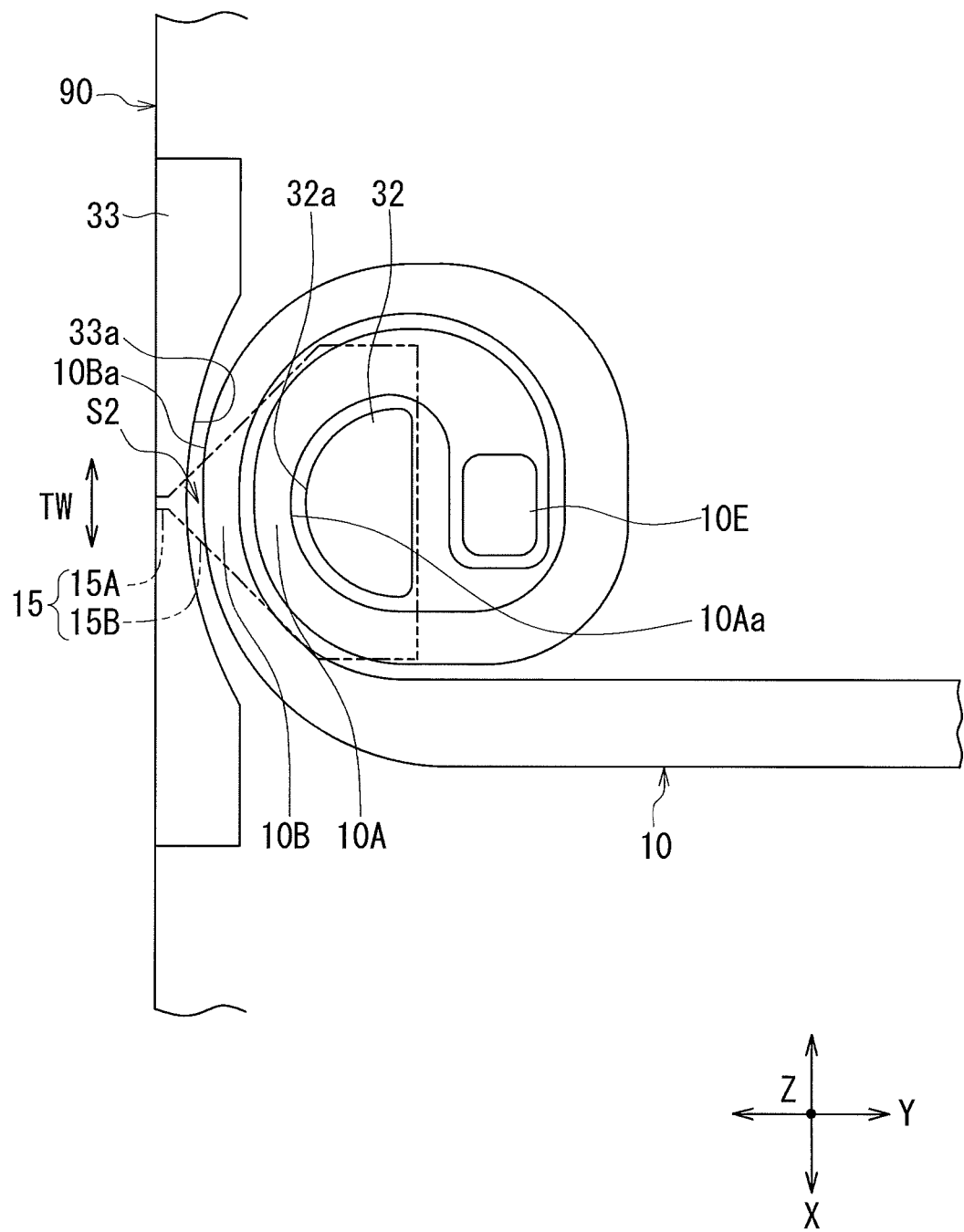
FIG. 4 is a plan view showing a second coil of the magnetic head according to the first embodiment of the invention.
Figure 5:
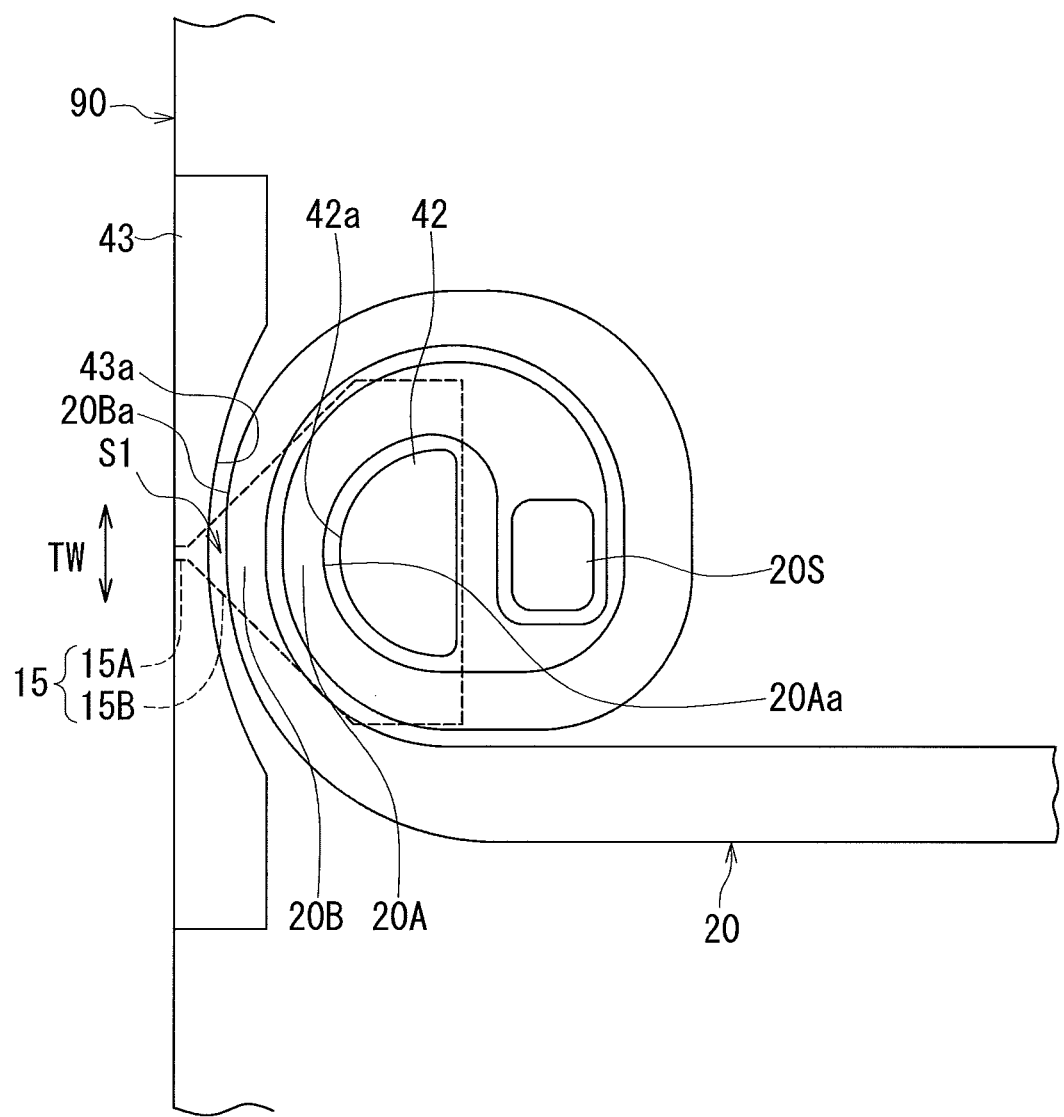
FIG. 5 is a plan view showing a first coil of the magnetic head according to the first embodiment of the invention.

Preferred embodiments of the present invention will now be described in detail with reference to the drawings. First, reference is made to FIG. 1 to FIG. 5 to describe the configuration of a thin-film magnetic head (hereinafter simply referred to as magnetic head) according to a first embodiment of the invention. The magnetic head according to the present embodiment is for use in perpendicular magnetic recording. FIG. 1 is a cross-sectional view showing a write head unit of the magnetic head according to the present embodiment. FIG. 2 is a cross-sectional view showing the configuration of the magnetic head according to the present embodiment. FIG. 1 and FIG. 2 each show a cross section perpendicular to the medium facing surface and to the top surface of the substrate. The arrow labeled T on FIG. 2 indicates the direction of travel of a recording medium. FIG. 3 is a front view showing the medium facing surface of the magnetic head according to the present embodiment. FIG. 4 is a plan view showing a second coil of the magnetic head according to the present embodiment. FIG. 5 is a plan view showing a first coil of the magnetic head according to the present embodiment. The arrow labeled TW on each of FIG. 3 to FIG. 5 indicates the track width direction.

The magnetic head according to the present embodiment is in the form of a slider configured to fly over the surface of a rotating recording medium 100 (see FIG. 2). When the recording medium 100 rotates, an airflow passing between the recording medium 100 and the slider causes a lift to be exerted on the slider. The lift causes the slider to fly over the surface of the recording medium 100.

As shown in FIG. 2, the magnetic head has a medium facing surface 90 configured to face the recording medium 100. Here, X direction, Y direction, and Z direction will be defined as follows. The X direction is parallel to the track width direction TW. The Y direction is perpendicular to the medium facing surface 90. The Z direction is the direction of travel of the recording medium 100 as viewed from the slider. The X, Y, and Z directions are orthogonal to one another.

As shown in FIG. 2 and FIG. 3, the magnetic head includes: a substrate 1 formed of a ceramic material such as aluminum oxide-titanium carbide ($Al_2O_3$—TiC) and having a top surface 1a; an insulating layer 71 formed of an insulating material and lying on the top surface 1a of the substrate 1; a heater 72 lying on the insulating layer 71; and an insulating layer 73 formed of an insulating material and disposed to cover the insulating layer 71 and the heater 72. The insulating layers 71 and 73 are formed of alumina ($Al_2O_3$), for example. The heater 72 generates heat for causing the medium facing surface 90 to protrude in part.

The magnetic head further includes a read head unit 91 located on the trailing end side, i.e., the front side in the direction T of travel of the recording medium 100, relative to the heater 72. The read head unit 91 includes: a first read shield layer 3 formed of a magnetic material and lying on the insulating layer 73; an insulating layer 74 formed of an insulating material, lying on the insulating layer 73 and surrounding the first read shield layer 3; a first read shield gap film 4 which is an insulating film lying on the first read shield layer 3 and the insulating layer 74; a magnetoresistive (MR) element 5 serving as a read element lying on the first read shield gap film 4; and two leads (not illustrated) connected to the MR element 5.

An end of the MR element 5 is located in the medium facing surface 90. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The read head unit 91 further includes: a second read shield gap film 6 which is an insulating film lying on the MR element 5 and the leads; a second read shield layer 7 formed of a magnetic material and lying on the second read shield gap film 6; and an insulating layer 75 formed of an insulating material, lying on the second read shield gap film 6 and surrounding the second read shield layer 7.

The magnetic head further includes: a write head unit 92 located on the front side in the direction T of travel of the recording medium 100 relative to the read head unit 91; and an expansion layer 76, a sensor 77 and a nonmagnetic portion 80 located between the read head unit 91 and the write head unit 92. The nonmagnetic portion 80 is formed of a nonmagnetic material. The material of the nonmagnetic portion 80 may be alumina, for example.

The nonmagnetic portion 80 includes nonmagnetic layers 81, 82, 83, and 84. The nonmagnetic layer 81 lies on the second read shield layer 7 and the insulating layer 75. The expansion layer 76 lies on the nonmagnetic layer 81. The nonmagnetic layer 82 lies on the nonmagnetic layer 81 and surrounds the expansion layer 76. The nonmagnetic layer 83 lies on the expansion layer 76 and the nonmagnetic layer 82. The sensor 77 lies on the nonmagnetic layer 83. The nonmagnetic layer 84 is disposed to cover the sensor 77.

The write head unit 92 includes a first coil 20, a second coil 10, and a magnetic path forming section M1. Both the first coil 20 and the second coil 10 are formed of a conductive material such as copper. In FIG. 2 and FIG. 4, the reference symbol 10E indicates a coil connection of the second coil 10 connected to the first coil 20. In FIG. 2 and FIG. 5, the reference symbol 20S indicates a coil connection of the first coil 20 connected to the coil connection 10E of the second coil 10.

The write head unit 92 further includes connection layers 25, 26 and 27 formed of a conductive material and stacked in this order on the coil connection 10E. The coil connection 20S lies on the connection layer 27.

The first coil 20 and the second coil 10 produce a magnetic field corresponding to data to be written on the recording medium 100. The magnetic path forming section M1 forms a magnetic path for passing a magnetic flux corresponding to the magnetic field produced by the first coil 20 and the second coil 10. In the present embodiment, the magnetic path forming section M1 includes a main pole 15 and a return path section R1. As shown in FIG. 3, the main pole 15 has a first end face 15a located in the medium facing surface 90. The return path section R1 has a second end face R1a located in the medium facing surface 90. As shown in FIG. 1 and FIG. 2, the return path section R1 is connected to the main pole 15. Since the main pole 15 and the return path section R1 are part of the magnetic path forming section M1, the magnetic path forming section M1 can be said to have the first end face 15a and the second end face R1a. The magnetic path forming section M1 produces, from the first end face 15a, a write magnetic field for writing data on the recording medium 100 by means of the perpendicular magnetic recording system. FIG. 1 and FIG. 2 show a cross section that intersects the first end face 15a and is perpendicular to the medium facing surface 90 and to the top surface 1a of the substrate 1. Such a cross section will hereinafter be referred to as the main cross section.

As shown in FIG. 3, the second end face R1a of the return path section R1 includes a first, a second, a third and a fourth end face portion 16Aa, 16Ba, 16Ca and 16Da. The first end face portion 16Aa is located on the front side in the direction T of travel of the recording medium 100 relative to the first end face 15a. The second end face portion 16Ba is located on the rear side in the direction T of travel of the recording medium 100 relative to the first end face 15a. The third and fourth end face portions 16Ca and 16Da are located on opposite sides of the first end face 15a in the track width direction TW. In the medium facing surface 90, the first to fourth end face portions 16Aa, 16Ba, 16Ca and 16Da are arranged to surround the first end face 15a.

The main pole 15 may be formed of, for example, NiFe, CoNiFe, or CoFe. The return path section R1 may be formed of, for example, CoFeN, CoNiFe, NiFe, or CoFe.

The return path section R1 includes a write shield 16 having the second end face R1a, and further includes core portions 32 and 42 and magnetic layers 31, 33, 34, 41, 43 and 44. The magnetic layer 31 lies on the nonmagnetic layer 84. The core portion 32 and the magnetic layer 33 are located on the magnetic layer 31 and coupled to each other by the magnetic layer 31. The core portion 32 is located away from the medium facing surface 90. The magnetic layer 33 is spaced from the core portion 32 and lies between the core portion 32 and the medium facing surface 90. Each of the magnetic layers 31 and 33 has an end face located in the medium facing surface 90.

The write head unit 92 further includes an insulating layer 51 formed of an insulating material, lying on the nonmagnetic layer 84 and surrounding the magnetic layer 31. The insulating layer 51 is formed of alumina, for example.

As shown in FIG. 1, FIG. 2 and FIG. 4, the second coil 10 is wound one or more times around the core portion 32, which is part of the return path section R1. The write head unit 92 further includes a second insulating film 52 formed of an insulating material, for insulating the second coil 10 from the magnetic layers 31 and 33 and the core portion 32, and an insulating layer 53 formed of an insulating material and disposed around the second coil 10 and the magnetic layer 33 and in the space between adjacent turns of the second coil 10. The top surfaces of the second coil 10, the core portion 32, the magnetic layer 33, the second insulating film 52 and the insulating layer 53 are even with each other. The second insulating film 52 and the insulating layer 53 are formed of alumina, for example.

As shown in FIG. 3, the write shield 16 includes a first shield 16A, a second shield 16B, and two side shields 16C and 16D. The first shield 16A is located on the front side in the direction T of travel of the recording medium. 100 relative to the main pole 15. The second shield 16B is located on the rear side in the direction T of travel of the recording medium 100 relative to the main pole 15. The two side shields 16C and 16D are located on opposite sides of the main pole 15 in the track width direction TW and magnetically couple the first shield 16A and the second shield 16B to each other.

As shown in FIG. 3, the first shield 16A has the first end face portion 16Aa. The second shield 16B has the second end face portion 16Ba. The side shield 16C has the third end face portion 16Ca. The side shield 16D has the fourth end face portion 16Da.

The second shield 16B lies on the magnetic layer 33. The magnetic layer 34 lies on the core portion 32. The connection layer 25 lies on the coil connection 10E of the second coil 10. The write head unit 92 further includes an insulating layer 54 formed of an insulating material. The insulating layer 54 lies on a portion of the top surface of the magnetic layer 33 and on the top surfaces of the second coil 10, the second insulating film 52 and the insulating layer 53, and surrounds the second shield 16B, the magnetic layer 34 and the connection layer 25. The insulating layer 54 is formed of alumina, for example.

The main pole 15 has: a top surface 15T (see FIG. 1), which is a surface lying at the front-side end of the main pole 15 in the direction T of travel of the recording medium 100; a bottom end 15L (see FIG. 1) opposite to the top surface 15T; and a first side portion and a second side portion (see FIG. 3) opposite to each other in the track width direction TW. The side shield 16C has a first sidewall opposed to the first side portion of the main pole 15. The side shield 16D has a second sidewall opposed to the second side portion of the main pole 15.

The side shields 16C and 16D are located on the second shield 16B and in contact with the top surface of the second shield 16B. The write head unit 92 further includes a second gap layer 18 formed of a nonmagnetic material and located between the main pole 15 and each of the second shield 16B and the side shields 16C and 16D. The second gap layer 18 is arranged to extend along the sidewalls of the side shields 16C and 16D and the top surfaces of the second shield 16B and the insulating layer 54. The material of the second gap layer 18 may be an insulating material such as alumina, or a conductive material. The second gap layer 18 has an opening for exposing the top surface of the magnetic layer 34 and an opening for exposing the top surface of the connection layer 25.

The main pole 15 lies on the second shield 16B and the insulating layer 54 such that the second gap layer 18 is interposed between the main pole 15 and the top surfaces of the second shield 16B and the insulating layer 54. As shown in FIG. 3, the second gap layer 18 is interposed also between the main pole 15 and each of the side shields 16C and 16D in the medium facing surface 90. A portion of the bottom end 15L of the main pole 15 located away from the medium facing surface 90 is in contact with the top surface of the magnetic layer 34. The shape of the main pole 15 will be described in detail later.

The connection layer 26 lies on the connection layer 25. The write head unit 92 further includes a nonmagnetic layer 55 formed of a nonmagnetic material and surrounding the main pole 15 and the connection layer 26. The nonmagnetic layer 55 is formed of alumina, for example.

The write head unit 92 further includes: a nonmagnetic metal layer 58 formed of a nonmagnetic metal material and lying on a first portion of the top surface 15T of the main pole 15, the first portion being located away from the medium facing surface 90; and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example, The write head unit 92 further includes a first gap layer 19 formed of a nonmagnetic material and located between the main pole 15 and the first shield 16A. The first gap layer 19 is disposed to cover the main pole 15, the nonmagnetic metal layer 58 and the insulating layer 59. The material of the first gap layer 19 may be an insulating material such as alumina, or a conductive material.

The first shield 16A lies on the side shields 16C and 16D and the first gap layer 19, and contacts the top surfaces of the side shields 16C and 16D and the first gap layer 19. In the medium facing surface 90, part of the first end face portion 16Aa of the first shield 16A is spaced from the first end face 15a of the main pole 15 by a predetermined distance created by the thickness of the first gap layer 19. The thickness of the first gap layer 19 is preferably in the range of 5 to 60 nm, and may be 30 to 60 nm, for example. The first end face 15a of the main pole 15 has a side adjacent to the first gap layer 19. This side of the first end face 15a defines the track width.

The magnetic layer 41 lies on a second portion of the top surface 15T of the main pole 15, the second portion being located away from the medium facing surface 90. The second portion of the top surface 15T is farther from the medium facing surface 90 than is the first portion of the top surface 15T. The connection layer 27 lies on the connection layer 26. The write head unit 92 further includes a nonmagnetic layer 61 disposed around the first shield 16A, the magnetic layer 41 and the connection layer 27. The nonmagnetic layer 61 is formed of an inorganic insulating material, for example. The inorganic insulating material may be alumina or silicon oxide, for example. The top surfaces of the first shield 16A, the magnetic layer 41, the connection layer 27 and the nonmagnetic layer 61 are even with each other.

The core portion 42 lies on the magnetic layer 41. The magnetic layer 43 lies on the first shield 16A and the nonmagnetic layer 61. The core portion 42 is located away from the medium facing surface 90. The magnetic layer 43 is spaced form the core portion 42 and located between the core portion 42 and the medium facing surface 90. The magnetic layer 43 has an end face located in the medium facing surface 90.

As shown in FIG. 1, FIG. 2 and FIG. 5, the first coil 20 is wound one or more times around the core portion 42, which is part of the return path section R1. The write head unit 92 further includes: a first insulating film 62 formed of an insulating material, for insulating the first coil 20 from the magnetic layers 41 and 43, the core portion 42 and the nonmagnetic layer 61; an insulating layer 63 formed of an insulating material and disposed around the first coil 20 and the magnetic layer 43 and in the space between adjacent turns of the first coil 20; and an insulating layer 64 formed of an insulating material and lying on the first coil 20 and the insulating layer 63. The coil connection 20S of the first coil 20 lies on the connection layer 27. The top surfaces of the first coil 20, the core portion 42, the magnetic layer 43, the first insulating film 62 and the insulating layer 63 are even with each other. The first insulating film 62 and the insulating layers 63 and 64 are formed of alumina, for example.

The magnetic layer 44 lies on the core portion 42, the magnetic layer 43 and the insulating layer 64, and couples the core portion 42 and the magnetic layer 43 to each other. As shown in FIG. 1, the magnetic layer 44 has an end face 44a facing toward the medium facing surface 90. The distance between the medium facing surface 90 and an arbitrary point on the end face 44a increases with increasing distance between the arbitrary point and the top surface 1a of the substrate 1. The write head unit 92 further includes a nonmagnetic layer 65 formed of a nonmagnetic material and disposed to cover the periphery of the magnetic layer 44. The top surfaces of the magnetic layer 44 and the nonmagnetic layer 65 are even with each other. The nonmagnetic layer 65 is formed of alumina, for example.

The write head unit 92 further includes a stopper layer 85 lying on the magnetic layer 44 and the nonmagnetic layer 65. The stopper layer 85 is formed of a nonmagnetic material that has a high thermal conductivity, a low coefficient of linear thermal expansion, and a high hardness. The material used for the stopper layer 85 preferably has a higher thermal conductivity, a lower coefficient of linear thermal expansion, and a higher Vickers hardness than alumina. An example of such a material is SiC. Without the stopper layer 85, the magnetic layers 43 and 44 would expand under the heat generated by the first coil 20, and thereby cause the medium facing surface 90 to protrude in part. The stopper layer 85 absorbs the heat generated by the first coil 20 and suppresses the expansion of the magnetic layers 43 and 44 toward the medium facing surface 90. As a result, the medium facing surface 90 is prevented from being protruded in part by the heat generated by the first coil 20.

The magnetic head further includes a protective layer 70 formed of a nonmagnetic material and provided to cover the write head unit 92. The protective layer 70 is formed of, for example, an inorganic insulating material such as alumina.

As has been described, the magnetic head according to the present embodiment includes the medium facing surface 90, the read head unit 91, and the write head unit 92. The read head unit 91 and the write head unit 92 are stacked on the substrate 1. The write head unit 92 is located on the trailing-end side, i.e., the front side in the direction T of travel of the recording medium 100, relative to the read head unit 91.

The write head unit 92 includes the first coil 20, the second coil 10, the magnetic path forming section M1, the first insulating film 62, and the second insulating film 52. The magnetic path forming section M1 includes the main pole 15 and the return path section R1. The return path section R1 includes the write shield 16, the core portions 32 and 42, and the magnetic layers 31, 33, 34, 41, 43 and 44.

The return path section R1 forms a first and a second magnetic path from the write shield 16 to the main pole 15. The first magnetic path is formed by the magnetic layers 41, 43 and 44 and the core portion 42. The first magnetic path connects the write shield 16 and part of the main pole 15 located away from the medium facing surface 90 to each other so that a first space S1 is formed, the first space S1 being located on the front side in the direction T of travel of the recording medium 100 relative to the main pole 15 and being defined by the main pole 15, the write shield 16 and the first magnetic path (the magnetic layers 41, 43 and 44 and the core portion 42). The first coil 20 passes through the first space S1.

The second magnetic path is formed by the magnetic layers 31, 33 and 34 and the core portion 32. The second magnetic path connects the write shield 16 and part of the main pole 15 located away from the medium facing surface 90 to each other so that a second space S2 is formed, the second space S2 being located on the leading-end side, i.e., the rear side in the direction T of travel of the recording medium 100 relative to the main pole 15 and being defined by the main pole 15, the write shield 16 and the second magnetic path (the magnetic layers 31, 33 and 34 and the core portion 32). The second coil 10 passes through the second space S2.

The first insulating film 62 insulates the first coil 20 from the magnetic layers 41 and 43 and the core portion 42, which are portions of the magnetic path forming section M1. The second insulating film 52 insulates the second coil 10 from the magnetic layers 31 and 33 and the core portion 32, which are portions of the magnetic path forming section M1.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 100. The write shield 16 also has the function of capturing a magnetic flux that is produced from the first end face 15a of the main pole 15 and spreads in directions other than the direction perpendicular to the plane of the recording medium 100, and thereby preventing the magnetic flux from reaching the recording medium 100. Further, the return path section R1 has the function of allowing a magnetic flux that has been produced from the first end face 15a of the main pole 15 and has magnetized the recording medium 100 to flow back.

The magnetic head further includes the heater 72, the expansion layer 76 and the sensor 77. The heater 72 and the expansion layer 76 are provided for causing part of the medium facing surface 90 to protrude so as to reduce the distance from the read head unit 91 and the write head unit 92 to the surface of the recording medium 100. When energized, the heater 72 generates heat for causing part of the medium facing surface 90 to protrude. The expansion layer 76 expands under the heat generated by the heater 72 and thereby makes part of the medium facing surface 90 protrude. The distance from the read head unit 91 and the write head unit 92 to the surface of the recording medium 100 is thereby reduced.

The nonmagnetic portion 80 is disposed around the expansion layer 76 and the sensor 77. The expansion layer 76 is formed of a material that has a higher thermal conductivity and a higher coefficient of linear thermal expansion than those of the nonmagnetic portion 80. A metal material can be used to form the expansion layer 76.

The sensor 77 is provided for detecting contact of part of the medium facing surface 90 with the recording medium 100. The sensor 77 is a resistor that varies in resistance with a change in its own temperature upon contact of part of the medium facing surface 90 with the recording medium 100. Measuring the resistance of the sensor 77 through two leads (not illustrated) connected to the sensor 77 allows for detecting that the medium facing surface 90 has partly contacted the recording medium 100. The sensor 77 is formed of a metal material or a semiconductor material that changes in resistance at a relatively high rate with respect to a change in temperature, i.e., that has a relatively high temperature coefficient of resistance.

Reference is now made to FIG. 1, FIG. 4 and FIG. 5 to describe the magnetic path forming section M1, the first coil 20 and the second coil 10 in detail. The magnetic path forming section M1 includes a first magnetic material portion, a second magnetic material portion and a coupling portion which are provided in two sets, a first set and a second set. In each set, the first magnetic material portion is located away from the medium facing surface 90, the second magnetic material portion is spaced from the first magnetic material portion and located between the first magnetic material portion and the medium facing surface 90, and the coupling portion couples the first and second magnetic material portions to each other.

The first magnetic material portion, the second magnetic material portion and the coupling portion in the first set are formed by the core portion 42, the magnetic layer 43 and the magnetic layer 44, respectively. Hereinafter, the core portion 42, the magnetic layer 43 and the magnetic layer 44 will also be referred to as the first magnetic material portion 42, the second magnetic material portion 43 and the coupling portion 44, respectively.

The first magnetic material portion, the second magnetic material portion and the coupling portion in the second set are formed by the core portion 32, the magnetic layer 33 and the magnetic layer 31, respectively. Hereinafter, the core portion 32, the magnetic layer 33 and the magnetic layer 31 will also be referred to as the first magnetic material portion 32, the second magnetic material portion 33 and the coupling portion 31, respectively.

In the present embodiment, since the core portions 32 and 42 and the magnetic layers 31, 33, 43 and 44 are portions of the return path section R1, the return path section R1 can be said to include the first and second magnetic material portions and the coupling portions in the first and second sets.

Reference is now made to FIG. 1 and FIG. 5 to describe the configuration of the first coil 20 and the positional relationship of the first coil 20 with the first magnetic material portion 42, the second magnetic material portion 43 and the coupling portion 44 in the first set. FIG. 5 is a plan view showing the first coil 20. The first coil 20 is wound one or more times around the first magnetic material portion 42, which is part of the return path section R1. The first coil 20 includes one or more coil elements located between the first magnetic material portion 42 and the second magnetic material portion 43. A coil element refers to a portion of the winding of the coil. In the present embodiment, in particular, the first coil 20 is wound approximately twice around the first magnetic material portion 42, and includes a first coil element 20A and a second coil element 20B as the one or more coil elements. The first and second coil elements 20A and 20B are adjacent to each other in a direction perpendicular to the medium facing surface 90 such that the second coil element 20B is located closer to the medium facing surface 90 than is the first coil element 20A. As shown in FIG. 1, the first and second coil elements 20A and 20B are located on the rear side in the direction T of travel of the recording medium 100 relative to the coupling portion 44.

As shown in FIG. 1 and FIG. 5, the first magnetic portion 42 has a first sidewall 42a facing toward the one or more coil elements of the first coil 20. The second magnetic material portion 43 has a second sidewall 43a facing toward the one or more coil elements of the first coil 20. The one or more coil elements of the first coil 20 have a first side surface opposed to the first sidewall 42a, and a second side surface opposed to the second sidewall 43a. In the present embodiment, the first coil element 20A has the first side surface, and the second coil element 20B has the second side surface. Hereinafter, the first side surface of the first coil element 20A will be denoted by symbol 20Aa, and the second side surface of the second coil element 20B will be denoted by symbol 20Ba.

As shown in FIG. 1, the first insulating film 62 includes a first interposition portion 62A interposed between the first sidewall 42a and the first side surface 20Aa, a second interposition portion 62B interposed between the second sidewall 43a and the second side surface 20Ba, and an underlying portion 62C contiguous with the first and second interposition portions 62A and 62B. The one or more coil elements of the first coil 20, i.e., the first and second coil elements 20A and 20B, are located on the underlying portion 62C.

The minimum distance between the first sidewall 42a and the first side surface 20Aa and the minimum distance between the second sidewall 43a and the second side surface 20Ba both fall within the range of 50 to 200 nm, for example. The minimum distance between the first sidewall 42a and the first side surface 20Aa is equal to the thickness of the first interposition portion 62A. The minimum distance between the second sidewall 43a and the second side surface 20Ba is equal to the thickness of the second interposition portion 62B.

As shown in FIG. 1 and FIG. 5, when the number of the one or more coil elements of the first coil 20 is two, the minimum distance between the first magnetic material portion 42 and the medium facing surface 90 falls within the range of 1.4 to 4.0 µm, for example. In the present embodiment, as shown in FIG. 5, the first sidewall 42a of the first magnetic material portion 42 has a convex shape protruding toward the medium facing surface 90 such that the distance from the medium facing surface 90 becomes minimum at the portion intersecting the main cross section. Consequently, in the present embodiment, the distance between the first magnetic material portion 42 and the medium facing surface 90 in the main cross section is the minimum distance between the first magnetic material portion 42 and the medium facing surface 90.

Reference is now made to FIG. 1 and FIG. 4 to describe the configuration of the second coil 10 and the positional relationship of the second coil 10 with the first magnetic material portion 32, the second magnetic material portion 33 and the coupling portion 31 in the second set. FIG. 4 is a plan view showing the second coil 10. The second coil 10 is wound one or more times around the first magnetic material portion 32, which is part of the return path section R1. The second coil 10 includes one or more coil elements located between the first magnetic material portion 32 and the second magnetic material portion 33. In the present embodiment, in particular, the second coil 10 is wound approximately twice around the first magnetic material portion 32, and includes a first coil element 10A and a second coil element 10B as the one or more coil elements. The first and second coil elements 10A and 10B are adjacent to each other in the direction perpendicular to the medium facing surface 90 such that the second coil element 10B is located closer to the medium facing surface 90 than is the first coil element 10A. As shown in FIG. 1, the first and second coil elements 10A and 10B are located on the front side in the direction T of travel of the recording medium 100 relative to the coupling portion 31.

As shown in FIG. 1 and FIG. 4, the first magnetic material portion 32 has a first sidewall 32a facing toward the one or more coil elements of the second coil 10. The second magnetic material portion 33 has a second sidewall 33a facing toward the one or more coil elements of the second coil 10. The one or more coil elements of the second coil 10 have a first side surface opposed to the first sidewall 32a, and a second side surface opposed to the second sidewall 33a. In the present embodiment, the first coil element 10A has the first side surface, and the second coil element 10B has the second side surface. Hereinafter, the first side surface of the first coil element 10A will be denoted by symbol 10Aa, and the second side surface of the second coil element 10B will be denoted by symbol 10Ba.

As shown in FIG. 1, the second insulating film 52 includes a first interposition portion 52A interposed between the first sidewall 32a and the first side surface 10Aa, a second interposition portion 52B interposed between the second sidewall 33a and the second side surface 10Ba, and an underlying portion 52C contiguous with the first and second interposition portions 52A and 52B. The one or more coil elements of the second coil 10, i.e., the first and second coil elements 10A and 10B, are located on the underlying portion 52C.

The minimum distance between the first sidewall 32a and the first side surface 10Aa and the minimum distance between the second sidewall 33a and the second side surface 10Ba both fall within the range of 50 to 200 nm, for example. The minimum distance between the first sidewall 32a and the first side surface 10Aa is equal to the thickness of the first interposition portion 52A. The minimum distance between the second sidewall 33a and the second side surface 10Ba is equal to the thickness of the second interposition portion 52B.

As shown in FIG. 1 and FIG. 4, when the number of the one or more coil elements of the second coil 10 is two, the minimum distance between the first magnetic material portion 32 and the medium facing surface 90 falls within the range of 1.4 to 4.0 µm, for example. In the present embodiment, as shown in FIG. 4, the first sidewall 32a of the first magnetic material portion 32 has a convex shape protruding toward the medium facing surface 90 such that the distance from the medium facing surface 90 becomes minimum at the portion intersecting the main cross section. Consequently, in the present embodiment, the distance between the first magnetic material portion 32 and the medium facing surface 90 in the main cross section is the minimum distance between the first magnetic material portion 32 and the medium facing surface 90.

Now, the internal structural features of the coils 10 and 20 and the interconnection between the coils 10 and 20 will be described. As shown in FIG. 1, the first coil 20 includes a seed layer 21 formed of a conductive material, and a main portion 22 formed of a conductive material and lying on the seed layer 21. As will be described in detail later, the seed layer 21 is used as a seed and a cathode when forming by plating a conductive layer for forming the first coil 20 (particularly the main portion 22). The second coil 10 includes a seed layer 11 formed of a conductive material, and a main portion 12 formed of a conductive material and lying on the seed layer 11. As will be described in detail later, the seed layer 11 is used as a seed and a cathode when forming by plating a conductive layer for forming the second coil 10 (particularly the main portion 12). Note that FIG. 2 omits the illustration of the seed layers 11 and 21.

The coil connection 20S of the first coil 20 is electrically connected to the coil connection 10E of the second coil 10 via the connection layers 25 to 27 shown in FIG. 2. In the example shown in FIG. 2, FIG. 4 and FIG. 5, the first coil 20 and the second coil 10 are connected in series.

The shape of the main pole 15 will now be described in detail with reference to FIG. 1 and FIG. 3 to FIG. 5. As shown in FIG. 4 and FIG. 5, the main pole 15 includes a narrow portion 15A having the first end face 15a and an end opposite thereto, and a wide portion 15B connected to the end of the narrow portion 15A. The main pole 15 has the top surface 15T, the bottom end 15L, the first side portion and the second side portion mentioned previously. The width of the top surface 15T in the track width direction TW is greater in the wide portion 15B than in the narrow portion 15A.

In the narrow portion 15A, the width of the top surface 15T in the track width direction TW is generally constant regardless of distance from the medium facing surface 90. In the wide portion 15B, the width of the top surface 15T in the track width direction TW is, for example, equal to that in the narrow portion 15A when seen at the boundary between the narrow portion 15A and the wide portion 15B, and gradually increases with increasing distance from the medium facing surface 90, then becoming constant. Here, the length of the narrow portion 15A in the direction perpendicular to the medium facing surface 90 will be referred to as neck height. The neck height falls within the range of 0 to 0.3 μm, for example. A zero neck height means that the narrow portion 15A is not present, and the wide portion 15B thus has the first end face 15a.

The top surface 15T includes a first inclined portion, a second inclined portion and a first flat portion arranged contiguously in this order, the first inclined portion being closest to the medium facing surface 90. The first inclined portion has an end located in the medium facing surface 90. The distance from the top surface 1a of the substrate 1 to an arbitrary point on each of the first and second inclined portions increases with increasing distance from the arbitrary point to the medium facing surface 90. The angle of inclination of the second inclined portion with respect to the direction perpendicular to the medium facing surface 90 is greater than the angle of inclination of the first inclined portion with respect to the same direction. The first flat portion extends substantially perpendicular to the medium facing surface 90.

The bottom end 15L includes a third inclined portion, a fourth inclined portion and a second flat portion arranged contiguously in this order, the third inclined portion being closest to the medium facing surface 90. The third inclined portion has an end located in the medium facing surface 90. The third and fourth inclined portions may each be an edge formed by two intersecting planes, or a plane connecting two planes to each other. The distance from the top surface 1a of the substrate 1 to an arbitrary point on each of the third and fourth inclined portions decreases with increasing distance from the arbitrary point to the medium facing surface 90. The angle of inclination of the fourth inclined portion with respect to the direction perpendicular to the medium facing surface 90 is greater than the angle of inclination of the third inclined portion with respect to the same direction. The second flat portion is a plane extending substantially perpendicular to the medium facing surface 90.

The first end face 15a of the main pole 15 has a first side adjacent to the first gap layer 19, a second side connected to a first end of the first side, and a third side connected to a second end of the first side. The first side defines the track width. The position of an end of a record bit to be recorded on the recording medium 100 is determined by the position of the first side. The width of the first end face 15a of the main pole 15 in the track width direction TW decreases with increasing distance from the first side, that is, with increasing proximity to the top surface 1a of the substrate 1. Each of the second side and the third side forms an angle of, for example, 7° to 17°, or preferably 10° to 15°, with respect to the Z direction or the direction perpendicular to the top surface 1a of the substrate 1. The first side has a length in the range of 0.05 to 0.20 μm, for example.

A method of manufacturing the magnetic head according to the present embodiment will now be described. As shown in FIG. 2 and FIG. 3, the method of manufacturing the magnetic head according to the present embodiment first forms the insulating layer 71, the heater 72, the insulating layer 73, the first read shield layer 3, the insulating layer 74, and the first read shield gap film 4 in this order on the substrate 1. Next, the MR element 5 and two leads (not illustrated) connected to the MR element 5 are formed on the first read shield gap film 4. The second read shield gap film 6 is then formed to cover the MR element 5 and the leads. Next, the second read shield layer 7 and the insulating layer 75 are formed on the second read shield gap film 6. The nonmagnetic layer 81, the expansion layer 76, the nonmagnetic layers 82 and 83, the sensor 77, and the nonmagnetic layer 84 are then formed in this order on the second read shield layer 7 and the insulating layer 75.

Next, the coupling portion 31 (the magnetic layer 31) is formed on the nonmagnetic layer 84 by frame plating, for example. Next, the insulating layer 51 is formed over the entire top surface of the stack. The insulating layer 51 is then polished by, for example, chemical mechanical polishing (hereinafter referred to as CMP), until the coupling portion 31 is exposed. The top surfaces of the coupling portion 31 and the insulating layer 51 are thereby made even with each other.

Next, the first magnetic material portion 32 (the core portion 32) and the second magnetic material portion 33 (the magnetic layer 33) are formed on the coupling portion 31 by frame plating, for example. The second insulating film 52 is then formed by, for example, atomic layer deposition, so as to cover the coupling portion 31, the first magnetic material portion 32, the second magnetic material portion 33 and the insulating layer 51. The second insulating film 52 has a thickness in the range of 50 to 200 nm, for example.

Next, the second coil 10 is formed in a self-aligned manner. The step of forming the second coil 10 is in principle the same as the step of forming the first coil 20 to be described later. The step of forming the second coil 10 will now be described briefly, and the step of forming the first coil 20 will be described later in detail.

The step of forming the second coil 10 starts with forming a first mask (not illustrated) on the second insulating film 52. The first mask covers the first and second magnetic material portions 32 and 33, and exposes at least part of the underlying portion 52C (see FIG. 1) of the second insulating film 52. The at least part of the underlying portion 52C exposed will hereinafter be referred to as the exposed portion. Later, the seed layer 11 will be formed on the exposed portion, and then the conductive layer for forming the second coil 10 (particularly the main portion 12) will be formed on the seed layer 11.

The first mask includes a first portion covering the first magnetic material portion 32, and a second portion covering the second magnetic material portion 33. The first portion includes a first coating portion covering thinly the first interposition portion 52A of the second insulating film 52. The second portion includes a second coating portion covering thinly the second interposition portion 52B of the second insulating film 52.

The first mask is formed in the following manner. First, a photoresist layer of a positive photoresist is formed over the entire top surface of the stack. The photoresist layer is then selectively exposed to light through a photomask. The photomask has a light-transmitting portion which allows the light for exposure to pass therethrough, and a light-blocking portion which blocks the light for exposure. The light-transmitting portion of the photomask is shaped to correspond to the planar shape of the opening of the first mask to be formed later. Then, the exposed photoresist layer is developed. As a result of the exposure, the area of the photoresist layer irradiated with the light having passed through the light-transmitting portion of the photomask becomes soluble in a developing solution, while the other area remains insoluble in the developing solution. The photoresist layer remaining after the development forms the first mask.

In the step of forming the first mask, as described above, an unpatterned photoresist layer is exposed to light in a predetermined pattern defined by the photomask. The method for forming the first mask is also used for the formation of other masks that will be formed in later steps by patterning a photoresist layer.

Next, the seed layer 11 is selectively formed on the underlying portion 52C using the first mask. More specifically, in the presence of the first mask, a conductive film to become the seed layer 11 is formed over the entire top surface of the stack by ion beam deposition, for example. A portion of the conductive film that lies on the exposed portion of the underlying portion 52C forms the seed layer 11. Another portion of the conductive film that lies on the first mask is an unwanted conductive film which is to be removed, not forming the seed layer 11. The first mask and the unwanted conductive film lying thereon are then removed.

As a result of removing the first mask after the formation of the seed layer 11 as described above, the first and second coating portions are removed and consequently, a gap is created between the seed layer 11 and each of the first and second interposition portions 52A and 52B of the second insulating film 52.

Then, a second mask (not illustrated) is formed over the seed layer 11 and the second insulating film 52. The second mask has an opening intended to receive the conductive layer for forming the second coil 10. Part of the edge of the opening is located above the first and second magnetic material portions 32 and 33. The second mask is formed by patterning a photoresist layer by photolithography, for example.

Next, using the seed layer 11 as a seed and a cathode, the conductive layer for forming the second coil 10 is formed to be received in the opening of the second mask by plating. The conductive layer is formed to contact the first sidewall 32a of the first magnetic material portion 32 and the second sidewall 33a of the second magnetic material portion 33 via the first interposition portion 52A and the second interposition portion 52B (see FIG. 1) of the second insulating film 52, respectively, and such that portions of the conductive layer ride over the first and second magnetic material portions 32 and 33. The second mask is then removed.

Next, unwanted portions of the seed layer 11, which are portions of the seed layer 11 other than the portion lying under the conductive layer, are removed by etching. The etching may be wet etching or dry etching. For dry etching, ion beam etching (hereinafter referred to as IBE) is preferably employed. Next, the insulating layer 53 is formed over the entire top surface of the stack so as to cover the conductive layer, the first magnetic material portion 32 and the second magnetic material portion 33. The conductive layer, the first magnetic material portion 32, the second magnetic material portion 33, the second insulating film 52 and the insulating layer 53 are then polished by, for example, CMP, such that the portions of the conductive layer riding over the first and second magnetic material portions 32 and 33 are removed, whereby the top surfaces of the conductive layer, the first and second magnetic material portions 32 and 33, the second insulating film 52, and the insulating layer 53 are made even with each other. This makes the conductive layer into the main portion 12 of the second coil 10, thus completing the second coil 10.

Next, the second shield 16B is formed on the second magnetic material portion 33, the magnetic layer 34 is formed on the first magnetic material portion 32, and the connection layer 25 is formed on the coil connection 10E of the second coil 10, by frame plating, for example. Next, the insulating layer 54 is formed over the entire top surface of the stack. The insulating layer 54 is then polished by, for example, CMP, until the top surfaces of the second shield 16B, the magnetic layer 34 and the connection layer 25 are exposed. The top surfaces of the second shield 16B, the magnetic layer 34, the connection layer 25 and the insulating layer 54 are thereby made even with each other. Next, the two side shields 16C and 16D are formed on the second shield 16B by frame plating, for example.

Next, an etching mask (not illustrated) is formed over the second shield 16B and the side shields 16C and 16D. This etching mask is formed by patterning a photoresist layer by photolithography. The magnetic layer 34, the connection layer 25 and the insulating layer 54 are then etched by using the etching mask. The etching proceeds until the etched bottom reaches a level between the top and bottom surfaces of the insulating layer 54 when unetched. For example, reactive ion etching (hereinafter referred to as RIE) is employed for this etching. The etching mask is then removed. Next, the top surface of the second shield 16B is etched by, for example, IBE, in the portion thereof in the vicinity of the location at which the medium facing surface 90 is to be formed. This etching determines the shape of the top surface of the second shield 16B.

Next, the second gap layer 18 is formed to cover the second shield 16B and the side shields 16C and 16D. The opening for exposing the top surface of the magnetic layer 34 and the opening for exposing the top surface of the connection layer 25 are then formed in the second gap layer 18. Next, a preliminary main pole, which will later become the main pole 15, is formed on the second gap layer 18, and the connection layer 26 is formed on the connection layer 25, by frame plating, for example. The preliminary main pole and the connection layer 26 are formed such that their top surfaces are located at a level higher than portions of the second gap layer 18 lying on the side shields 16C and 16D. Next, the nonmagnetic layer 55 is formed over the entire top surface of the stack. The preliminary main pole, the connection layer 26 and the nonmagnetic layer 55 are then polished by, for example, CMP, until the top surfaces of the side shields 16C and 16D are exposed. The top surfaces of the preliminary main pole, the side shields 16C and 16D, the connection layer 26 and the nonmagnetic layer 55 are thereby made even with each other.

Next, the nonmagnetic metal layer 58 and the insulating layer 59 are formed on the preliminary main pole and the side shields 16C and 16D. Using the nonmagnetic metal layer 58 and the insulating layer 59 as an etching mask, the preliminary main pole and the side shields 16C and 16D are then etched in part by IBE, for example. This makes the preliminary main pole into the main pole 15. This etching determines the shape of the top surface 15T of the main pole 15.

Next, the first gap layer 19 is formed over the entire top surface of the stack by sputtering or chemical vapor deposition, for example. The first gap layer 19, the nonmagnetic metal layer 58 and the insulating layer 59 are then selectively etched by, for example, IBE, so that a portion of the top surface 15T of the main pole 15 and portions of the top surfaces of the side shields 16C and 16D are exposed. Next, the first shield 16A is formed on the side shields 16C and 16D and the first gap layer 19, the magnetic layer 41 is formed on the main pole 15, and the connection layer 27 is formed on the connection layer 26, by frame plating, for example.

Next, the nonmagnetic layer 61 is formed over the entire top surface of the stack. The nonmagnetic layer 61 is then polished by, for example, CMP, until the first shield 16A, the magnetic layer 41 and the connection layer 27 are exposed.

The top surfaces of the first shield 16A, the magnetic layer 41, the connection layer 27 and the nonmagnetic layer 61 are thereby made even with each other.

Reference is now made to FIG. 6A to FIG. 20B to describe a series of steps to be performed after the foregoing step up to the formation of the coupling portion 44 (the magnetic layer 44). FIG. 6A to FIG. 20B each illustrate part of a stack of layers formed in the process of manufacturing the magnetic head. FIG. nA (n is an integer between 6 and 20 inclusive) shows a cross section of a portion of the stack that appears in the main cross section. FIG. nB shows the top surface of the portion of the stack. The line nA-nA on FIG. nB indicates the location of the cross section shown in FIG. nA. The symbol "ABS" on FIG. 6A to FIG. 20B indicates the location at which the medium facing surface 90 is to be formed.

Figure 6A:
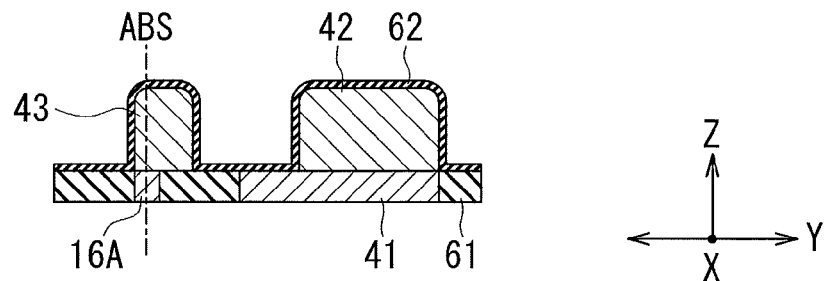
FIG. 6A and FIG. 6B are explanatory diagrams showing a step of a method of manufacturing the magnetic head according to the first embodiment of the invention.
Figure 6B:
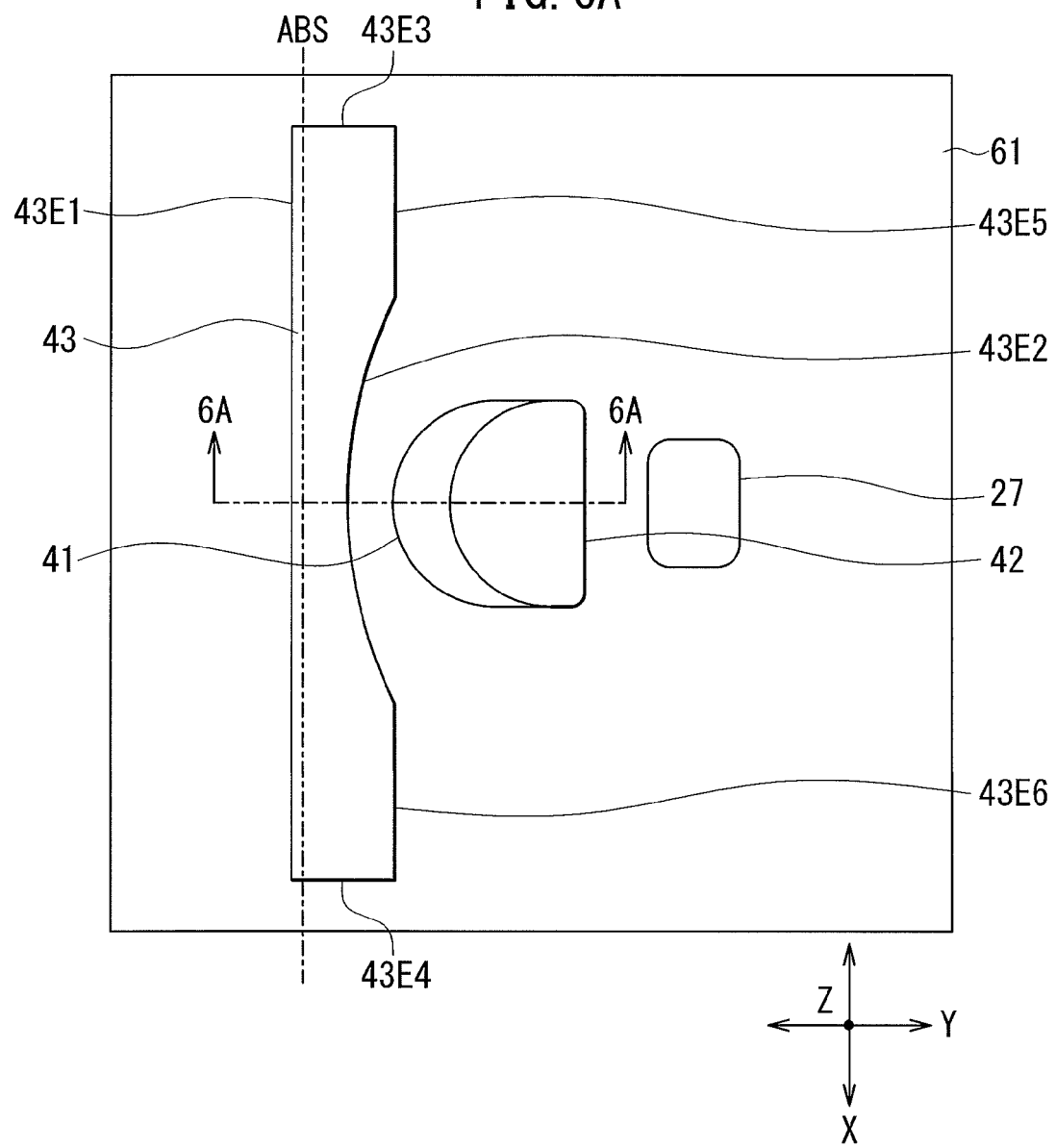

FIG. 6A and FIG. 6B shows a step that follows the polishing of the nonmagnetic layer 61. This step starts with forming the first magnetic material portion 42 (the core portion 42) on the magnetic layer 41 and forming the second magnetic material portion 43 (the magnetic layer 43) on the first shield 16A and the nonmagnetic layer 61 by frame plating, for example. Next, the first insulating film 62 is formed to cover the magnetic layer 41, the first magnetic material portion 42, the second magnetic material portion 43 and the nonmagnetic layer 61 by atomic layer deposition, for example. The first insulating film 62 has a thickness in the range of 50 to 200 nm, for example. Note that FIG. 6B omits the illustration of the first insulating film 62. Next, an opening for exposing the top surface of the connection layer 27 is formed in the first insulating film 62.

In the step shown in FIG. 6A and FIG. 6B, the periphery of the second magnetic material portion 43 when viewed from above includes a first edge 43E1, a second edge 43E2, a third edge 43E3, a fourth edge 43E4, a fifth edge 43E5, and a sixth edge 43E6. The first edge 43E1 is linear and lies at the end opposite from the first magnetic material portion 42. The second edge 43E2 is arc-shaped and faces the first magnetic material portion 42. The third and fourth edges 43E3 and 43E4 are located at opposite ends in the track width direction. The fifth edge 43E5 connects one end of the second edge 43E2 to one end of the third edge 43E3. The sixth edge 43E6 connects the other end of the second edge 43E2 to one end of the fourth edge 43E4.

Figure 7A:
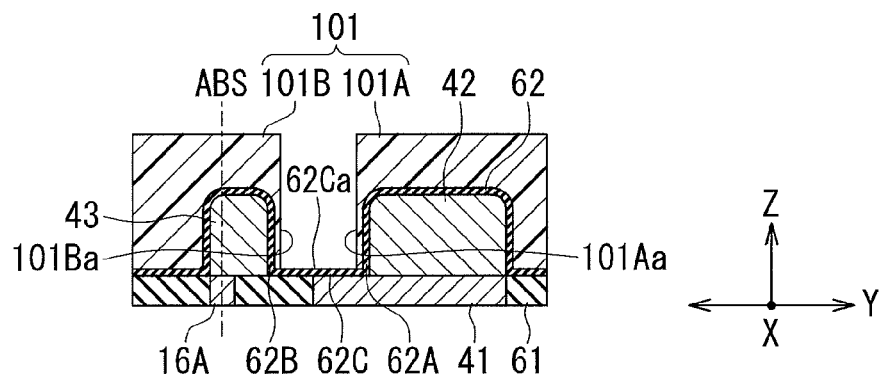
FIG. 7A and FIG. 7B are explanatory diagrams showing a step that follows the step shown in FIG. 6A and FIG. 6B.
Figure 7B:
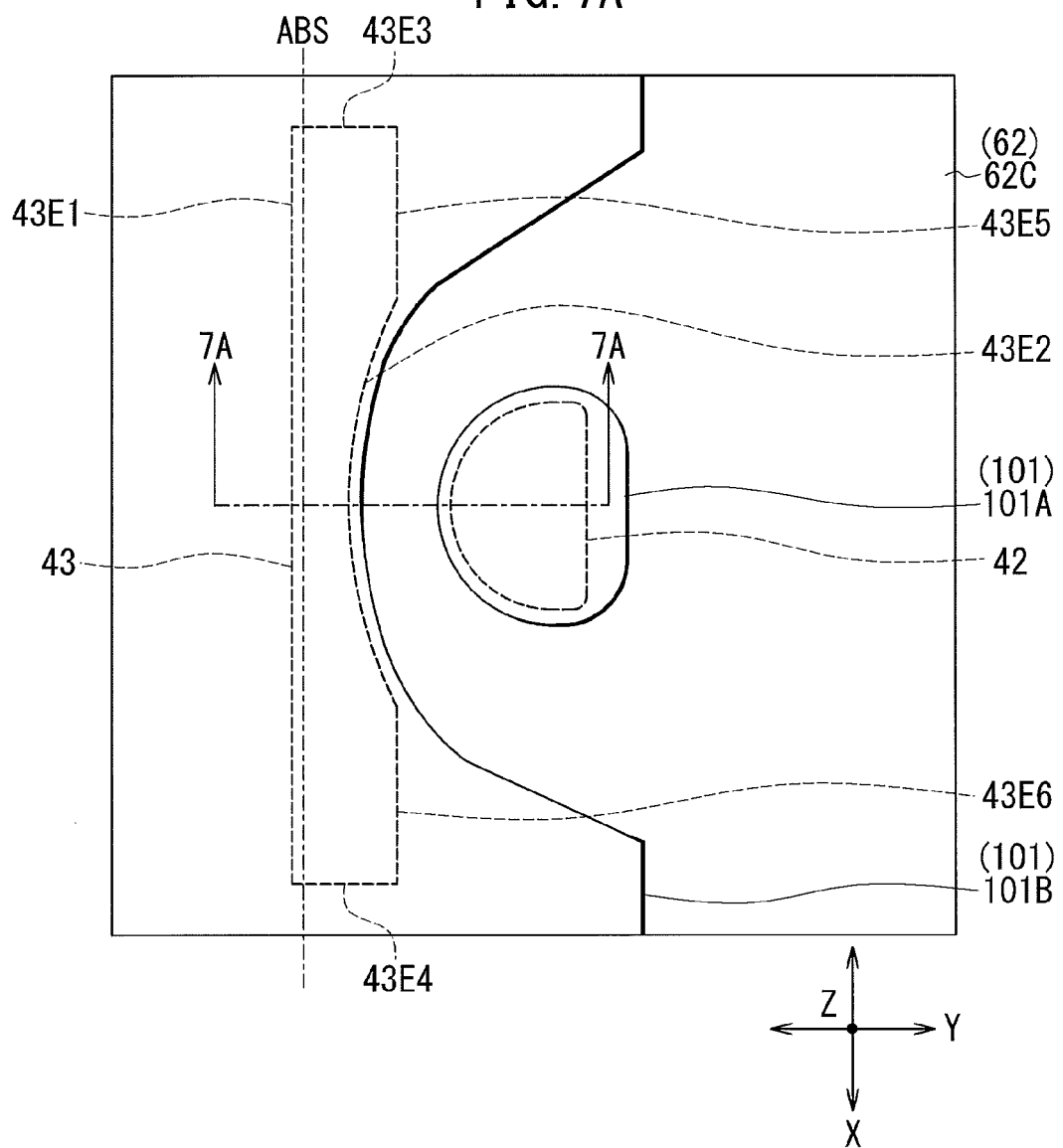

Next, the first coil 20 is formed in a self-aligned manner. FIG. 7A to FIG. 14B show the step of forming the first coil 20. The step of forming the first coil 20 starts with forming a first mask 101 on the first insulating film 62 as shown in FIG. 7A and FIG. 7B. The first mask 101 covers the first and second magnetic material portions 42 and 43, and exposes at least part of the underlying portion 62C of the first insulating film 62. The at least part of the underlying portion 62C exposed will hereinafter be referred to as the exposed portion 62Ca. Later, the seed layer 21 will be formed on the exposed portion 62Ca, and then the conductive layer for forming the first coil 20 (particularly the main portion 22) will be formed on the seed layer 21. The first mask 101 is formed by patterning a photoresist layer by photolithography, for example.

The first mask 101 includes a first portion 101A covering the first magnetic material portion 42, and a second portion 101B covering the second magnetic material portion 43. The first portion 101A includes a first coating portion 101Aa covering thinly the first interposition portion 62A of the first insulating film 62. The second portion 101B includes a second coating portion 101Ba covering thinly the second interposition portion 62B of the first insulating film 62.

The periphery of the second portion 101B when viewed from above includes three portions that are respectively parallel to the first, third and fourth edges 43E1, 43E3 and 43E4 of the periphery of the second magnetic material portion 43. The three portions are preferably 100 µm or more away from the first, third and fourth edges 43E1, 43E3 and 43E4, respectively. The reason will be described in detail later.

Figure 8A:
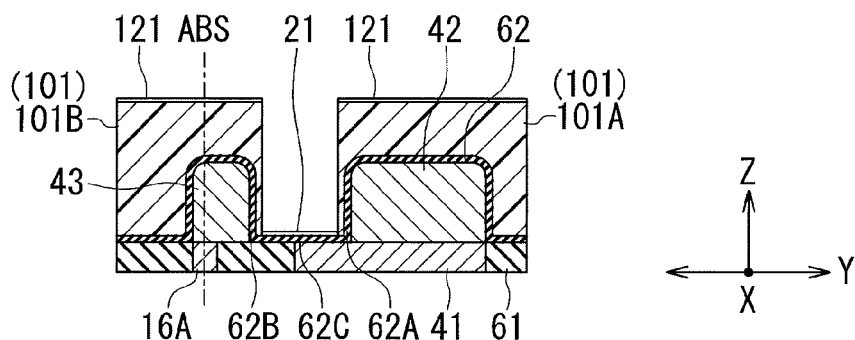
FIG. 8A and FIG. 8B are explanatory diagrams showing a step that follows the step shown in FIG. 7A and FIG. 7B.
Figure 8B:
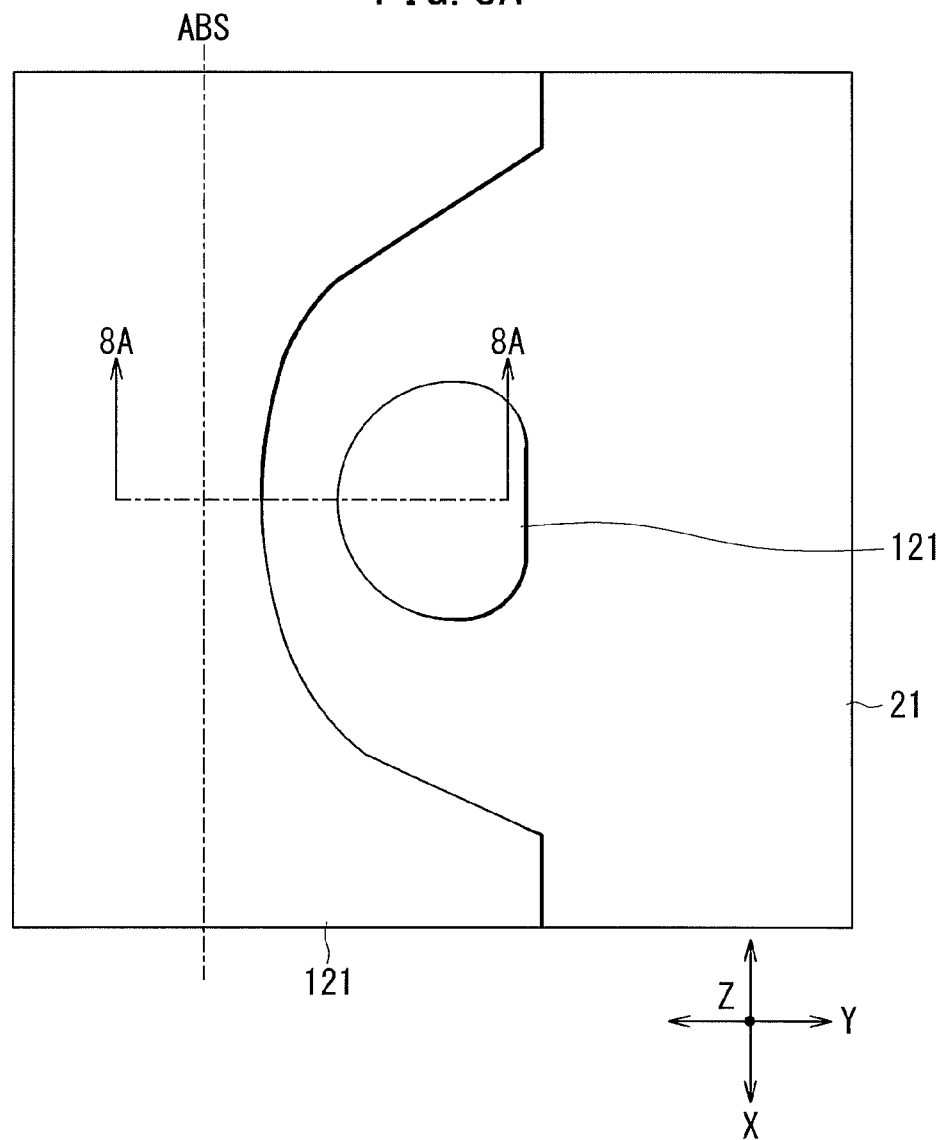

FIG. 8A and FIG. 8B show the next step. In this step, first, the seed layer 21 is selectively formed on the underlying portion 62C using the first mask 101. More specifically, in the presence of the first mask 101, a conductive film to become the seed layer 21 is formed over the entire top surface of the stack by ion beam deposition, for example. A portion of the conductive film that lies on the exposed portion 62Ca of the underlying portion 62C forms the seed layer 21. Another portion of the conductive film that lies on the first mask 101 is an unwanted conductive film 121 which is to be removed, not forming the seed layer 21. Although not illustrated, the seed layer 21 is formed also on the connection layer 27. The first mask 101 and the unwanted conductive film 121 lying thereon are then removed.

As a result of removing the first mask 101 after the formation of the seed layer 21 as described above, the first coating portion 101Aa and the second coating portion 101Ba shown in FIG. 7A are removed and consequently, a gap is created between the seed layer 21 and each of the first and second interposition portions 62A and 62B of the first insulating film 62.

Figure 9A:
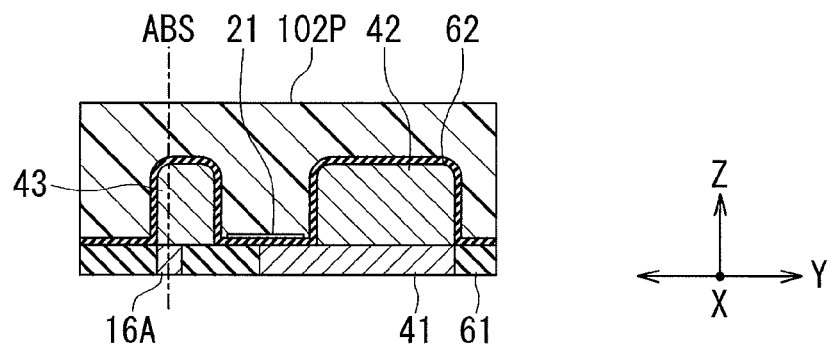
FIG. 9A and FIG. 9B are explanatory diagrams showing a step that follows the step shown in FIG. 8A and FIG. 8B.
Figure 9B:
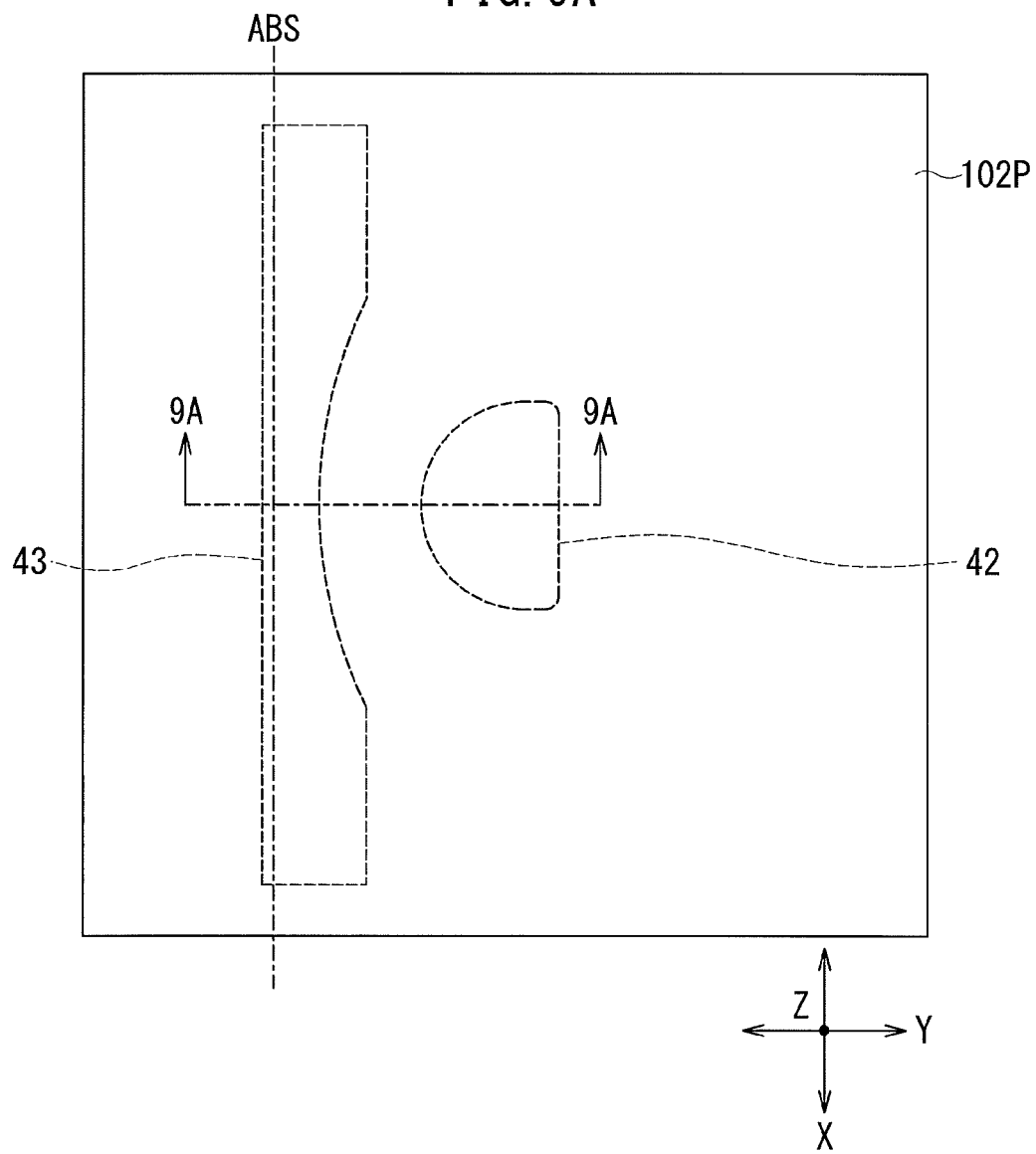

FIG. 9A and FIG. 9B show the next step. In this step, a photoresist layer 102P of a photoresist is formed over the entire top surface of the stack.

Figure 10A:
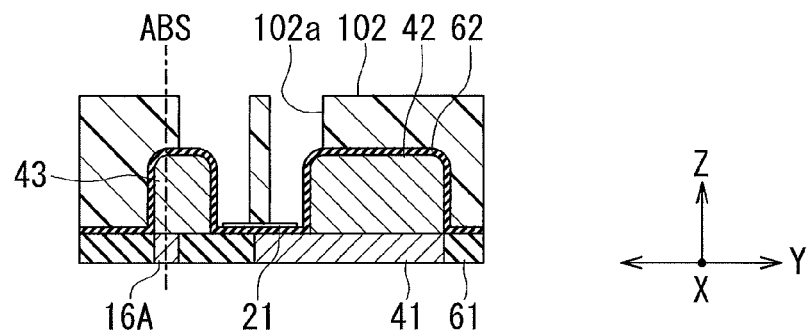
FIG. 10A and FIG. 10B are explanatory diagrams showing a step that follows the step shown in FIG. 9A and FIG. 9B.
Figure 10B:
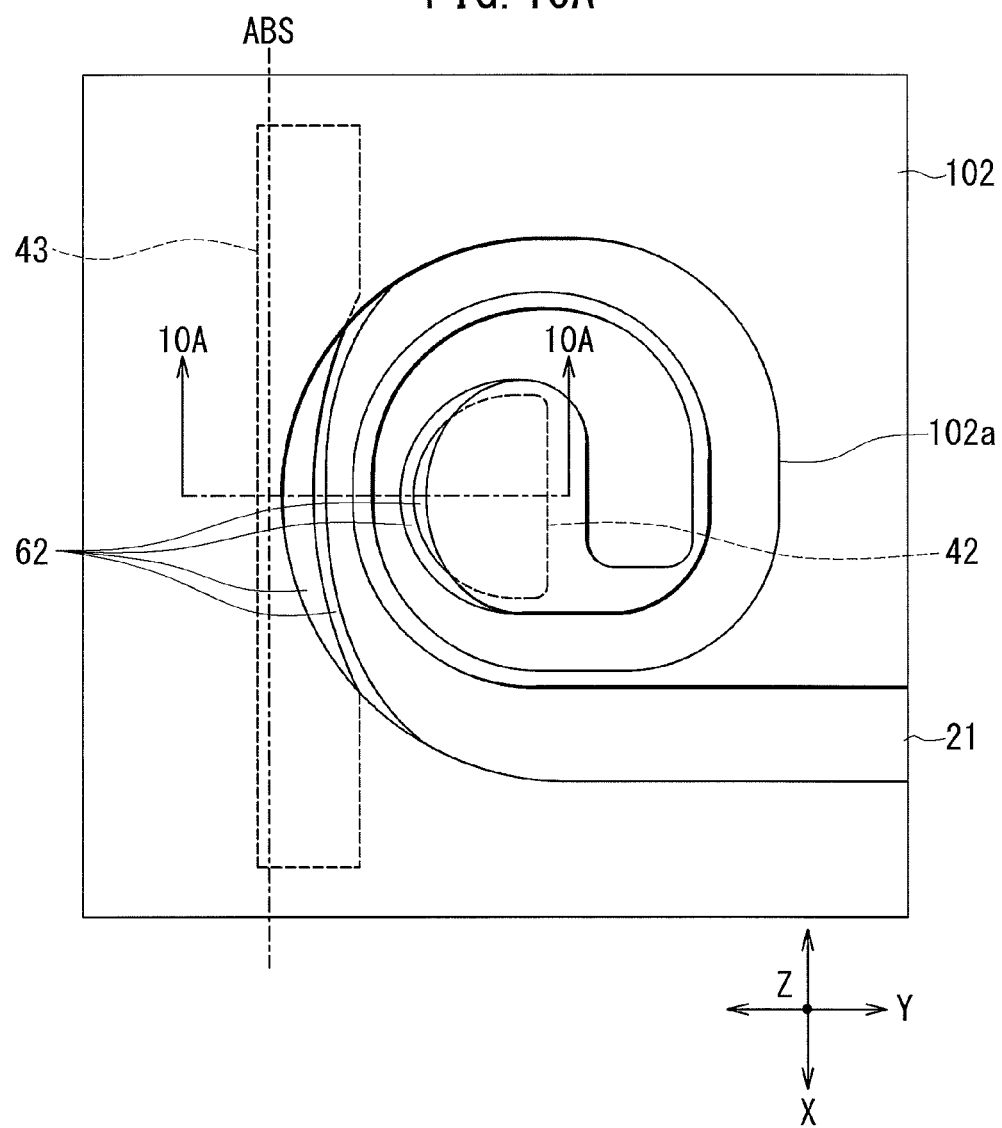

FIG. 10A and FIG. 10B show the next step. In this step, the photoresist layer 102P is patterned by photolithography into a second mask 102. The second mask 102 has an opening 102a intended to receive the conductive layer for forming the first coil 20. Part of the edge of the opening 102a is located above the first and second magnetic material portions 42 and 43.

Figure 11A:
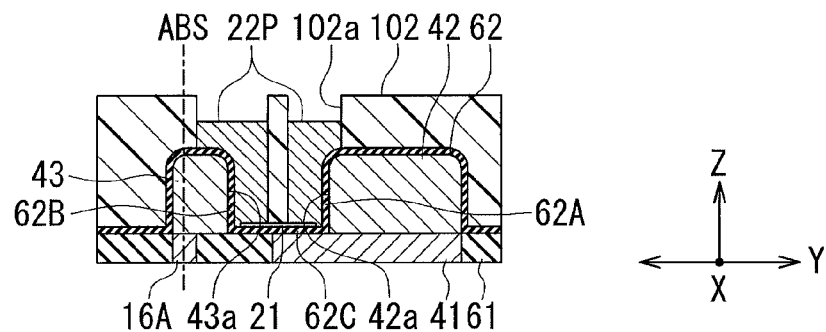
FIG. 11A and FIG. 11B are explanatory diagrams showing a step that follows the step shown in FIG. 10A and FIG. 10B.
Figure 11B:
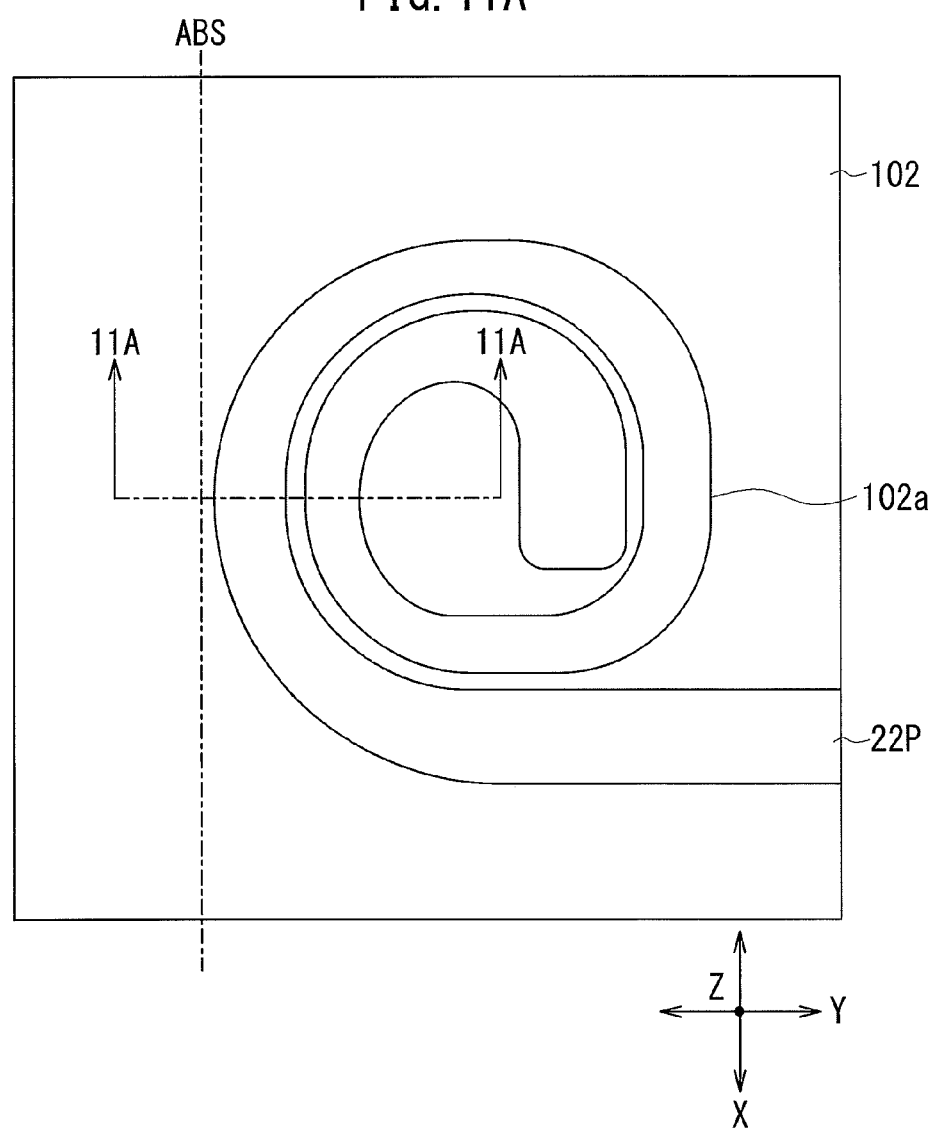
Figure 12A:
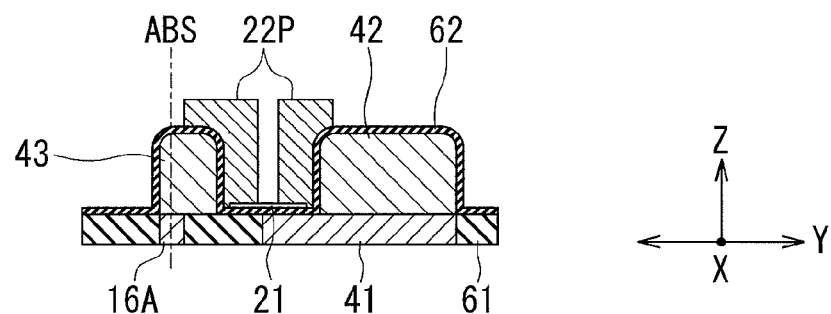
FIG. 12A and FIG. 12B are explanatory diagrams showing a step that follows the step shown in FIG. 11A and FIG. 11B.
Figure 12B:
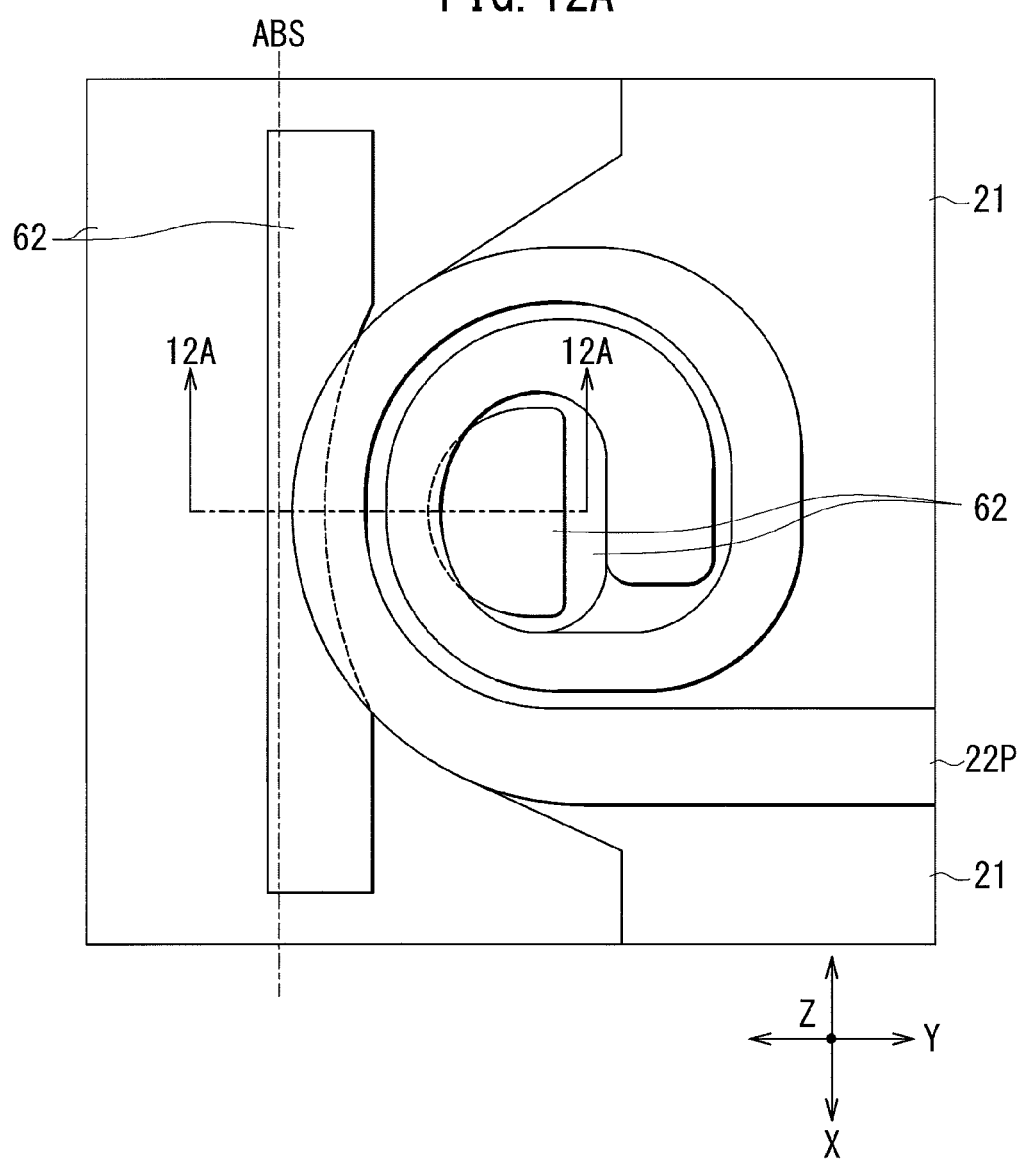

FIG. 11A and FIG. 11B show the next step. In this step, the conductive layer 22P for forming the first coil 20 is formed to be received in the opening 102a of the second mask 102 by plating, using the seed layer 21 as a seed and a cathode. The conductive layer 22P is formed to contact the first sidewall 42a of the first magnetic material portion 42 and the second sidewall 43a of the second magnetic material portion 43 via the first interposition portion 62A and the second interposition portion 62B of the first insulating film 62, respectively, and such that portions of the conductive layer 22P ride over the first and second magnetic material portions 42 and 43. Then, the second mask 102 is removed as shown in FIG. 12A and FIG. 12B.

Figure 13A:
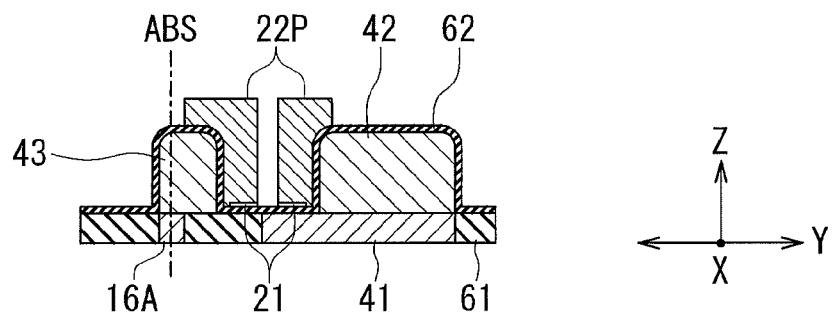
FIG. 13A and FIG. 13B are explanatory diagrams showing a step that follows the step shown in FIG. 12A and FIG. 12B.
Figure 13B:
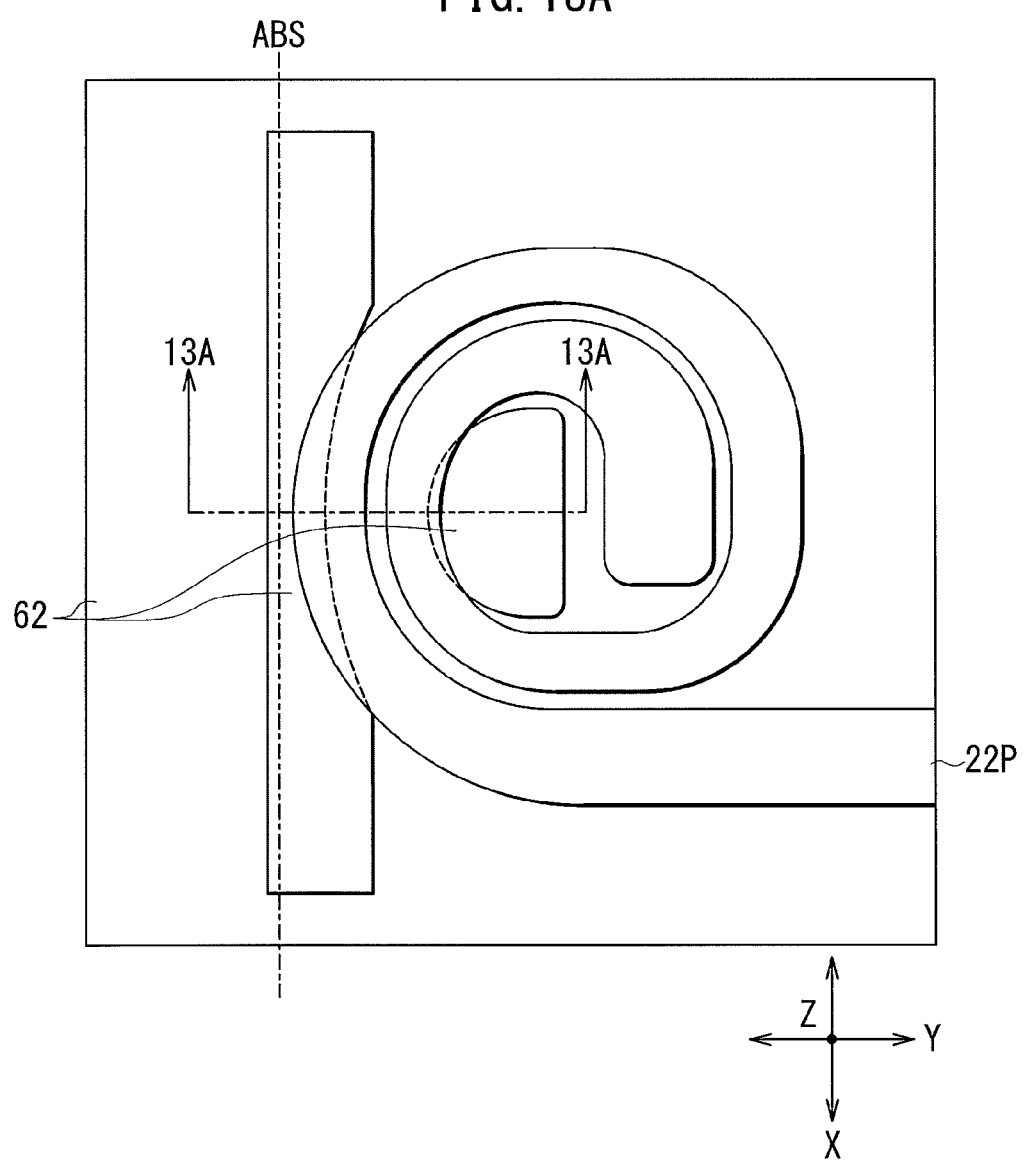

FIG. 13A and FIG. 13B show the next step. In this step, unwanted portions of the seed layer 21, which are portions of the seed layer 21 other than the portion lying under the conductive layer 22P, are removed by etching. The etching may be wet etching or dry etching. For dry etching, IBE is preferably employed.

Figure 14A:
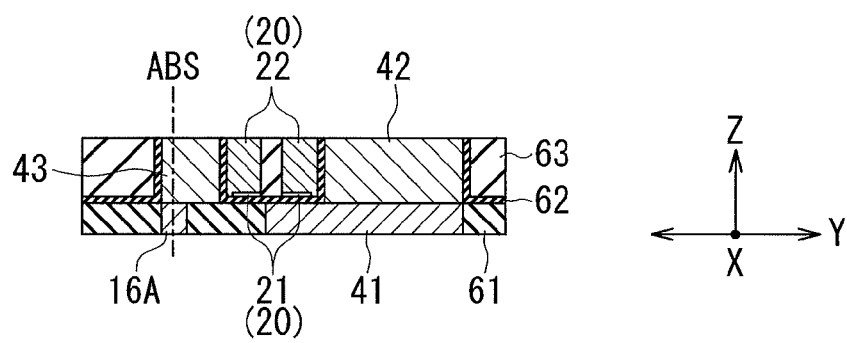
FIG. 14A and FIG. 14B are explanatory diagrams showing a step that follows the step shown in FIG. 13A and FIG. 13B.
Figure 14B:
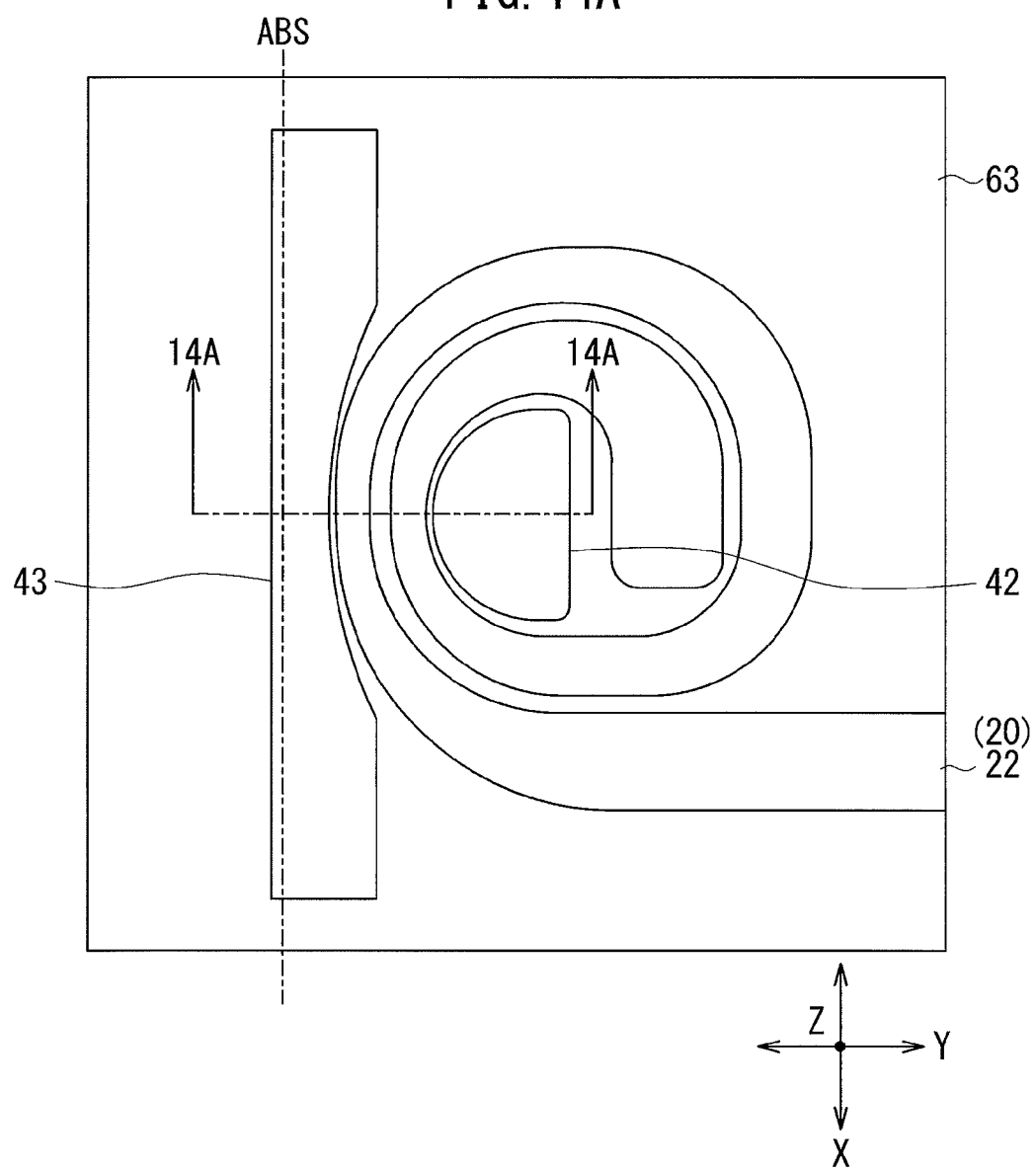

FIG. 14A and FIG. 14B show the next step. In this step, first, the insulating layer 63 is formed over the entire top surface of the stack to cover the conductive layer 22P, the first magnetic material portion 42 and the second magnetic material portion 43. The conductive layer 22P, the first magnetic material portion 42, the second magnetic material portion 43, the first insulating film 62 and the insulating layer 63 are then polished by, for example, CMP, such that the portions of the conductive layer 22P riding over the first and second magnetic material portions 42 and 43 are removed, whereby the top surfaces of the conductive layer 22P, the first and second magnetic material portions 42 and 43, the first insulating film 62, and the insulating layer 63 are made even with each other. This makes the conductive layer 22P into the main portion 22 of the first coil 20, thus completing the first coil 20. Note that FIG. 14B omits the illustration of the first insulating film 62.

Figure 15A:
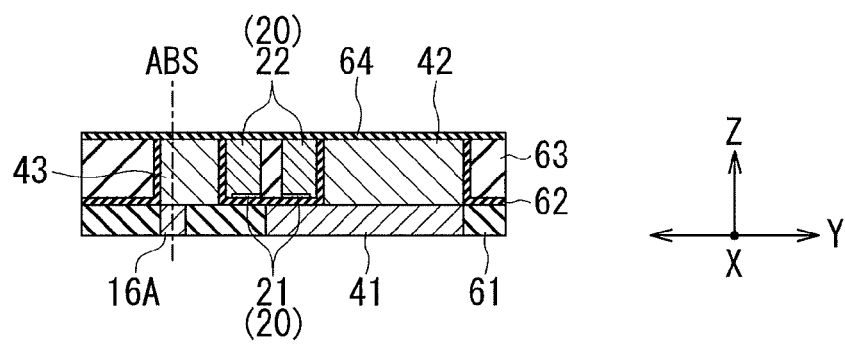
FIG. 15A and FIG. 15B are explanatory diagrams showing a step that follows the step shown in FIG. 14A and FIG. 14B.
Figure 15B:
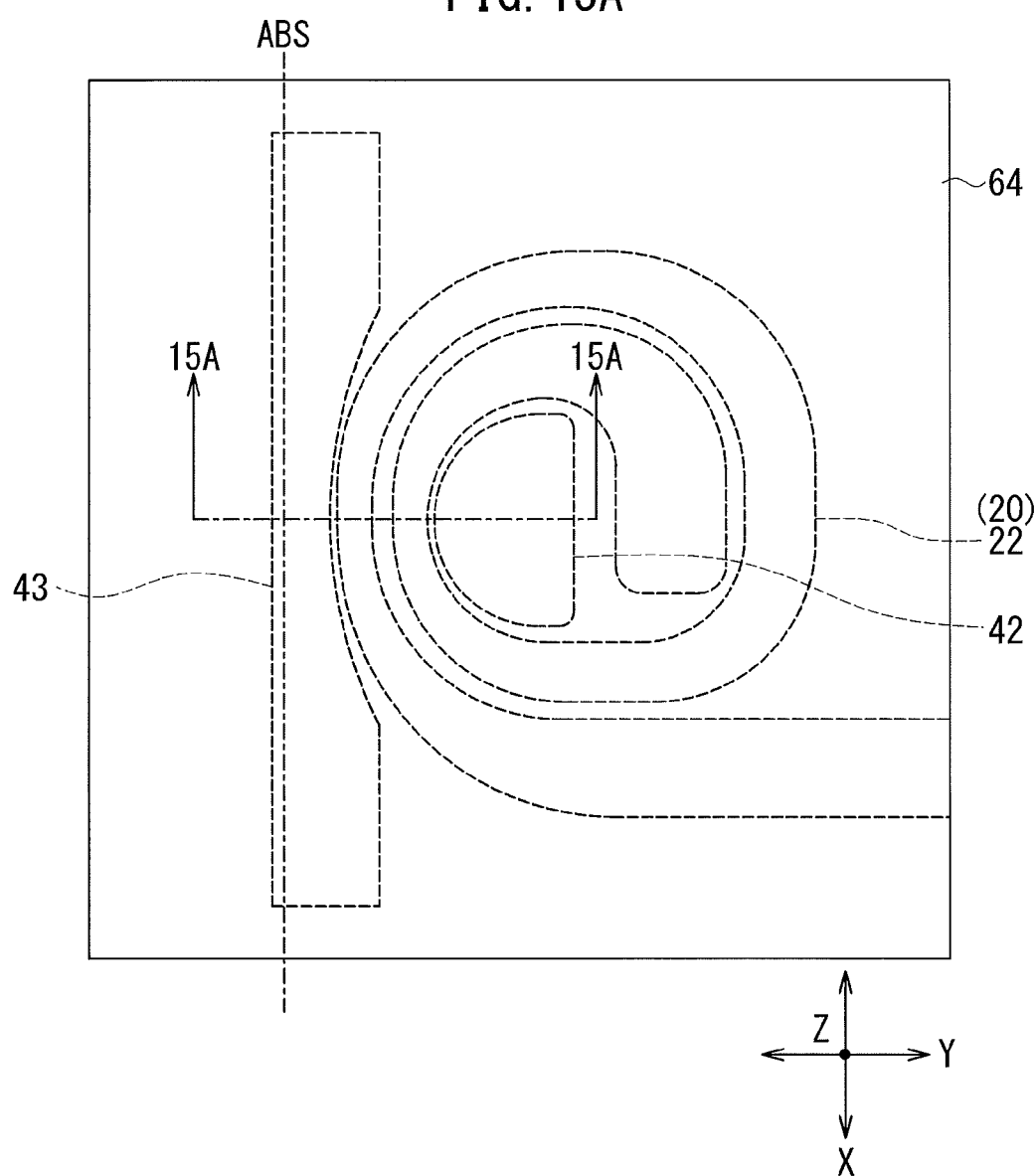
Figure 16A:
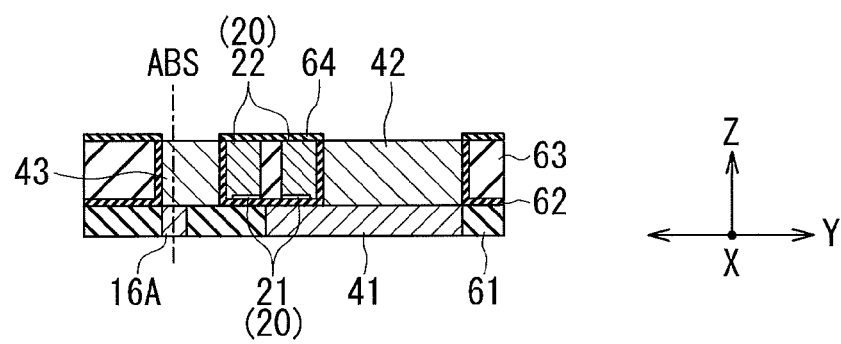
FIG. 16A and FIG. 16B are explanatory diagrams showing a step that follows the step shown in FIG. 15A and FIG. 15B.
Figure 16B:
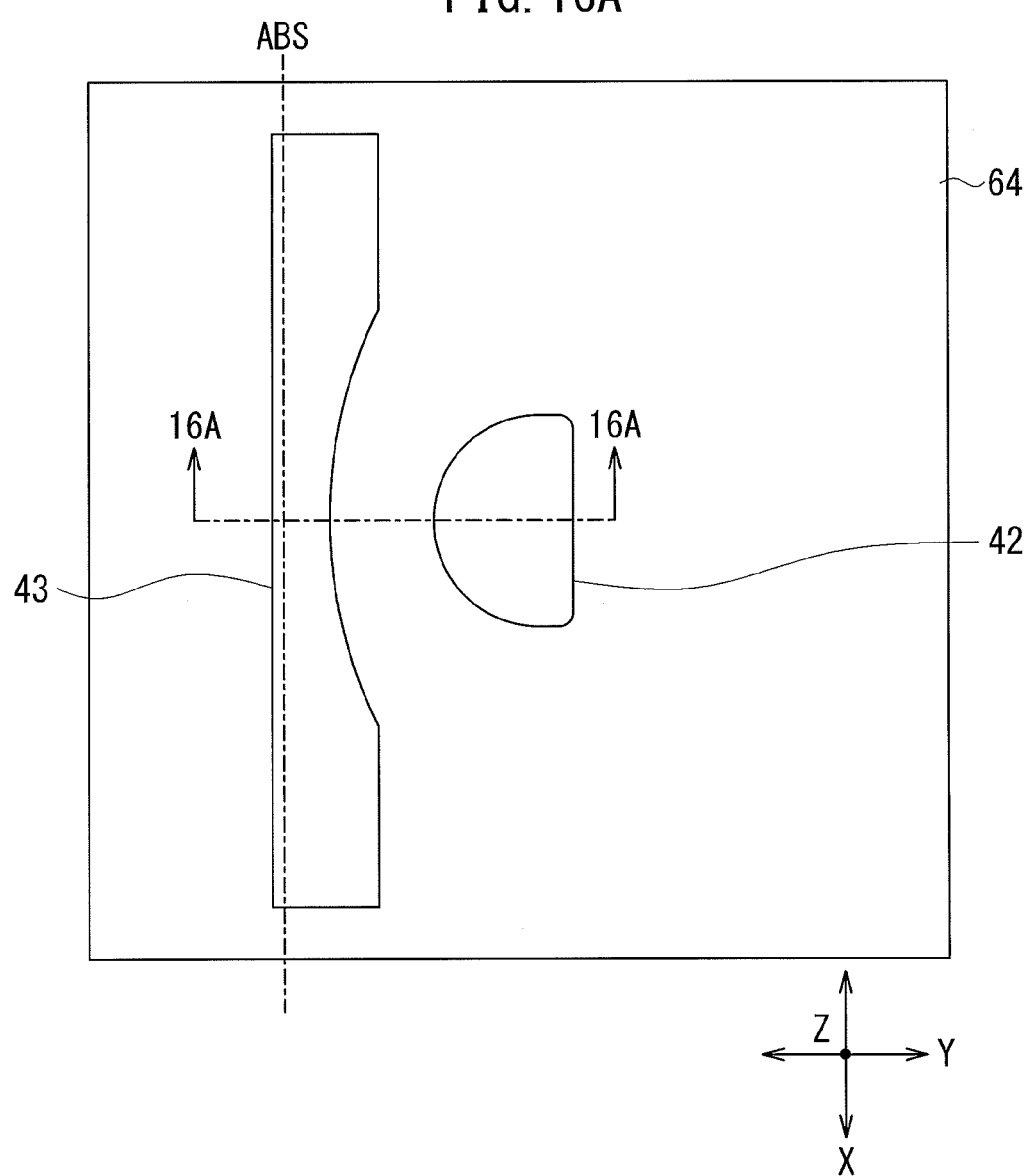

FIG. 15A and FIG. 15B show a step following the formation of the first coil 20. In this step, the insulating layer 64 is formed over the entire top surface of the stack. Next, as shown in FIG. 16A and FIG. 16B, the insulating layer 64 is selectively etched to form therein an opening for exposing the top surface of the first magnetic material portion 42 and an opening for exposing the top surface of the second magnetic material portion 43.

Figure 17A:
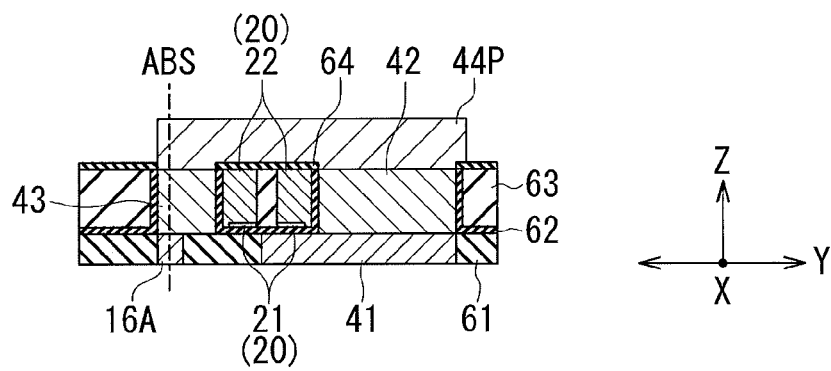
FIG. 17A and FIG. 17B are explanatory diagrams showing a step that follows the step shown in FIG. 16A and FIG. 16B.
Figure 17B:
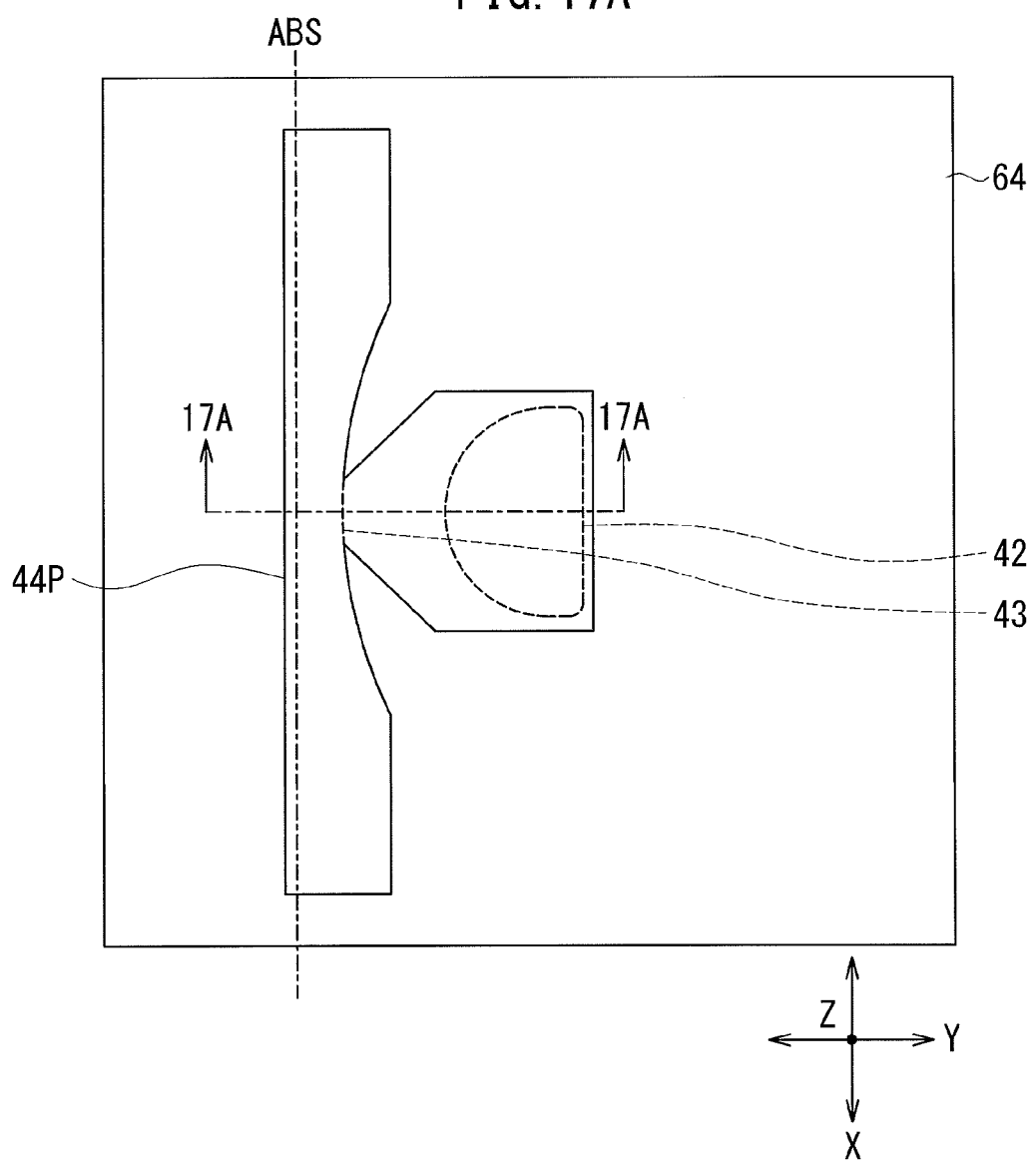

FIG. 17A and FIG. 17B show the next step. In this step, a preliminary coupling portion 44P, which will later become the coupling portion 44, is formed over the top surfaces of the first and second magnetic material portions 42 and 43 and part of the top surface of the insulating layer 64 by frame plating, for example.

Figure 18A:
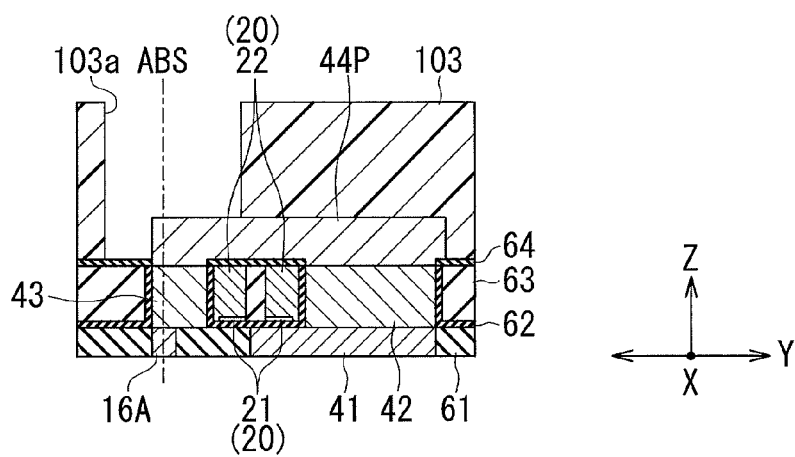
FIG. 18A and FIG. 18B are explanatory diagrams showing a step that follows the step shown in FIG. 17A and FIG. 17B.
Figure 18B:
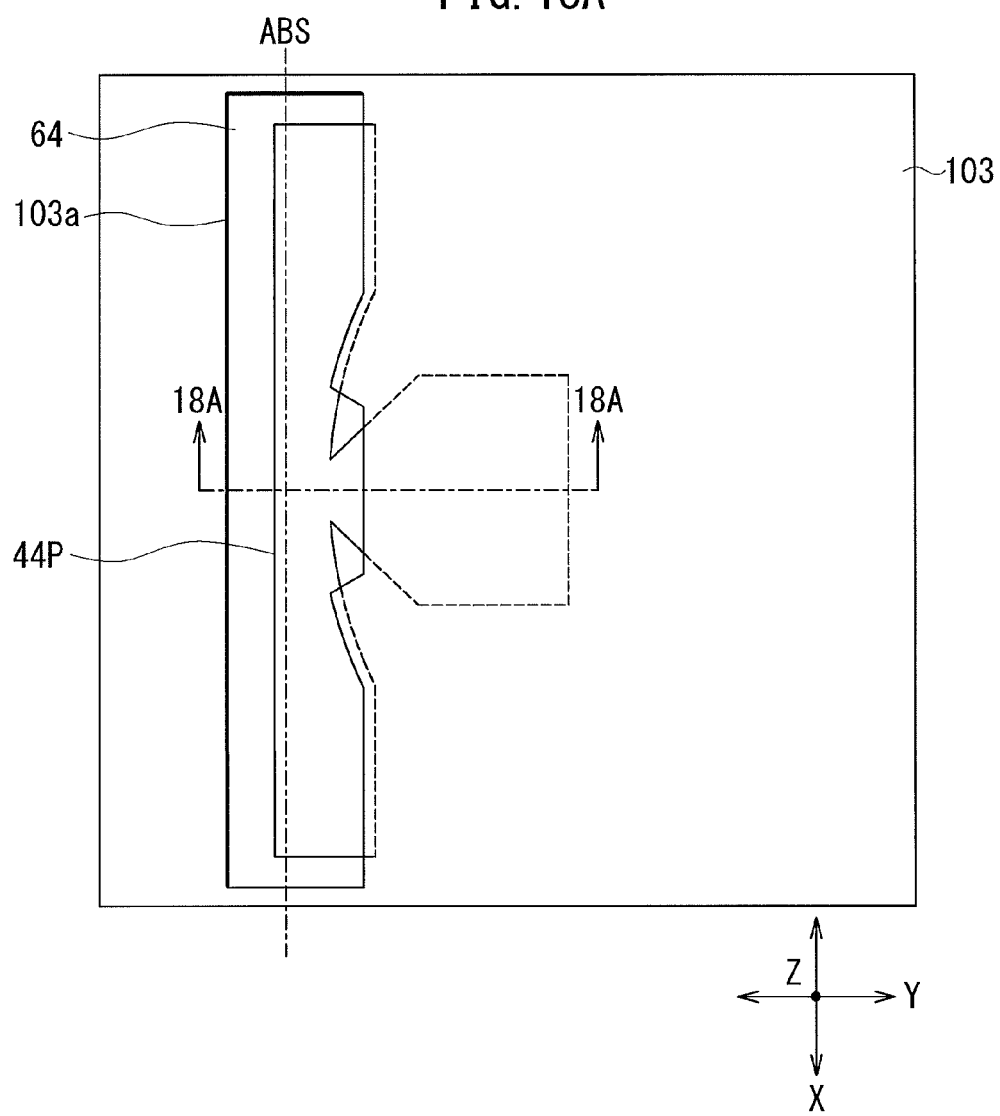

FIG. 18A and FIG. 18B show the next step. In this step, an etching mask 103 is formed on the stack. The etching mask 103 has an opening 103a formed near the location ABS at which the medium facing surface 90 is to be formed. The etching mask 103 is formed by patterning a photoresist layer by photolithography.

Figure 19A:
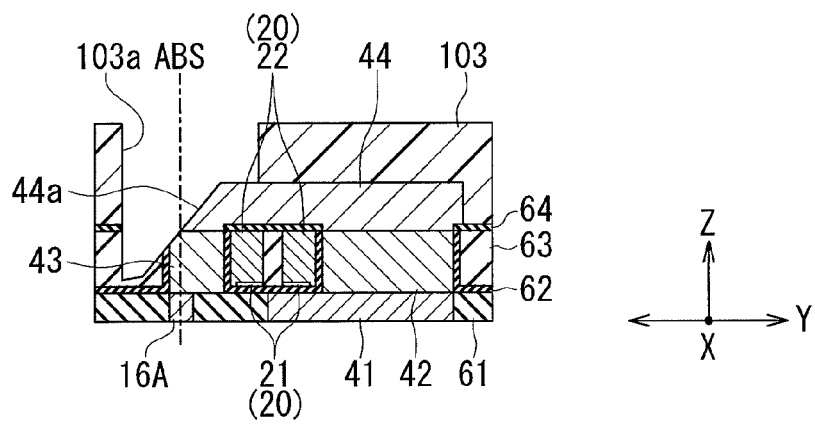
FIG. 19A and FIG. 19B are explanatory diagrams showing a step that follows the step shown in FIG. 18A and FIG. 18B.
Figure 19B:
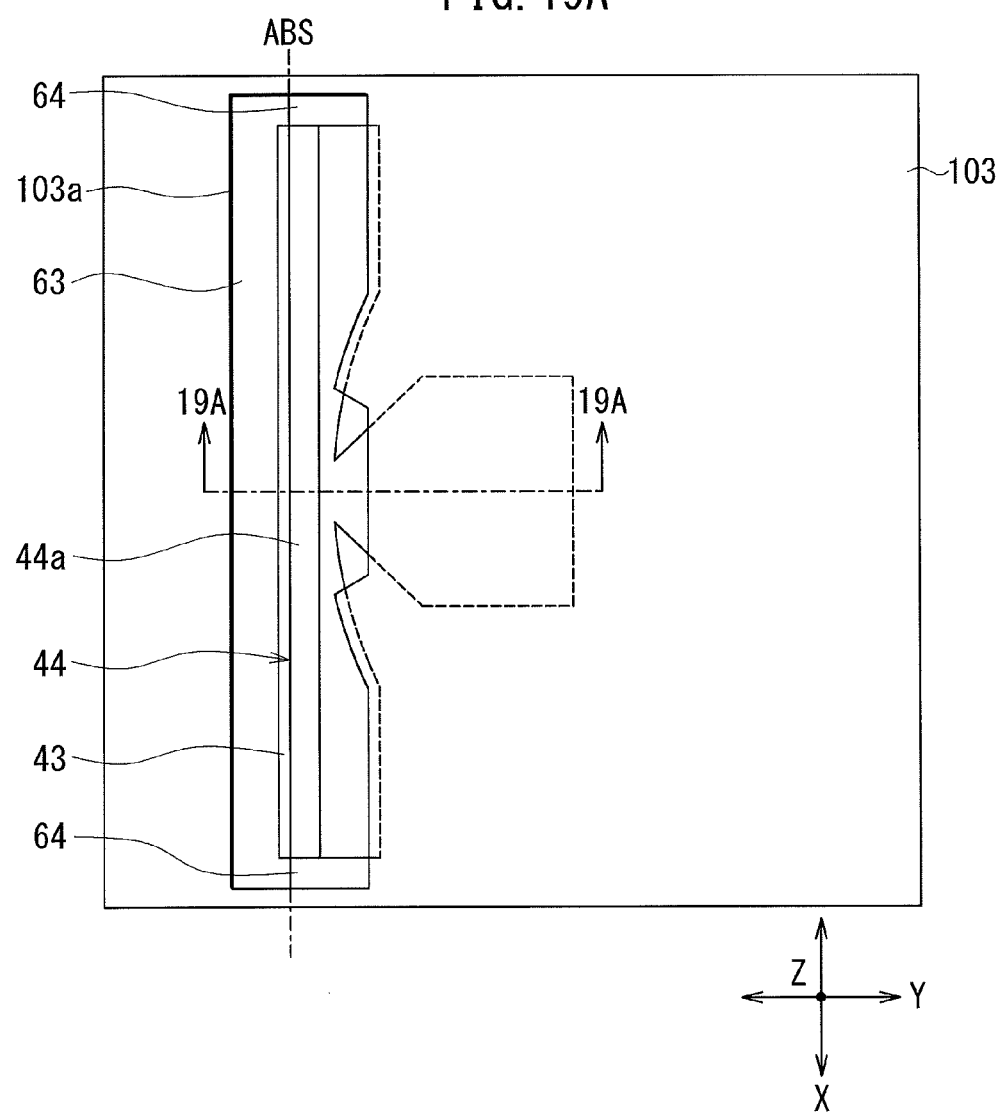
Figure 20A:
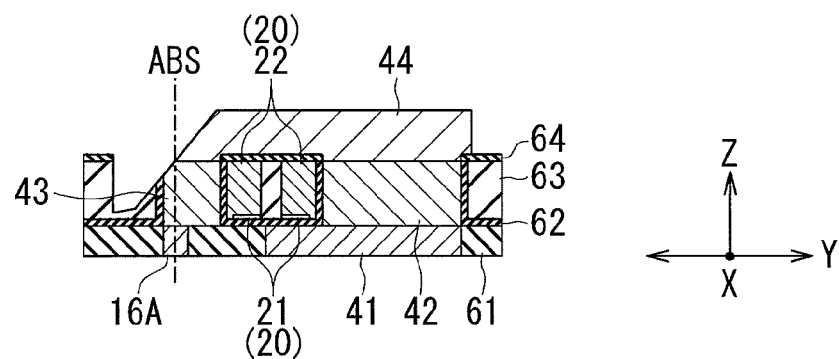
FIG. 20A and FIG. 20B are explanatory diagrams showing a step that follows the step shown in FIG. 19A and FIG. 19B.
Figure 20B:
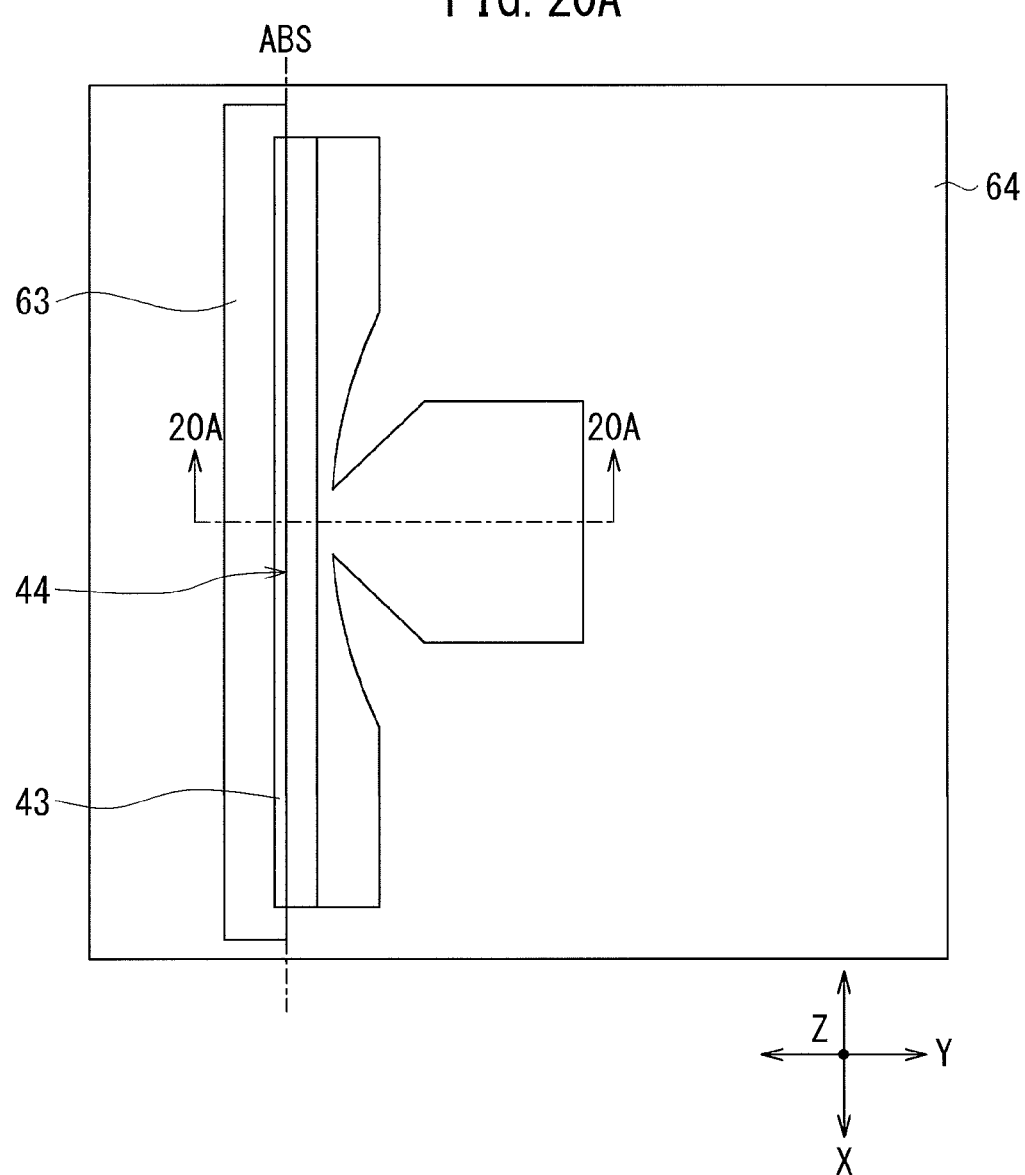

FIG. 19A and FIG. 19B show the next step. In this step, the preliminary coupling portion 44P is etched by, for example, IBE using the etching mask 103 so as to provide the preliminary coupling portion 44P with the end face 44a. This makes the preliminary coupling portion 44P into the coupling portion 44. The etching mask 103 is then removed as shown in FIG. 20A and FIG. 20B.

Steps that follow the step shown in FIG. 20A and FIG. 20B will now be described with reference to FIG. 2 and FIG. 3. First, the nonmagnetic layer 65 is formed over the entire top surface of the stack. The nonmagnetic layer 65 is then polished by, for example, CMP, until the coupling portion 44 is exposed. The top surfaces of the coupling portion 44 and the nonmagnetic layer 65 are thereby made even with each other. Next, the stopper layer 85 is formed over the coupling portion 44 and the nonmagnetic layer 65.

Next, the protective layer 70 is formed to cover the entire top surface of the stack. Wiring, terminals and other components are then formed on the protective layer 70, and the substrate 1 is cut near the location at which the medium facing surface 90 is to be formed. The cut surface is polished into the medium facing surface 90, and then fabrication of flying rails and other processes are performed to complete the magnetic head.

As has been described, the method of manufacturing the magnetic head according to the present embodiment includes the steps of forming the magnetic path forming section M1; forming the first insulating film 62; forming the second insulating film 52; forming the first coil 20; and forming the second coil 10. The step of forming the magnetic path forming section M1 includes the steps of: forming the first magnetic material portion 42 in the first set; forming the second magnetic material portion 43 in the first set; forming the first magnetic material portion 32 in the second set; and forming the second magnetic material portion 33 in the second set. The step of forming the first insulating film 62 forms the first insulating film 62 after the steps of forming the first and second magnetic material portions 42 and 43 in the first set. The step of forming the second insulating film 52 forms the second insulating film 52 after the steps of forming the first and second magnetic material portions 32 and 33 in the second set.

The advantages of the present embodiment will now be described with reference to the step of forming the first coil 20 by way of example. According to the present embodiment, in summary, the first coil 20 is formed in a self-aligned manner by the following method. First, after the step of forming the first insulating film 62, the first mask 101 is formed and then the seed layer 21 is formed selectively on the underlying portion 62C of the first insulating film 62 by using the first mask 101. The first mask 101 is then removed, and thereafter the second mask 102 is formed. Then, the conductive layer 22P for forming the first coil 20 is formed to be received in the opening 102a of the second mask 102 by plating, using the seed layer 21. The second mask 102 is then removed, and thereafter the unwanted portions of the seed layer 21 are removed. Subsequently, the insulating layer 63 covering the conductive layer 22P, the first magnetic material portion 42 and the second magnetic material portion 43 is formed, and polishing is performed on the conductive layer 22P, the first magnetic material portion 42, the second magnetic material portion 43, the first insulating film 62 and the insulating layer 63 to make their top surfaces even with each other. The first coil 20 is thus completed.

According to the present embodiment, the first coil 20 is formed such that the first side surface 20Aa of the first coil element 20A is opposed to the first sidewall 42a of the first magnetic material portion 42 with the first interposition portion 62A of the first insulating film 62 interposed therebetween, and the second side surface 20Ba of the second coil element 20B is opposed to the second sidewall 43a of the second magnetic material portion 43 with the second interposition portion 62B of the first insulating film 62 interposed therebetween. This allows for easily reducing the minimum distance between the first sidewall 42a and the first side surface 20Aa and the minimum distance between the second sidewall 43a and the second side surface 20Ba. As a result, of the magnetic paths from the write shield 16 to the main pole 15, the first magnetic path passing through the first and second magnetic material portions 42 and 43 can be reduced in length easily. The present embodiment thus makes it possible to improve the rate of change in the write magnetic field produced from the first end face 15a of the main pole 15.

The advantages of the present embodiment will be described in more detail below in comparison with a method of manufacturing a magnetic head of a comparative example. First, reference is made to FIG. 21A to FIG. 24B to describe the method of manufacturing the magnetic head of the comparative example. FIG. 21A to FIG. 24B each illustrate part of a stack of layers formed in the process of manufacturing the magnetic head. FIG. nA (n is an integer between 21 and 24 inclusive) shows a cross section of a portion of the stack that appears in the main cross section. FIG. nB shows the top surface of the portion of the stack. The line nA-nA on FIG. nB indicates the location of the cross section shown in FIG. nA. The symbol "ABS" on FIG. 21A to FIG. 24B indicates the location at which the medium facing surface 90 is to be formed.

The method of manufacturing the magnetic head of the comparative example is the same as the method of manufacturing the magnetic head according to the present embodiment up to the step of forming the first insulating film 62. The comparative example then forms a coil of the comparative example in a self-aligned manner as follows.

Figure 21A:
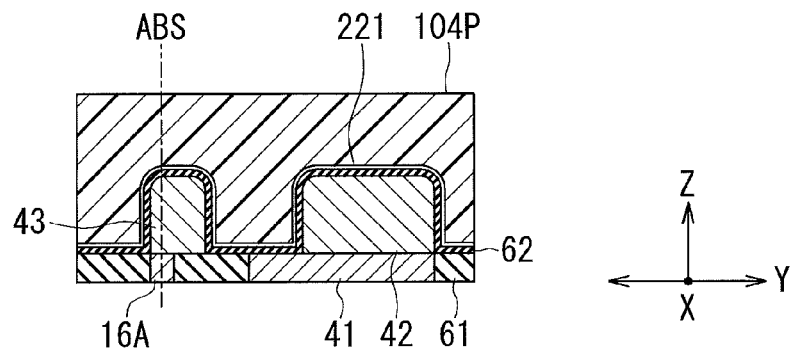
FIG. 21A and FIG. 21B are explanatory diagrams showing a step of a method of manufacturing a magnetic head of a comparative example.
Figure 21B:
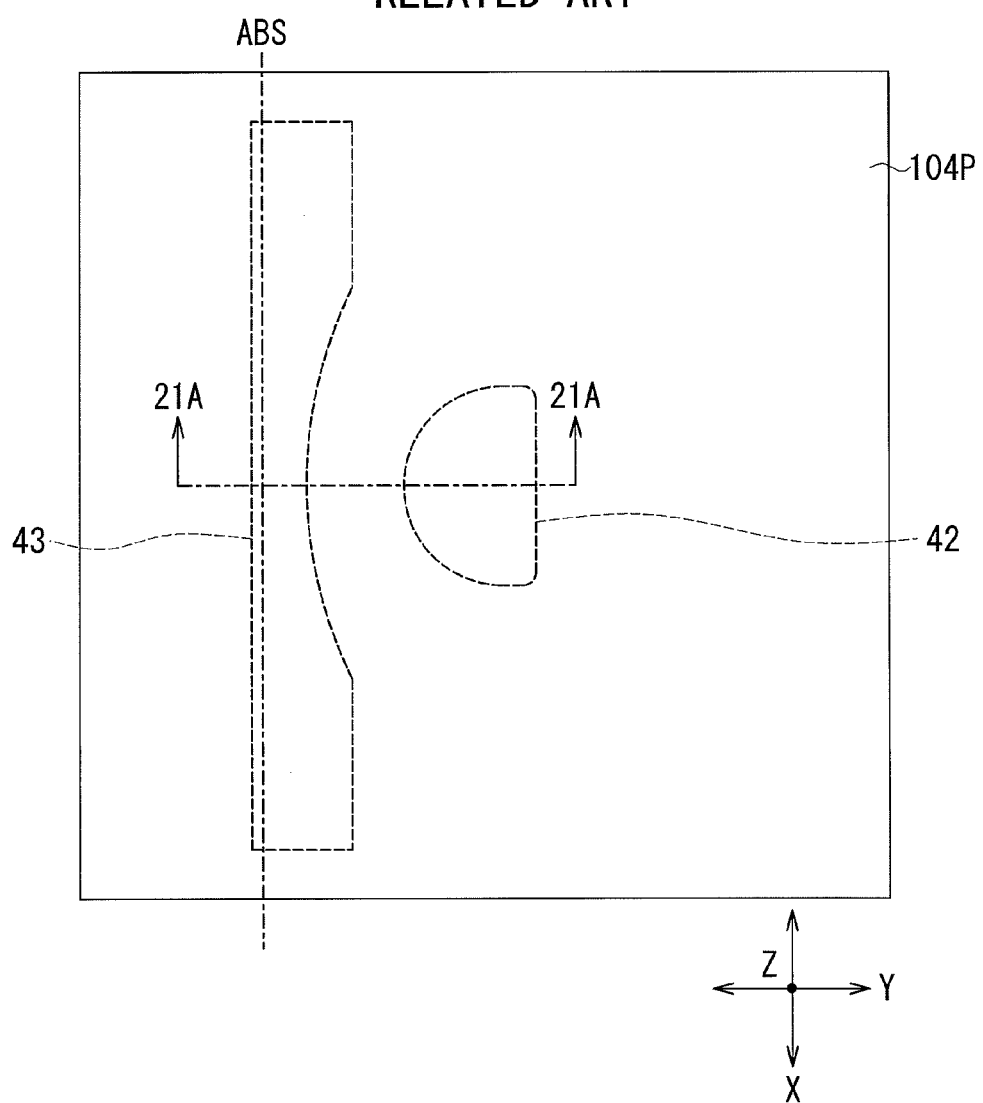

The step of forming the coil of the comparative example starts with forming a seed layer 221 of a conductive material over the entire top surface of the stack as shown in FIG. 21A and FIG. 21B. The seed layer 221 is to be used as a seed and a cathode when forming the main portion of the coil of the comparative example later by plating. A photoresist layer 104P of a photoresist is then formed over the entire top surface of the stack.

Figure 22A:
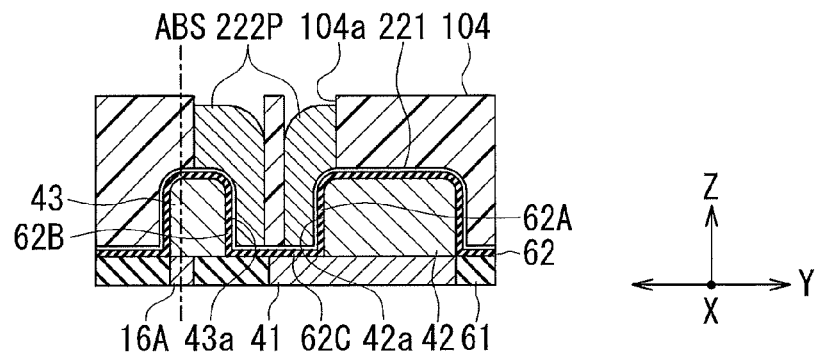
FIG. 22A and FIG. 22B are explanatory diagrams showing a step that follows the step shown in FIG. 21A and FIG. 21B.
Figure 22B:
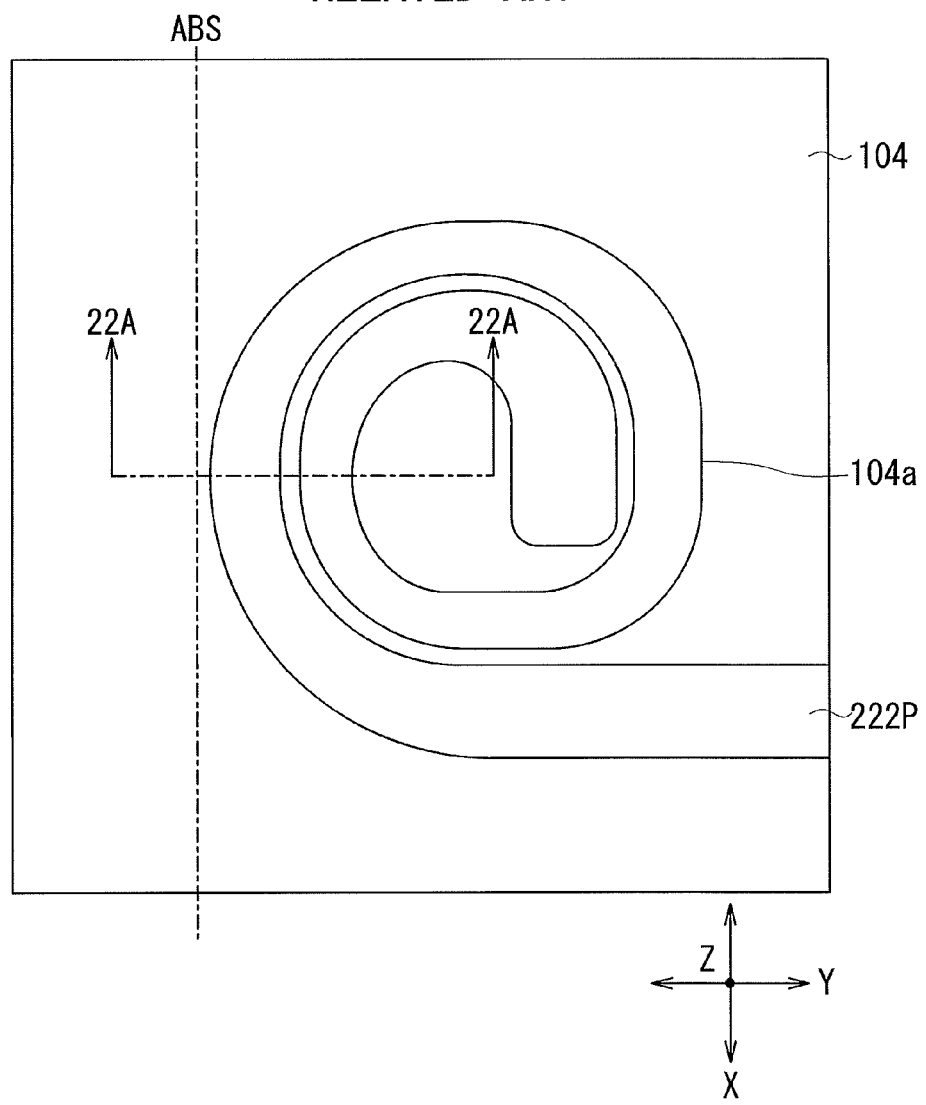

FIG. 22A and FIG. 22B show the next step. In this step, first, the photoresist layer 104P is patterned by photolithography into a mask 104. The mask 104 has an opening 104a intended to receive a conductive layer for forming the coil of the comparative example. The conductive layer 222P for forming the coil of the comparative example is then formed to be received in the opening 104a of the mask 104 by plating, using the seed layer 221 as a seed and a cathode. The conductive layer 222P is formed to contact the first sidewall 42a of the first magnetic material portion 42 and the second sidewall 43a of the second magnetic material portion 43 via the first interposition portion 62A and the second interposition portion 62B of the first insulating film 62, respectively, and such that portions of the conductive layer 222P ride over the first and second magnetic material portions 42 and 43. The mask 104 is then removed.

Figure 23A:
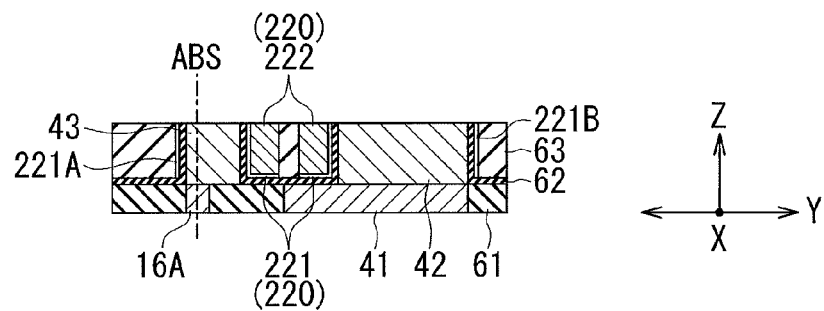
FIG. 23A and FIG. 23B are explanatory diagrams showing a step that follows the step shown in FIG. 22A and FIG. 22B.
Figure 23B:
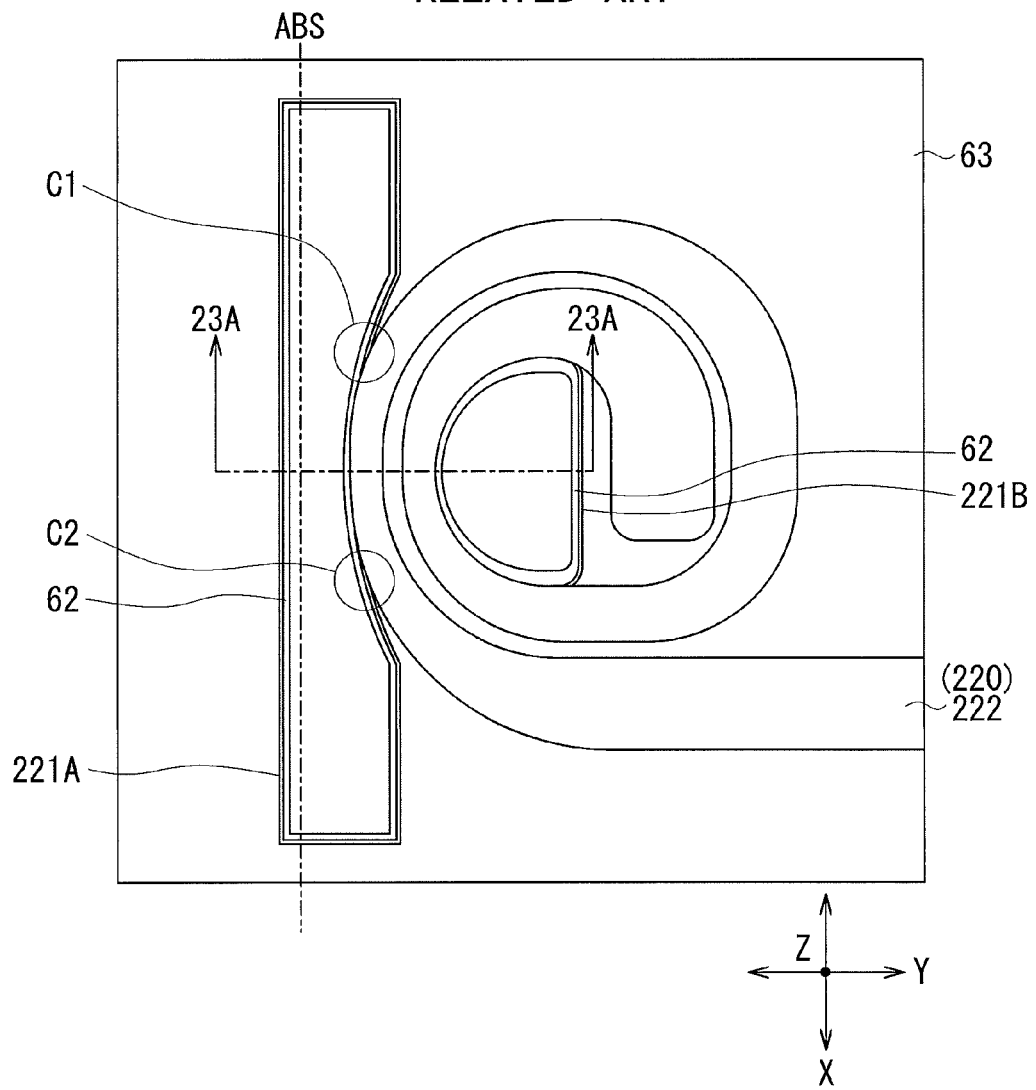

FIG. 23A and FIG. 23B show the next step. This step starts with removing unwanted portions of the seed layer 221, which are portions of the seed layer 221 other than the portion lying under the conductive layer 222P, by wet etching, for example. Next, the insulating layer 63 is formed over the entire top surface of the stack so as to cover the conductive layer 222P, the first magnetic material portion 42 and the second magnetic material portion 43. The conductive layer 222P, the seed layer 221, the first magnetic material portion 42, the second magnetic material portion 43, the first insulating film 62 and the insulating layer 63 are then polished by, for example, CMP, such that the portions of the conductive layer 222P riding over the first and second magnetic material portions 42 and 43 are removed, whereby the top surfaces of the conductive layer 222P, the seed layer 221, the first and second magnetic material portions 42 and 43, the first insulating film 62, and the insulating layer 63 are made even with each other. This completes the coil 220 of the comparative example. The polished conductive layer 222P constitutes the main portion 222 of the coil 220. The shape and location of the coil 220 are the same as those of the first coil 20 of the present embodiment.

Figure 24A:
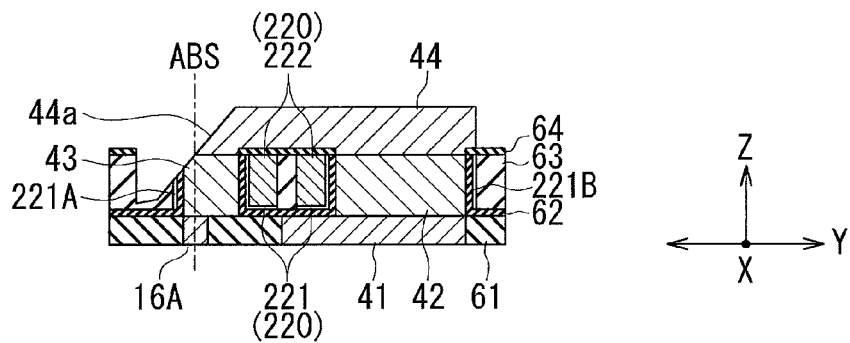
FIG. 24A and FIG. 24B are explanatory diagrams showing a step that follows the step shown in FIG. 23A and FIG. 23B.
Figure 24B:
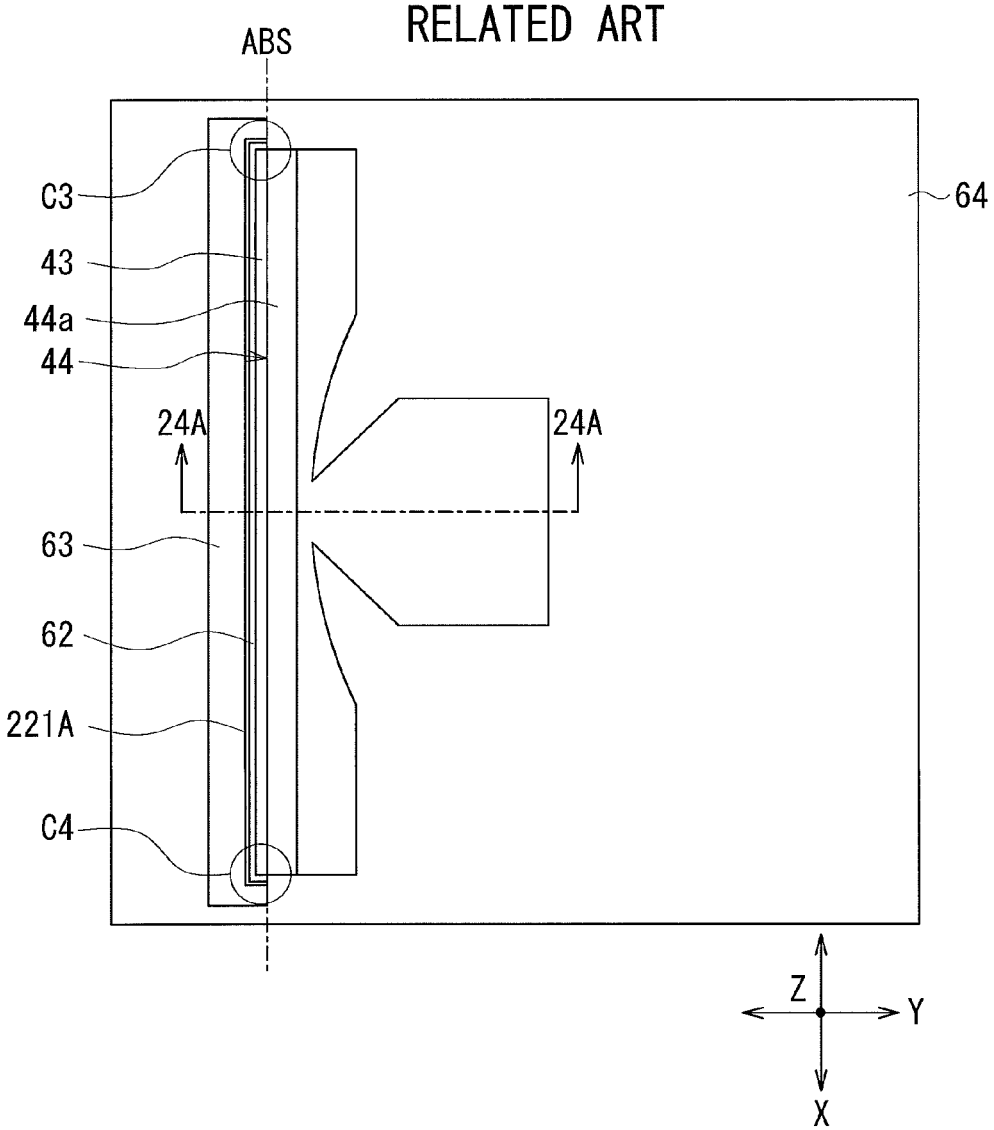

The subsequent steps are the same as those of the method of manufacturing the magnetic head according to the present embodiment. FIG. 24A and FIG. 24B illustrate the stack having undergone the formation of the coupling portion 44 as in the step shown in FIG. 19A and FIG. 19B and thereafter the removal of the etching mask 103 as in the step shown in FIG. 20A and FIG. 20B.

According to the method of manufacturing the magnetic head of the comparative example, as described above, the seed layer 221 is formed over the entire top surface of the stack in the step of forming the coil 220. The comparative example thus has the following first to third problems associated with the seed layer 221.

Figure 25:
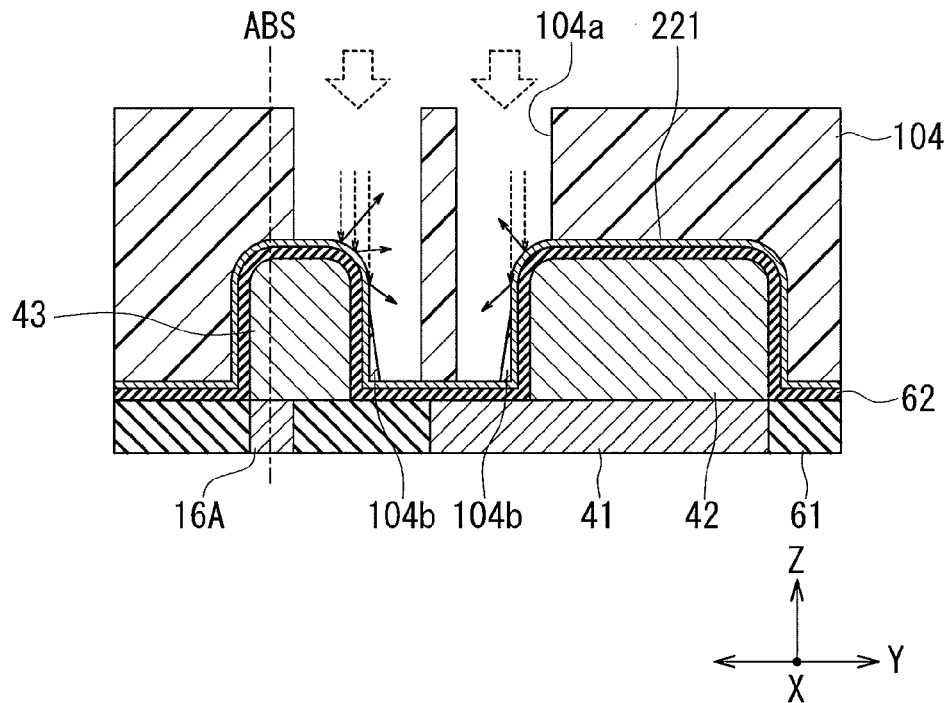
FIG. 25 is an explanatory diagram for explaining a first problem encountered with the comparative example.

The first problem will be described first with reference to FIG. 25. FIG. 25 is an explanatory diagram for explaining the first problem. In the comparative example, as described above, the seed layer 221 and the photoresist layer 104P are formed and then the photoresist layer 104P is patterned to form the mask 104. The method of forming the mask 104 is the same as the method of forming the first mask for use in the step of forming the second coil 10 in the method of manufacturing the magnetic head according to the present embodiment. More specifically, in the step of forming the mask 104, the photoresist layer 104P unpatterned is exposed to light in a predetermined pattern. In the course of the exposure, unwanted reflected light results from the light for exposure being reflected off the portions of the seed layer 221 covering the first and second magnetic material portions 42 and 43. In FIG. 25, the broken arrows indicate the light for exposure, and the solid arrows indicate reflected light. If the unwanted reflected light is generated, it may irradiate a portion of the photoresist layer 104P that should not be irradiated with light. As a result, the precision of the pattern of the mask 104 will suffer to decrease the process margin for forming the mask 104. This is the first problem.

According to the present embodiment, in contrast, the seed layer 21 is formed selectively on the underlying portion 62C of the first insulating film 62, and not formed on the portions of the first insulating film 62 covering the first and second magnetic material portions 42 and 43. The present embodiment thus allows for preventing the generation of the unwanted reflected light, thereby allowing for preventing the first problem.

Further, in the comparative example, because the portions of the seed layer 221 covering the first and second magnetic material portion 42 and 43 may generate the unwanted reflected light and/or absorb the light for exposure, the energy of the light for exposure may decrease to become less likely to reach the bottom of the photoresist layer 104P. In that case, after the development of the photoresist layer 104P, portions of the photoresist layer 104P that should have been removed may remain as residual portions 104b along the portions of the seed layer 221 covering the first and second magnetic material portions 42 and 43 in the vicinity of the bottom of the photoresist layer 104P. The residual portions 104b can be removed by ashing, for example. In this case, however, the mask 104 will also be partly removed to become smaller in thickness. This also decreases the process margin for forming the mask 104 in the comparative example.

In the comparative example, if the energy of the light for exposure is increased to prevent the residual portions 104b, the unwanted reflected light also increases in energy. Increasing the energy of the light for exposure is thus hard to employ in the comparative example.

Figure 26:
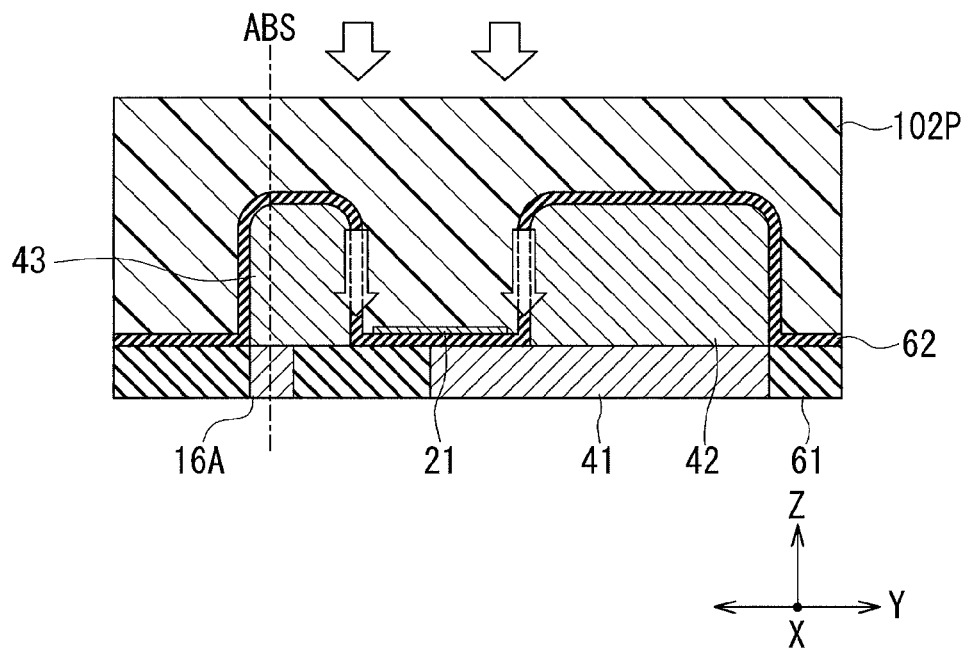
FIG. 26 is an explanatory diagram for explaining the advantages of the first embodiment of the invention.

According to the present embodiment, in contrast, since it is possible to prevent the generation of the unwanted reflected light, the energy of the light for exposure is more likely to reach the bottom of the photoresist layer 102P. Further, increasing the energy of the light for exposure is possible in the present embodiment. This makes it easier for the energy of the light for exposure to reach the bottom of the photoresist layer 102P. FIG. 26 is an explanatory diagram for explaining the advantages of the present embodiment. The hollow arrows on FIG. 26 indicate the light for exposure. In the present embodiment, as shown in FIG. 26, the light for exposure passes through the portions of the insulating film 62 covering the first and second magnetic material portions 42 and 43. This also makes it easier for the energy of the light for exposure to reach the bottom of the photoresist layer 102P, without having to make the energy of the light for exposure any higher than necessary. Thus, the present embodiment allows for preventing the generation of any unwanted residual portion of the photoresist layer 102P after the development thereof, thereby eliminating the need for removing such a residual portion. Consequently, the present embodiment is able to increase the process margin for forming the second mask 102.

Further, when compared with the comparative example, the present embodiment allows for more precise formation of the second mask 102. Specifically, according to the present embodiment, it is possible to form the second mask 102 such that the distance between the first coil element 20A and the second coil element 20B (see FIG. 1 and FIG. 5) will be smaller than in the comparative example. Consequently, according to the present embodiment, of the magnetic paths from the write shield 16 to the main pole 15, the first magnetic path (see FIG. 1 and FIG. 2) passing through the first and second magnetic material portions 42 and 43 can be made even smaller in length.

Next, the second problem will be described. According to the comparative example, in the step of forming the conductive layer 222P by plating, the conductive layer 222P grows not only from the portion of the seed layer 221 lying between the first and second magnetic material portions 42 and 43 but also from the portions of the seed layer 221 covering the first and second magnetic material portions 42 and 43. Consequently, as shown in FIG. 22A, the conductive layer 222P becomes thick in its portions riding over the first and second magnetic material portions 42 and 43. The portions of the conductive layer 222P riding over the first and second magnetic material portions 42 and 43 will be referred to as the riding portions. The portion of the conductive layer 222P lying between the first and second magnetic material portions 42 and 43 is polished into the main portion 222 of the coil 220 of the comparative example in the step shown in FIG. 23A and FIG. 23B. On the other hand, the riding portions of the conductive layer 222P are unwanted portions, and are thus removed in the step shown in FIG. 23A and FIG. 23B together with the insulating layer 63 covering the conductive layer 222P.

Attempts to provide the coil 220 with a sufficiently large thickness and attain a sufficiently large polishing margin would involve increasing the thickness of the portion of the conductive layer 222P lying between the first and second magnetic material portions 42 and 43. This would also increase the thickness of the riding portions of the conductive layer 222P. In such a case, the mask 104 needs to have a large thickness so that the opening 104a of the mask 104 can accommodate the thick conductive layer 222P. This results in lower precision of the pattern of the mask 104, thereby reducing the process margin for forming the mask 104. Further, an increase in the thickness of the riding portions of the conductive layer 222P would increase the amount of polishing that the conductive layer 222P and the insulating layer 63 require in order that the riding portions be removed. This results in lower precision of the polishing process, thereby reducing the polishing process margin. The second problem is the reductions in the process margin for forming the mask 104 and the polishing process margin.

According to the present embodiment, in contrast, the seed layer 21 is not formed on the portions of the first insulating film 62 covering the first and second magnetic material portions 42 and 43, as previously described. According to the present embodiment, as shown in FIG. 11A, the portions of the conductive layer 22P riding over the first and second magnetic material portions 42 and 43 are thus smaller in thickness than the riding portions of the conductive layer 222P of the comparative example. When compared with the comparative example, the present embodiment thus allows for making the second mask 102 smaller in thickness, thereby increasing the process margin for forming the second mask 102. Further, when compared with the comparative example, the present embodiment allows for reducing the amount of polishing that the conductive layer 22P and the insulating layer 63 require. The present embodiment thus makes it possible to increase the polishing process margin. Prevention of the second problem is thus possible according to the present embodiment.

In the comparative example, the coil 220 increases in resistance if its thickness cannot be sufficiently large due to the second problem. In contrast, the present embodiment is able to provide the first coil 20 with a sufficiently large thickness while preventing the second problem. Consequently, the present embodiment allows the first coil 20 to be low in resistance.

Next, the third problem will be described. The third problem relates to the removal of the unwanted portions of the seed layer 221 as described below. In the comparative example, the unwanted portions of the seed layer 221 include portions of the seed layer 221 covering the first and second magnetic material portions 42 and 43, and thus extend over a large area. The comparative example removes the unwanted portions by, for example, wet etching, which gives rise to problems that the conductive layer 222P is also etched to result in a smaller winding width of the coil 220, and voids are created inside the coil 220. If the etching time is reduced to prevent such problems, the unwanted portions may not be completely removed, which gives rise to the problem that the residual unwanted portions of the seed layer may cause a short circuit between the magnetic path forming section M1 and the coil 220 which should be insulated from each other, and/or between a plurality of coil elements of the coil 220 which should be insulated from each other.

Further, in the comparative example, a problem will arise if the removal of the unwanted portions of the seed layer 221 is performed by dry etching such as IBE, instead of wet etching. The problem is that, in the step of removing the unwanted portions, flying substances generated by the etching may deposit onto the portions of the first insulating film 62 covering the first and second magnetic material portions 42 and 43, thereby forming redeposit films having conductivity, and the redeposit films may cause a short circuit between the magnetic path forming section M1 and the coil 220 which should be insulated from each other.

Of the unwanted portions of the seed layer 221, portions extending in the direction perpendicular to the top surface 1a of the substrate 1 (the Z direction) are difficult to remove by IBE. In the comparative example, residual unwanted portions which could not be removed by IBE may also cause a short circuit between the magnetic path forming section M1 and the coil 220 which should be insulated from each other.

Reference is now made to FIG. 23A to FIG. 24B to describe the occurrence of a short circuit between the magnetic path forming section M1 and the coil 220 in detail. Hereinafter, the redeposit films or the residual unwanted portions will be referred to as unwanted conductor portions. In FIG. 23A to FIG. 24B, the reference symbols 221A and 221B indicate the unwanted conductor portions. The unwanted conductor portion 221A adheres to the portion of the first insulating film 62 covering the second magnetic material portion 43. The unwanted conductor portion 221B adheres to the portion of the first insulating film 62 covering the first magnetic material portion 42. The unwanted conductor portions 221A and 221B both extend in the direction perpendicular to the top surface 1a of the substrate 1 (the Z direction). In the step shown in FIG. 23A and FIG. 23B, the unwanted conductor portions 221A and 221B may be conducted to the main portion 222 of the coil 220. The circles labeled C1 and C2 on FIG. 23B indicate locations at which conduction between the unwanted conductor portion 221A and the main portion 222 may occur.

The unwanted conductor portion 221A is covered with the insulating layer 64 after the step shown in FIG. 23A and FIG. 23B. Subsequently, in the step of providing the preliminary coupling portion 44P with the end face 44a by etching, the insulating layer 64 is etched to expose portions of the unwanted conductor portion 221A extending along the first, third and fourth edges 43E1, 43E3 and 43E4 (FIG. 6B) of the periphery of the second magnetic material portion 43. In the aforementioned step, burrs may be generated by the etching in the vicinity of the end face 44a of the coupling portion 44, and/or flying substances resulting from the etching may deposit onto the wall faces of the etched groove of the insulating film 63 to form redeposit films derived from the material forming the coupling portion 44. Then, conduction may occur between the unwanted portion 221A and the coupling portion 44 via the burrs and/or the redeposit films. The circles labeled C3 and C4 on FIG. 24B indicate locations at which conduction between the unwanted conductor portion 221A and the coupling portion 44 may occur. If conduction occurs between the unwanted conductor portion 221A and the coupling portion 44, a short circuit will occur, via the conductor portion 221A, between the coil 220 and the magnetic path forming section M1 including the coupling portion 44, which should be insulated from each other.

According to the present embodiment, in contrast, the seed layer 21 is formed selectively on the underlying portion 62C using the first mask 101, as described previously. Thus, the seed layer 21 is not formed on the portions of the first insulating film 62 covering the first and second magnetic material portions 42 and 43. Consequently, even if IBE is employed to remove the unwanted portions of the seed layer 21, the present embodiment is free from the problem encountered with the comparative example when removing the unwanted portions of the seed layer 221 by IBE. Further, according to the present embodiment, employing IBE to remove the unwanted conductive film 121 makes it possible to prevent problems such as a reduction in winding width of the first coil 20 and the formation of voids inside the first coil 20.

If the unwanted portions of the seed layer 21 are present near the second magnetic material portion 43, flying substances that result from the etching in the step of removing the unwanted portions of the seed layer 21 by IBE may deposit onto the portion of the first insulating film 62 covering the second magnetic material portion 43, thereby forming a redeposit film having conductivity. The formation of the redeposit film may give rise to the same problem as in the comparative example, which has been described with reference to FIG. 23A and FIG. 24B.

To prevent the aforementioned problem, it is effective to locate the three portions of the periphery of the second portion 101B of the first mask 101 that are respectively parallel to the first, third and fourth edges 43E1, 43E3 and 43E4 of the periphery of the second magnetic material portion 43 at a distance of 100 μm or more from the first, third and fourth edges 43E1, 43E3 and 43E4, respectively. This will bring the unwanted portions of the seed layer 21 sufficiently away from the first, third and fourth edges 43E1, 43E3 and 43E4. As a result, in the step of removing the unwanted portions of the seed layer 21 by IBE, it is possible to prevent any redeposit film from being formed along the first, third and fourth edges 43E1, 43E3 and 43E4. Consequently, the present embodiment allows for forming the first coil 20 in a self-aligned manner while preventing the problems associated with the seed layer 21.

The above descriptions on the first coil 20 apply also to the second coil 10. The present embodiment allows for forming the second coil 10 in a self-aligned manner while preventing the problems associated with the seed layer 11.

Second Embodiment

A method of manufacturing a magnetic head according to a second embodiment of the invention will now be described. In the method of manufacturing the magnetic head according to the present embodiment, the step of forming the second mask for use in the step of forming the first coil 20 is different from that in the first embodiment.

The step of forming the second mask in the present embodiment will now be described in detail with reference to FIG. 27A to FIG. 29B. FIG. 27A to FIG. 29B each illustrate part of a stack of layers formed in the process of manufacturing the magnetic head. FIG. nA (n is an integer between 27 and 29 inclusive) shows a cross section of a portion of the stack that appears in the main cross section. FIG. nB shows the top surface of the portion of the stack. The line nA-nA on FIG. nB indicates the location of the cross section shown in FIG. nA. The symbol "ABS" on FIG. 27A to FIG. 29B indicates the location at which the medium facing surface 90 is to be formed.

Figure 27A:
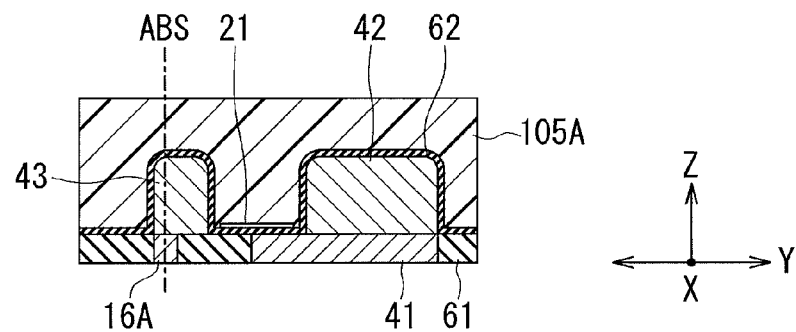
FIG. 27A and FIG. 27B are explanatory diagrams showing a step of a method of manufacturing a magnetic head according to a second embodiment of the invention.
Figure 27B:
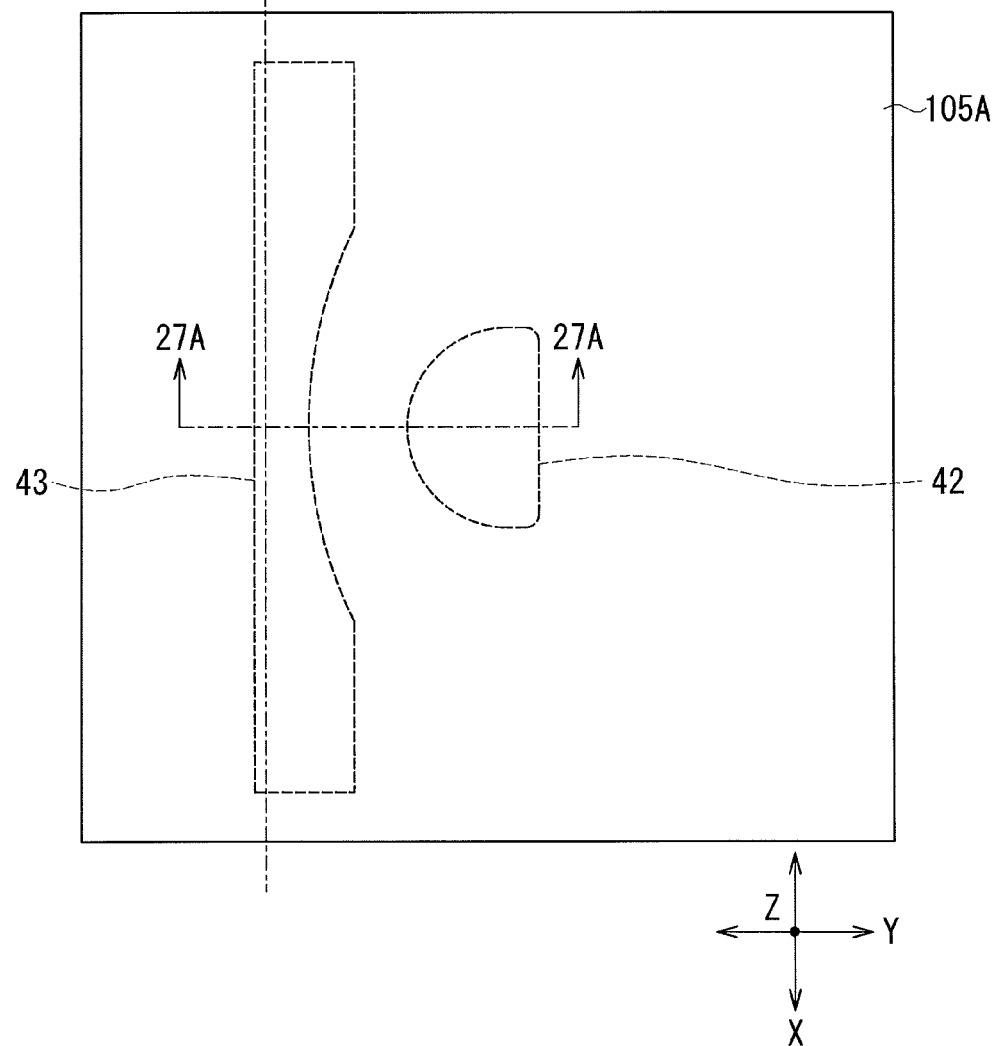

The method of manufacturing the magnetic head according to the present embodiment is the same as the method according to the first embodiment up to the step of removing the first mask 101 (see FIG. 8A and FIG. 8B). FIG. 27A and FIG. 27B show the next step. In this step, first, a photoresist layer 105A of a photoresist is formed over the entire top surface of the stack. The photoresist layer 105A is then cured by heating.

Figure 28A:
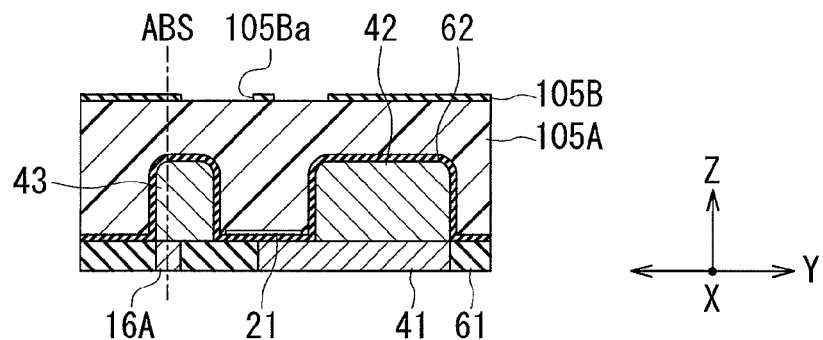
FIG. 28A and FIG. 28B are explanatory diagrams showing a step that follows the step shown in FIG. 27A and FIG. 27B.
Figure 28B:
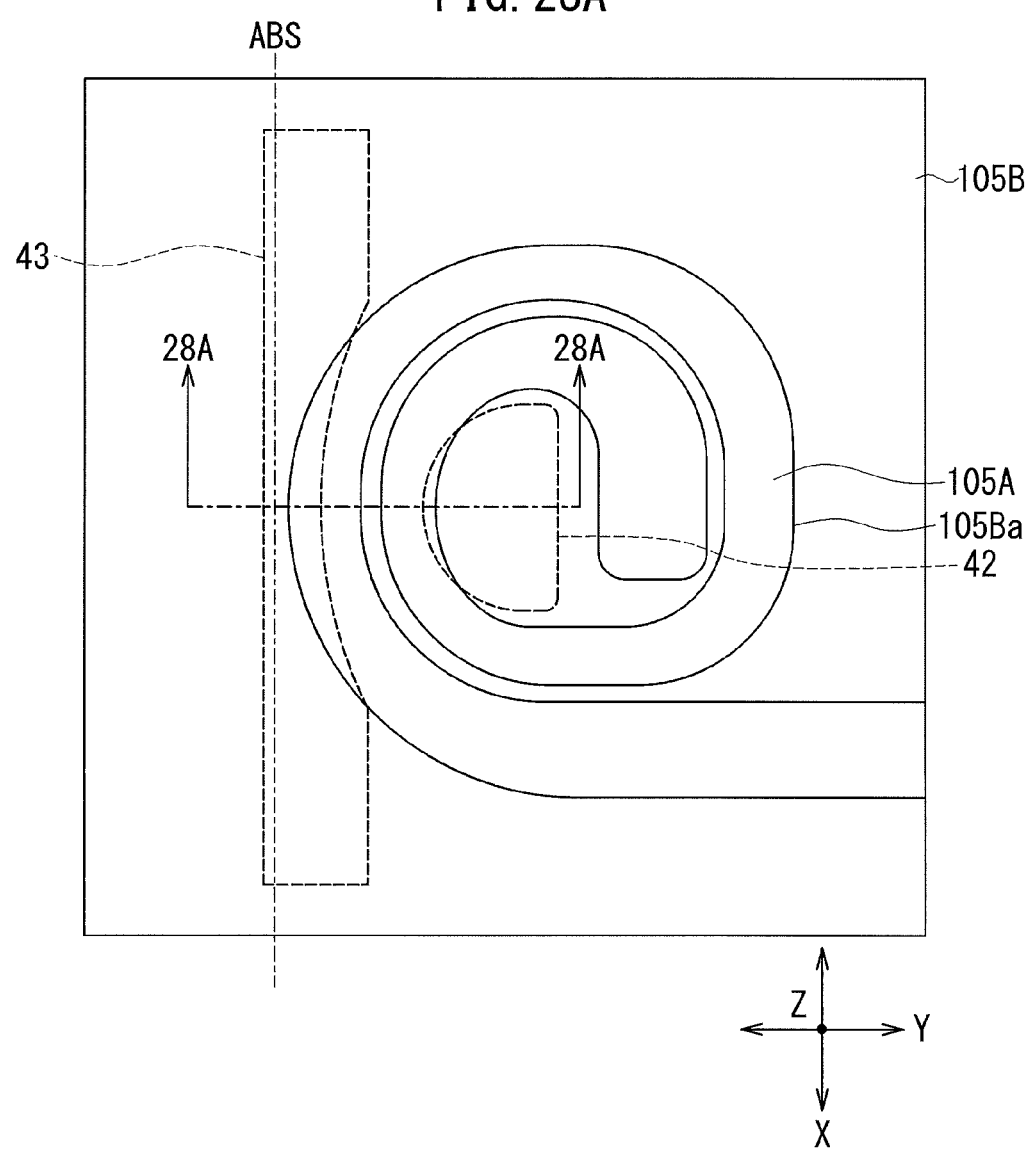

FIG. 28A and FIG. 28B show the next step. In this step, an etching mask layer 105B is formed on the photoresist layer 105A. The etching mask layer 105B has an opening 105Ba shaped to correspond to the planar shape of the opening of the second mask to be formed later. Part of the edge of the opening 105Ba is located above the first and second magnetic material portions 42 and 43. The etching mask layer 105B is formed of, for example, a metal material or an inorganic insulating material such as alumina or silicon oxide ($SiO_2$).

Figure 29A:
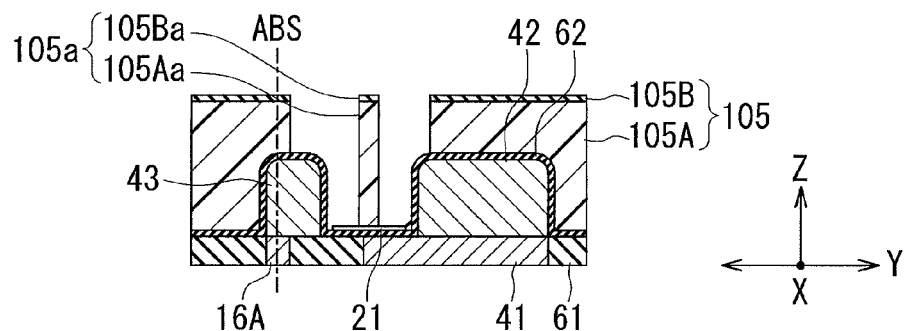
FIG. 29A and FIG. 29B are explanatory diagrams showing a step that follows the step shown in FIG. 28A and FIG. 28B.
Figure 29B:
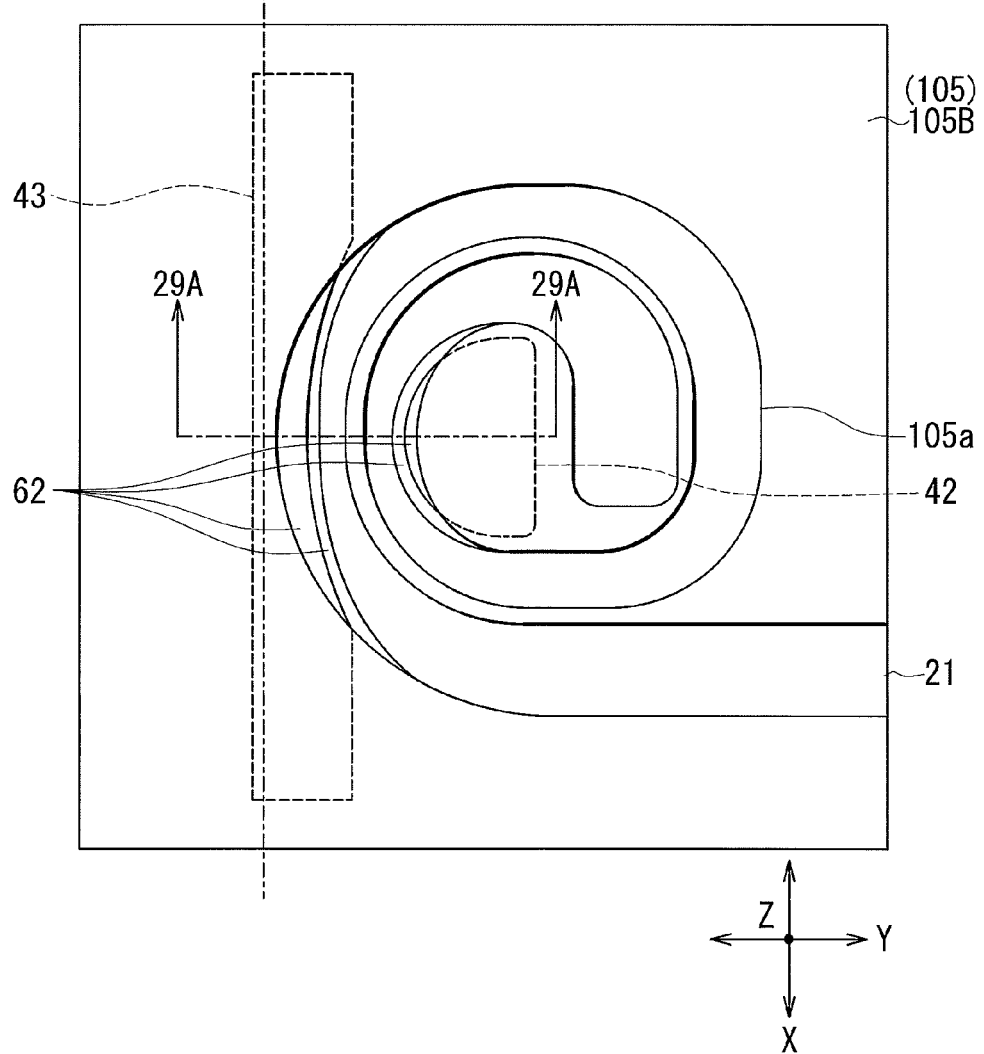

FIG. 29A and FIG. 29B show the next step. In this step, the photoresist layer 105A is etched by RIE using the etching mask layer 105B to remove a portion of the photoresist layer 105A that is exposed from the opening 105Ba of the etching mask layer 105B. An opening 105Aa is thereby formed in the photoresist layer 105A. The opening 105Aa is shaped to correspond to the planar shape of the opening of the second mask to be formed later. To etch the photoresist layer 105A by RIE, a gas containing $O_2$ or a gas containing $O_2$ and $CF_4$ is used as the etching gas. Forming the opening 105Aa in the photoresist layer 105A brings the second mask 105 to completion. The second mask 105 is constituted by the etched photoresist layer 105A and etching mask layer 105B. The second mask 105 has an opening 105a intended to receive the conductive layer 22P. The opening 105a is constituted by the opening 105Aa of the photoresist layer 105A and the opening 105Ba of the etching mask layer 105B.

According to the present embodiment, the second mask 105 is formed by etching the photoresist layer 105A using the etching mask layer 105B. When compared with the second mask 102 of the first embodiment, the etching mask layer 105B can be formed with higher precision. The present embodiment thus allows for more precise formation of the second mask 105 when compared with the first embodiment. Specifically, according to the present embodiment, it is possible to form the second mask 105 such that the distance between the first coil element 20A and the second coil element 20B (see FIG. 1 and FIG. 5) of the first coil 20 will be smaller than in the first embodiment. Consequently, according to the present embodiment, of the magnetic paths from the write shield 16 to the main pole 15, the first magnetic path (see FIG. 1 and FIG. 2) passing through the first and second magnetic material portions 42 and 43 can be made even smaller in length.

The method of forming the second mask 105 is applicable to the formation of the second mask for use in the step of forming the second coil 10. The remainder of configuration, function and effects of the present embodiment are similar to those of the first embodiment.

Third Embodiment

Figure 30:
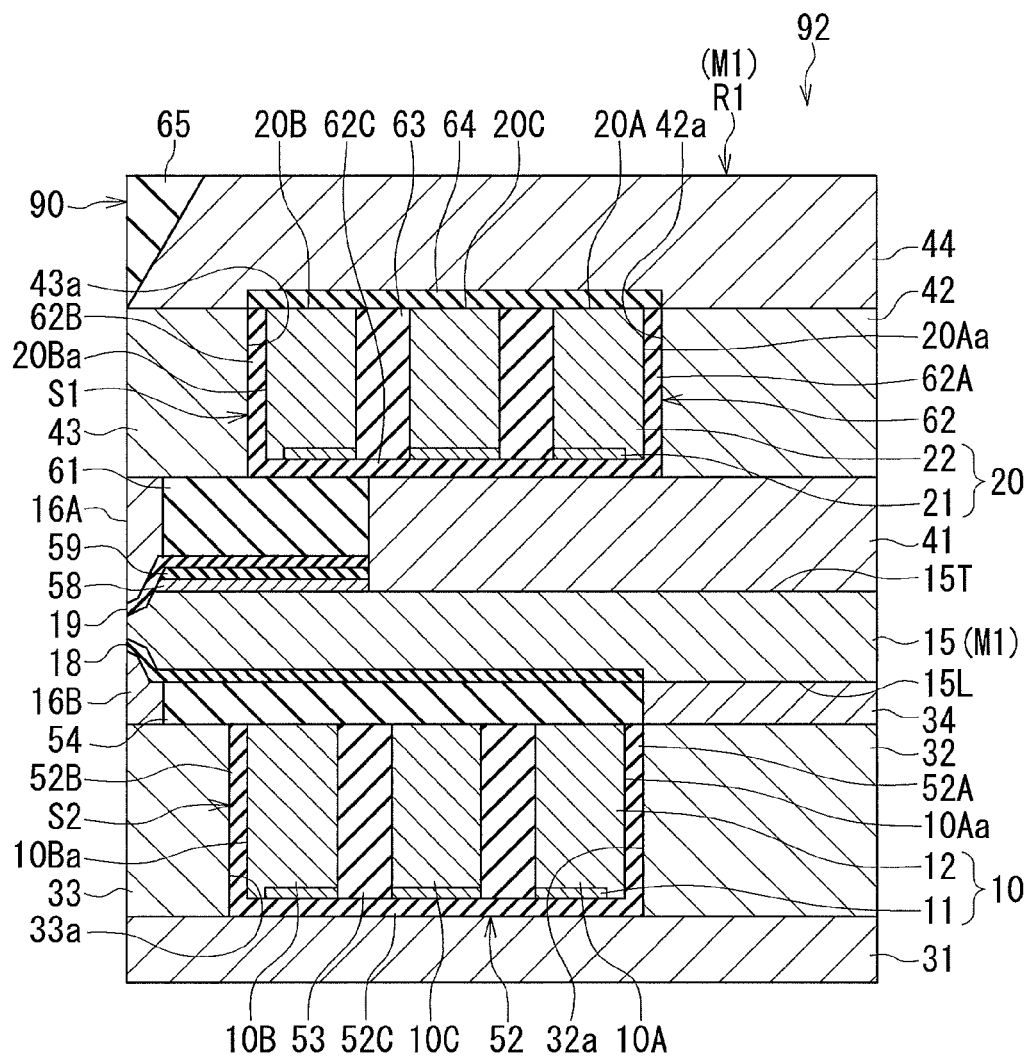
FIG. 30 is a cross-sectional view showing the write head unit of a magnetic head according to a third embodiment of the invention.
Figure 31:
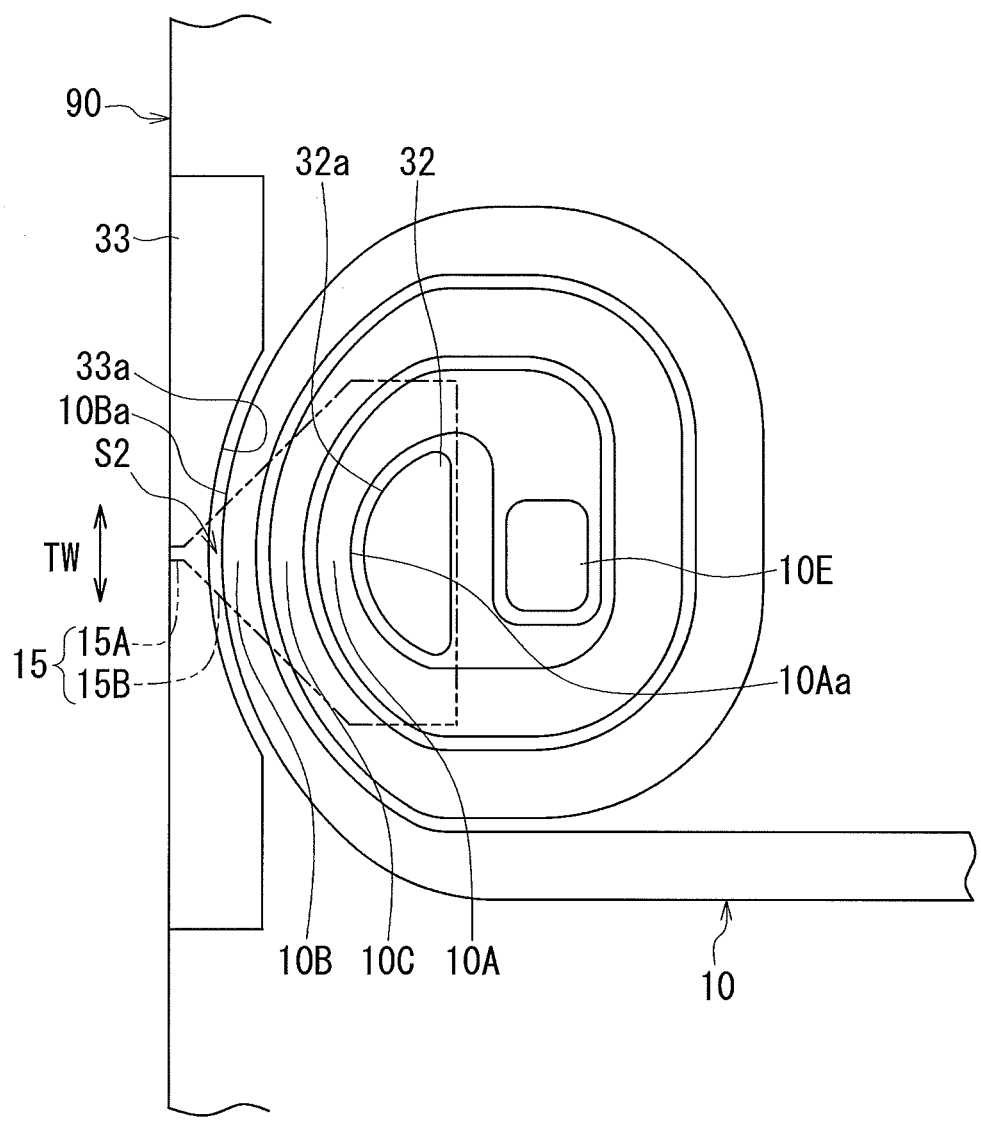
FIG. 31 is a plan view showing the second coil of the magnetic head according to the third embodiment of the invention.
Figure 32:
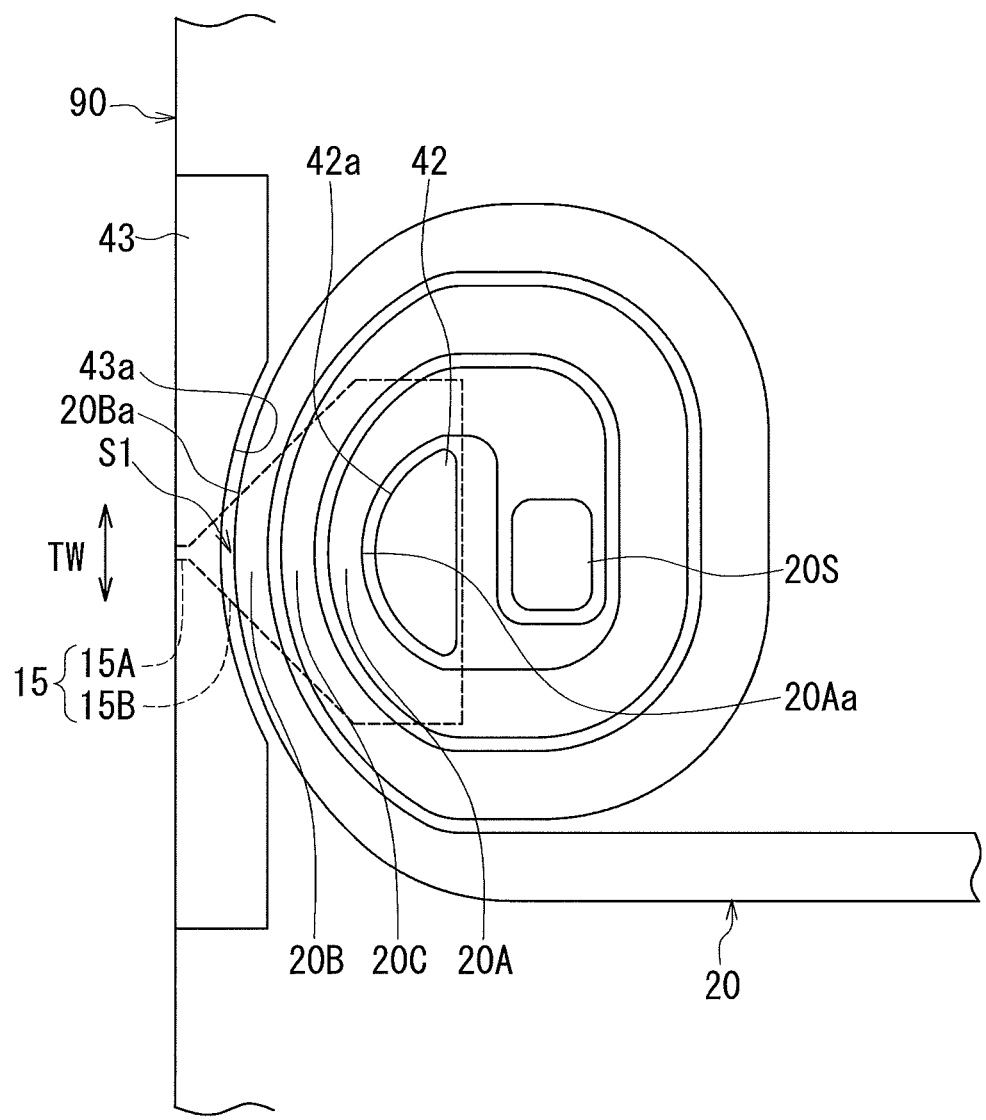
FIG. 32 is a plan view showing the first coil of the magnetic head according to the third embodiment of the invention.

A magnetic head according to a third embodiment of the invention will now be described with reference to FIG. 30 to FIG. 32. FIG. 30 is a cross-sectional view showing the write head unit of the magnetic head according to the present embodiment. Note that FIG. 30 shows the main cross section. FIG. 31 is a plan view showing the second coil of the magnetic head according to the present embodiment. FIG. 32 is a plan view showing the first coil of the magnetic head according to the present embodiment. The arrow labeled TW on each of FIG. 31 and FIG. 32 indicates the track width direction.

In the present embodiment, the first coil 20 and the second coil 10 are configured differently than the first embodiment. First, the configuration of the first coil 20 and the positional relationship of the first coil 20 with the first magnetic material portion 42, the second magnetic material portion 43 and the coupling portion 44 in the first set will be described with reference to FIG. 30 to FIG. 32. In the present embodiment, the first coil 20 is wound approximately three times around the first magnetic material portion 42. The first coil 20 includes the first and second coil elements 20A and 20B, and a third coil element 20C in addition, as the one or more coil elements located between the first magnetic material portion 42 and the second magnetic material portion 43. The first to third coil elements 20A, 20B and 20C are arranged in the direction perpendicular to the medium facing surface 90, in the order of the second coil element 20B, the third coil element 20C, and the first coil element 20A from the medium facing surface 90 side. As shown in FIG. 30, the first to third coil elements 20A, 20B and 20C are located on the rear side in the direction T of travel of the recording medium 100 relative to the coupling portion 44.

Next, the configuration of the second coil 10 and the positional relationship of the second coil 10 with the first magnetic material portion 32, the second magnetic material portion 33 and the coupling portion 31 in the second set will be described with reference to FIG. 30 and FIG. 31. In the present embodiment, the second coil 10 is wound approximately three times around the first magnetic material portion 32. The second coil 10 includes the first and second coil elements 10A and 10B, and a third coil element 10C in addition, as the one or more coil elements located between the first magnetic material portion 32 and the second magnetic material portion 33. The first to third coil elements 10A, 10B and 10C are arranged in the direction perpendicular to the medium facing surface 90, in the order of the second coil element 10B, the third coil element 10C, and the first coil element 10A from the medium facing surface 90 side. As shown in FIG. 30, the first to third coil elements 10A, 10B and 10C are located on the front side in the direction T of travel of the recording medium 100 relative to the coupling portion 31.

In the method of manufacturing the magnetic head according to the present embodiment, as in the first embodiment, a conductive layer for forming the first coil 20 is formed in the step of forming the first coil 20 such that the conductive layer is received in the opening of the second mask. A portion of the conductive layer that is to later become the third coil element 20C has a smaller thickness than portions of the conductive layer that are to later become the first and second coil elements 20A and 20C. If the method of manufacturing the magnetic head of the comparative example described in the first embodiment section is used to form the first coil 20 of the present embodiment, attempts to provide the third coil element 20C with a sufficiently large thickness and attain a sufficiently large polishing margin would increase the thickness of the portions of the conductive layer riding over the first and second magnetic material portions 42 and 43. This will result in the second problem of the comparative example described in the first embodiment section.

According to the present embodiment, in contrast, even in the case of making the thickness of the third coil element 20C sufficiently large, the thickness of the portions of the conductive layer riding over the first and second magnetic material portions 42 and 43 is smaller than in the comparative example, as described in the first embodiment section. The present embodiment thus allows for preventing the second problem.

The above descriptions on the first coil 20 apply also to the second coil 10.

In the present embodiment, the second mask for use in the step of forming the first coil 20 and the second mask for use in the step of forming the second coil 10 may be formed by the same method as the method of forming the second mask 105 in the second embodiment. The remainder of configuration, function and effects of the present embodiment are similar to those of the first or second embodiment.

Fourth Embodiment

Figure 33:
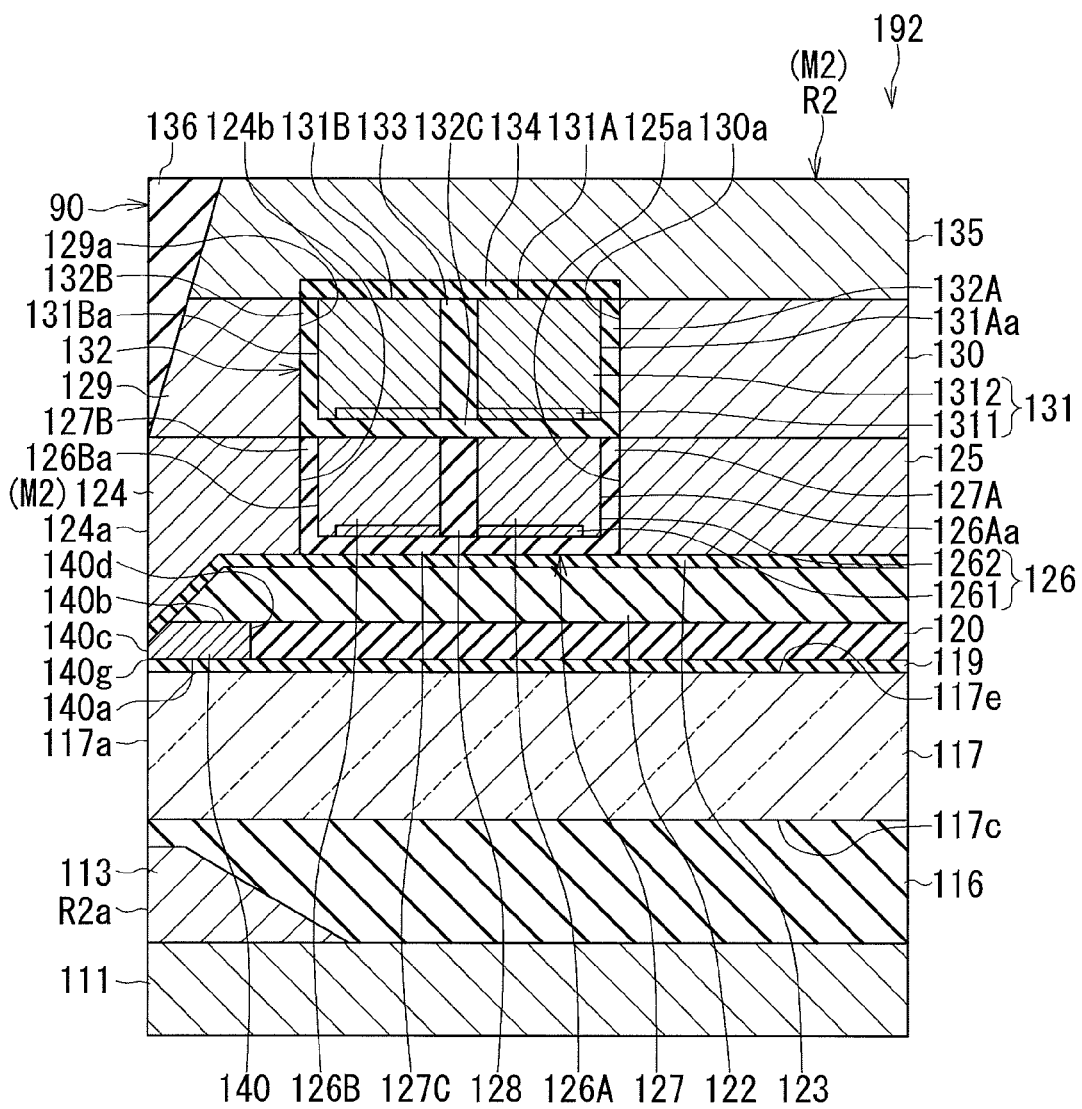
FIG. 33 is a cross-sectional view showing the write head unit of a magnetic head according to a fourth embodiment of the invention.
Figure 34:
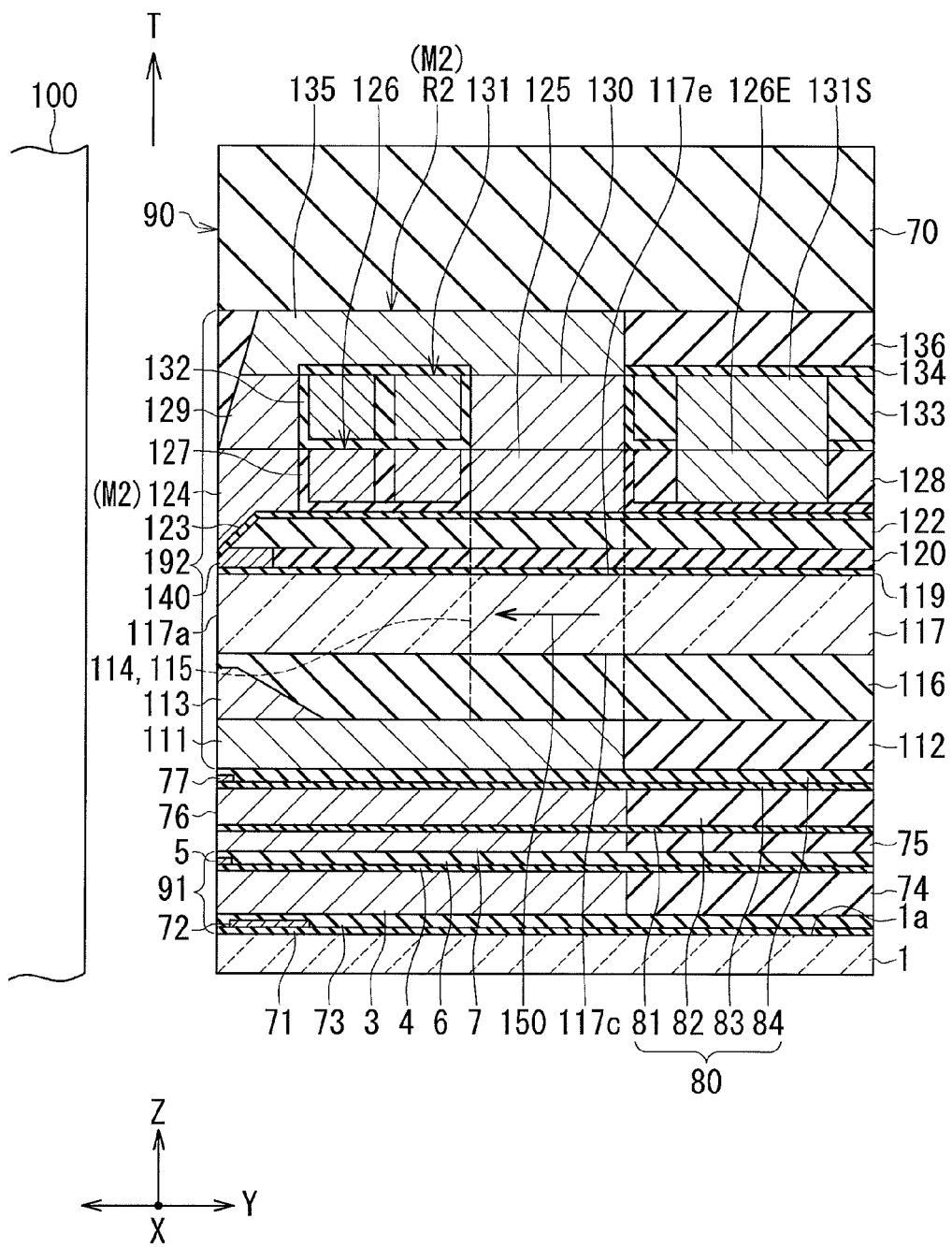
FIG. 34 is a cross-sectional view showing the configuration of the magnetic head according to the fourth embodiment of the invention.
Figure 35:
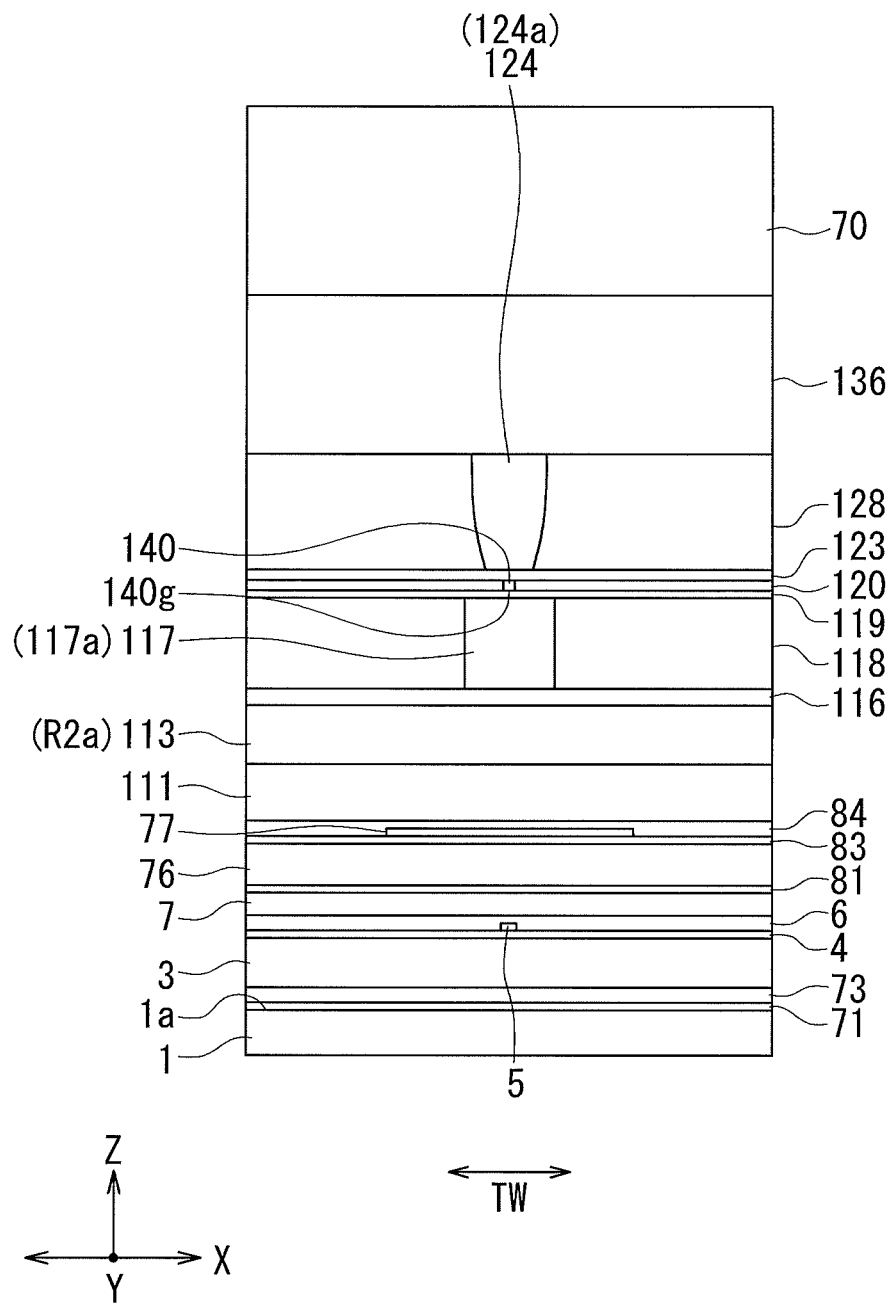
FIG. 35 is a front view showing the medium facing surface of the magnetic head according to the fourth embodiment of the invention.
Figure 36:
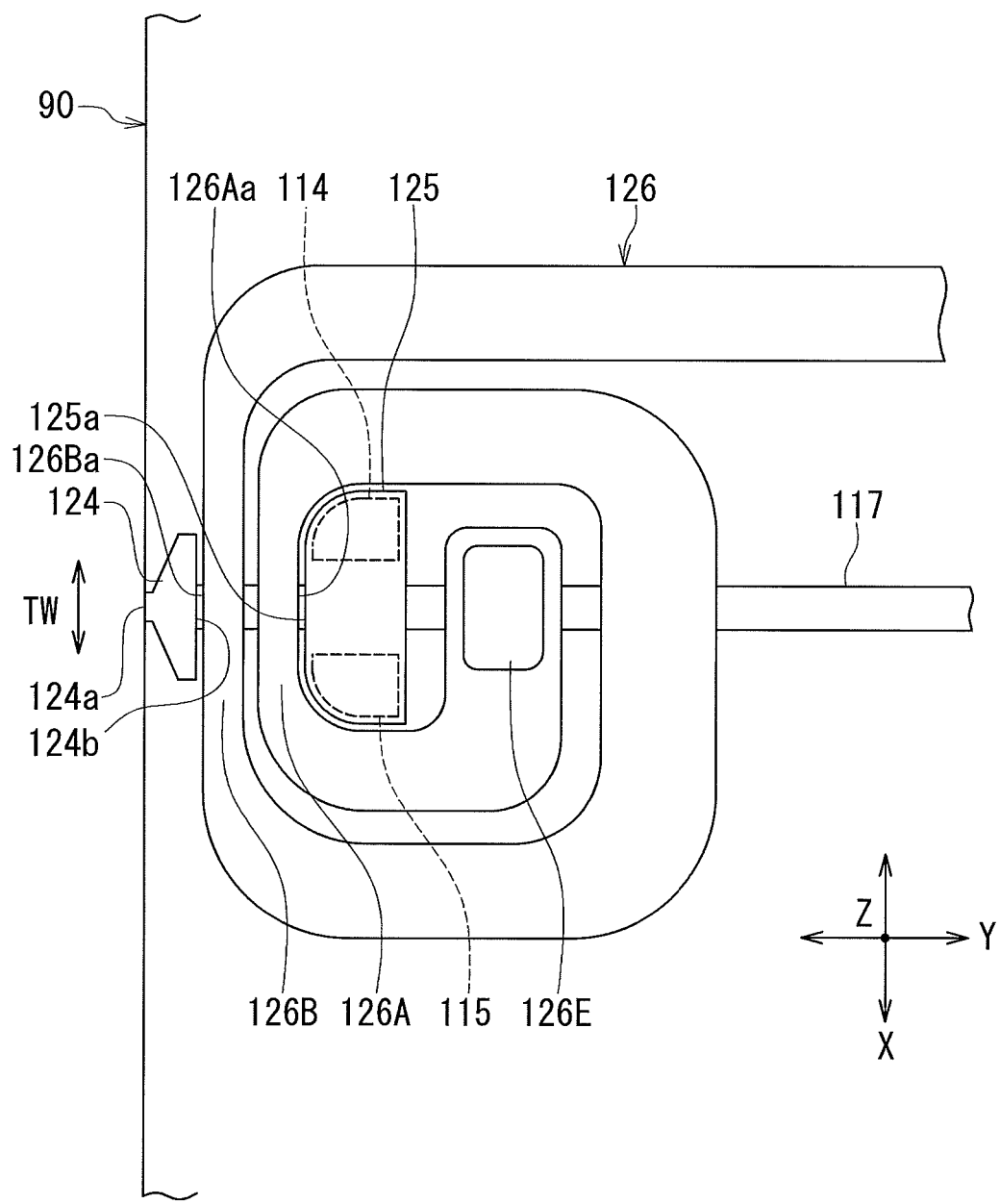
FIG. 36 is a plan view showing the first coil of the magnetic head according to the fourth embodiment of the invention.
Figure 37:
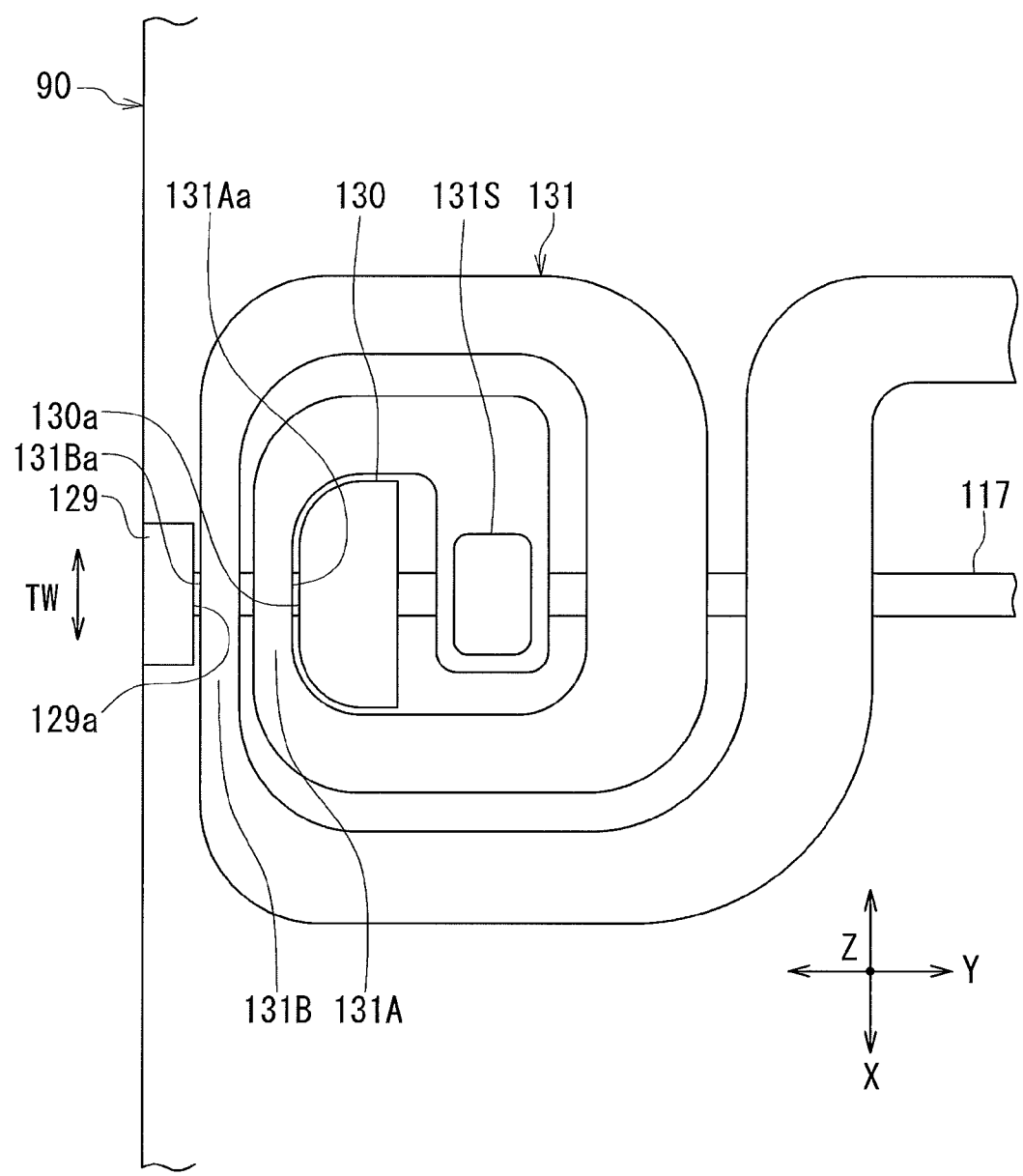
FIG. 37 is a plan view showing the second coil of the magnetic head according to the fourth embodiment of the invention.

A magnetic head according to a fourth embodiment of the invention will now be described with reference to FIG. 33 to FIG. 37. FIG. 33 is a cross-sectional view showing the write head unit of the magnetic head according to the present embodiment. FIG. 34 is a cross-sectional view showing the configuration of the magnetic head according to the present embodiment. The arrow labeled T on FIG. 34 indicates the direction of travel of the recording medium. FIG. 35 is a front view showing the medium facing surface of the magnetic head according to the present embodiment. FIG. 36 is a plan view showing the first coil of the magnetic head according to the present embodiment. FIG. 37 is a plan view showing the second coil of the magnetic head according to the present embodiment. The arrow labeled TW on each of FIG. 35 to FIG. 37 indicates the track width direction.

The magnetic head according to the present embodiment is for use in thermally-assisted magnetic recording. Thermally-assisted magnetic recording uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization.

The magnetic head according to the present embodiment includes a write head unit 192 in place of the write head unit 92 of the first embodiment. The write head unit 192 lies on the nonmagnetic layer 84. The write head unit 192 includes a first coil 126, a second coil 131, and a magnetic path forming section M2. In FIG. 34 and FIG. 36, the reference symbol 126E indicates a coil connection of the first coil 126 connected to the second coil 131. In FIG. 34 and FIG. 37, the reference symbol 131S indicates a coil connection of the second coil 131 connected to the coil connection 126E of the first coil 126.

The first and second coils 126 and 131 produce a magnetic field corresponding to data to be written on the recording medium 100. The magnetic path forming section M2 is formed of a magnetic material, and forms a magnetic path for passing a magnetic flux corresponding to the magnetic field produced by the first and second coils 126 and 131. In the present embodiment, the magnetic path forming section M2 includes a main pole 124 and a return path section R2. As shown in FIG. 33 and FIG. 35, the main pole 124 has a first end face 124a located in the medium facing surface 90. The return path section R2 has a second end face R2a located in the medium facing surface 90. As shown in FIG. 33 and FIG. 34, the return path section R2 is connected to the main pole 124. Since the main pole 124 and the return path section R2 are part of the magnetic path forming section M2, the magnetic path forming section M2 can be said to have the first end face 124a and the second end face R2a. The magnetic path forming section M2 produces, from the first end face 124a, a write magnetic field for writing data on the recording medium 100 by means of the perpendicular magnetic recording system. FIG. 33 and FIG. 34 show the main cross section, i.e., a cross section that intersects the first end face 124a and is perpendicular to the medium facing surface 90 and to the top surface 1a of the substrate 1.

The first coil 126, the second coil 131, the main pole 124 and the return path section R2 are formed of the same materials as the first coil 20, the second coil 10, the main pole 15 and the return path section R1 of the first embodiment, respectively.

The return path section R2 includes a shield layer 113, core portions 125 and 130, a yoke layer 111, coupling portions 114 and 115, and coupling layers 129 and 135. The shield layer 113 has the second end face R2a. The yoke layer 111 lies on the nonmagnetic layer 84. The write head unit 192 further includes an insulating layer 112 formed of an insulating material, lying on the nonmagnetic layer 84 and surrounding the yoke layer 111. The insulating layer 112 is formed of alumina, for example.

The shield layer 113 and the coupling portions 114 and 115 are all located on the yoke layer 111. Each of the coupling portions 114 and 115 includes a first layer, a second layer and a third layer. The first layer of the coupling portion 114 and the first layer of the coupling portion 115 are arranged adjacent to each other in the track width direction TW (the X direction).

The write head unit 192 further includes a waveguide. The waveguide includes a core 117 through which light propagates, and a cladding provided around the core 117. The cladding includes cladding layers 116, 118 and 119. The cladding layer 116 is disposed to cover the yoke layer 111, the insulating layer 112 and the shield layer 113. The core 117 lies on the cladding layer 116. The cladding layer 118 lies on the cladding layer 116 and surrounds the core 117. The cladding layer 119 lies on the core 117 and the cladding layer 118.

The core 117 is formed of a dielectric material that transmits laser light to be used for generating near-field light. The laser light emitted from a laser diode (not illustrated) enters the core 117 and propagates through the core 117. The cladding layers 116, 118 and 119 are formed of a dielectric material that has a refractive index lower than that of the core 117. For example, the core 117 may be formed of tantalum oxide such as $Ta_2O_5$ or silicon oxynitride (SiON), while the cladding layers 116, 118 and 119 may be formed of silicon oxide ($SiO_2$) or alumina.

The first layers of the coupling portions 114 and 115 are embedded in the cladding layer 116. The second layers of the coupling portions 114 and 115 are embedded in the cladding layer 118. The second layer of the coupling portion 114 and the second layer of the coupling portion 115 are located on opposite sides of the core 117 in the track width direction TW (the X direction) and are each spaced from the core 117.

The write head unit 192 further includes a plasmon generator 140 lying on the cladding layer 119 in the vicinity of the medium facing surface 90, and a dielectric layer 120 lying on the cladding layer 119 and surrounding the plasmon generator 140. The plasmon generator 140 is configured to excite surface plasmons on the principle to be described later. The plasmon generator 140 is formed of, for example, one of Au, Ag, Al, Cu, Pd, Pt, Rh and Ir, or of an alloy composed of two or more of these elements. The dielectric layer 120 is formed of the same material as the cladding layers 116, 118 and 119, for example.

The write head unit 192 further includes a dielectric layer 122 lying on the plasmon generator 140 and the dielectric layer 120, and a dielectric layer 123 disposed to cover the plasmon generator 140 and the dielectric layer 122. The dielectric layer 122 has an end face closest to the medium facing surface 90. The distance from the medium facing surface 90 to an arbitrary point on the aforementioned end face of the dielectric layer 122 decreases with decreasing distance from the arbitrary point to the top surface 1a of the substrate 1. The dielectric layer 122 is formed of the same material as the cladding layers 116, 118 and 119, for example. The dielectric layer 123 is formed of alumina, for example. The third layers of the coupling portions 114 and 115 are embedded in the cladding layer 119 and the dielectric layers 120, 122 and 123.

The main pole 124 is disposed on the dielectric layer 123 such that the plasmon generator 140 is interposed between the main pole 124 and the core 117. The main pole 124 includes a narrow portion having the first end face 124a and an end opposite thereto, and a wide portion connected to the end of the narrow portion. The wide portion is greater than the narrow portion in width in the track width direction TW (the X direction).

The core portion 125 lies on the coupling portions 114 and 115 and the dielectric layer 123. The core portion 125 is located away from the medium facing surface 90. The main pole 124 is spaced from the core portion 125 and lies between the core portion 125 and the medium facing surface 90.

As shown in FIG. 33, FIG. 34 and FIG. 36, the first coil 126 is wound approximately twice around the core portion 125. The write head unit 192 further includes: a first insulating film 127 formed of an insulating material, for insulating the first coil 126 from the main pole 124, the core portion 125 and the dielectric layer 123; and an insulating layer 128 formed of an insulating material and disposed around the main pole 124 and the first coil 126 and in the space between adjacent turns of the first coil 126. The first insulating film 127 and the insulating layer 128 are formed of alumina, for example.

The coupling layer 129 lies on the main pole 124. The coupling layer 129 has an end face facing toward the medium facing surface 90. The distance from the medium facing surface 90 to an arbitrary point on this end face decreases with decreasing distance from the arbitrary point to the top surface 1a of the substrate 1.

The core portion 130 lies on the core portion 125. The core portion 130 is located away from the medium facing surface 90. The coupling layer 129 is spaced from the core portion 130 and lies between the core portion 130 and the medium facing surface 90.

As shown in FIG. 33, FIG. 34 and FIG. 37, the second coil 131 is wound approximately twice around the core portion 130. The write head unit 192 further includes: a second insulating film 132 formed of an insulating material, for insulating the second coil 131 from the first coil 126, the coupling layer 129 and the core portion 130; an insulating layer 133 formed of an insulating material and disposed around the coupling layer 129 and the second coil 131 and in the space between adjacent turns of the second coil 131; and an insulating layer 134 formed of an insulating material and lying on the second coil 131 and the insulating layer 133. The second insulating film 132 and the insulating layers 133 and 134 are formed of alumina, for example.

The coupling layer 135 lies on the coupling layer 129, the core portion 130 and the insulating layer 134, and couples the coupling layer 129 and the core portion 130 to each other. The coupling layer 135 has an end face facing toward the medium facing surface 90. The distance from the medium facing surface 90 to an arbitrary point on this end face decreases with decreasing distance from the arbitrary point to the top surface 1a of the substrate 1. The end face of the coupling layer 135 is contiguous with the end face of the coupling layer 129.

The write head unit 192 further includes an insulating layer 136 disposed between the end face of the coupling layer 129 and the medium facing surface 90 and around the coupling layer 135. The insulating layer 136 is formed of alumina, for example.

The magnetic path forming section M2, the first coil 126 and the second coil 131 will now be described in detail with reference to FIG. 33, FIG. 36 and FIG. 37. Like the magnetic path forming section M1 of the first embodiment, the magnetic path forming section M2 includes a first magnetic material portion, a second magnetic material portion and a coupling portion which are provided in a first set and a second set.

The first magnetic material portion and the second magnetic material portion in the first set are formed by the core portion 125 and the main pole 124, respectively. The coupling portion in the first set is constituted by the coupling layers 129 and 135 and the core portion 130. Hereinafter, the core portion 125 and the main pole 124 will also be referred to as the first magnetic material portion 125 and the second magnetic material portion 124, respectively.

The first magnetic material portion, the second magnetic material portion and the coupling portion in the second set are formed by the core portion 130, the coupling layer 129 and the coupling layer 135, respectively. Hereinafter, the core portion 130 and the coupling layer 129 will also be referred to as the first magnetic material portion 130 and the second magnetic material portion 129, respectively.

In the present embodiment, since the core portion 130 and the coupling layers 129 and 135 are part of the return path section R2, the return path section R2 can be said to include the first magnetic material portion, the second magnetic material portion and the coupling portion in the second set.

Reference is now made to FIG. 33 and FIG. 36 to describe the configuration of the first coil 126 and the positional relationship of the first coil 126 with the first magnetic material portion 125, the second magnetic material portion 124 and the coupling portion in the first set. FIG. 36 is a plan view showing the first coil 126. The first coil 126 is wound approximately twice around the first magnetic material portion 125, which is part of the return path section R2. The first coil 126 includes a first coil element 126A and a second coil element 126B located between the first magnetic material portion 125 and the second magnetic material portion 124. The first and second coil elements 126A and 126B are adjacent to each other in the direction perpendicular to the medium facing surface 90 such that the second coil element 126B is located closer to the medium facing surface 90 than is the first coil element 126A. As shown in FIG. 33, the first and second coil elements 126A and 126B are located on the rear side in the direction T of travel of the recording medium 100 relative to the coupling portion (the coupling layers 129 and 135 and the core portion 130).

As shown in FIG. 33 and FIG. 36, the first magnetic material portion 125 has a first sidewall 125a facing toward the first and second coil elements 126A and 126B of the first coil 126. The second magnetic material portion 124 has a second sidewall 124b facing toward the first and second coil elements 126A and 126B of the first coil 126. The first coil element 126A has a first side surface 126Aa opposed to the first sidewall 125a. The second coil element 126B has a second side surface 126Ba opposed to the second sidewall 124b.

As shown in FIG. 33, the first insulating film 127 includes a first interposition portion 127A interposed between the first sidewall 125a and the first side surface 126Aa, a second interposition portion 127B interposed between the second sidewall 125b and the second side surface 126Ba, and an underlying portion 127C contiguous with the first and second interposition portions 127A and 127B. The first and second coil elements 126A and 126B are located on the underlying portion 127C.

The minimum distance between the first sidewall 125a and the first side surface 126Aa and the minimum distance between the second sidewall 125b and the second side surface 126Ba both fall within the range of 50 to 200 nm, for example. The minimum distance between the first sidewall 125a and the first side surface 126Aa is equal to the thickness of the first interposition portion 127A. The minimum distance between the second sidewall 125b and the second side surface 126Ba is equal to the thickness of the second interposition portion 127B. The minimum distance between the first magnetic material portion 125 and the medium facing surface 90 falls within the range of 1.4 to 4.0 µm, for example.

Reference is now made to FIG. 33 and FIG. 37 to describe the configuration of the second coil 131 and the positional relationship of the second coil 131 with the first magnetic material portion 130, the second magnetic material portion 129 and the coupling portion in the second set. FIG. 37 is a plan view showing the second coil 131. The second coil 131 is wound approximately twice around the first magnetic material portion 130, which is part of the return path section R2. The second coil 131 includes a first coil element 131A and a second coil element 131B located between the first magnetic material portion 130 and the second magnetic material portion 129. The first and second coil elements 131A and 131B are adjacent to each other in the direction perpendicular to the medium facing surface 90 such that the second coil element 131B is located closer to the medium facing surface 90 than is the first coil element 131A. As shown in FIG. 33, the first and second coil elements 131A and 131B are located on the rear side in the direction T of travel of the recording medium 100 relative to the coupling portion (the coupling layer 135).

As shown in FIG. 33 and FIG. 37, the first magnetic material portion 130 has a first sidewall 130a facing toward the first and second coil elements 131A and 131B of the second coil 131. The second magnetic material portion 129 has a second sidewall 129a facing toward the first and second coil elements 131A and 131B of the second coil 131. The first coil element 131A has a first side surface 131Aa opposed to the first sidewall 130a. The second coil element 131B has a second side surface 131Ba opposed to the second sidewall 129a.

As shown in FIG. 33, the second insulating film 132 includes a first interposition portion 132A interposed between the first sidewall 130a and the first side surface 131Aa, a second interposition portion 132B interposed between the second sidewall 129a and the second side surface 131Ba, and an underlying portion 132C contiguous with the first and second interposition portions 132A and 132B. The first and second coil elements 131A and 131B are located on the underlying portion 132C.

The minimum distance between the first sidewall 130a and the first side surface 131Aa and the minimum distance between the second sidewall 129a and the second side surface 131Ba both fall within the range of 50 to 200 nm, for example. The minimum distance between the first sidewall 130a and the first side surface 131Aa is equal to the thickness of the first interposition portion 132A. The minimum distance between the second sidewall 129a and the second side surface 131Ba is equal to the thickness of the second interposition portion 132B. The minimum distance between the first magnetic material portion 130 and the medium facing surface 90 falls within the range of 1.4 to 4.0 μm, for example.

Now, the internal structural features of the coils 126 and 131 and the interconnection between the coils 126 and 131 will be described. As shown in FIG. 33, the first coil 126 includes a seed layer 1261 formed of a conductive material, and a main portion 1262 formed of a conductive material and lying on the seed layer 1261. The seed layer 1261 is used as a seed and a cathode when forming by plating a conductive layer for forming the first coil 126 (particularly the main portion 1262). The second coil 131 includes a seed layer 1311 formed of a conductive material, and a main portion 1312 formed of a conductive material and lying on the seed layer 1311. The seed layer 1311 is used as a seed and a cathode when forming by plating a conductive layer for forming the second coil 131 (particularly the main portion 1312). Note that FIG. 34 omits the illustration of the seed layers 1261 and 1311.

The coil connection 131S of the second coil 131 penetrates the second insulating film 132 and is electrically connected to the coil connection 126E of the first coil 126. In the example shown in FIG. 34, FIG. 36 and FIG. 37, the first coil 126 and the second coil 131 are connected in series.

An example of the shape of each of the core 117 and the plasmon generator 140 will now be described with reference to FIG. 33 to FIG. 35. The core 117 has an end face 117a closer to the medium facing surface 90, an evanescent light generating surface 117e serving as a top surface, a bottom surface 117c, and two side surfaces. The end face 117a may be located in the medium facing surface 90 or at a distance from the medium facing surface 90. FIG. 33 to FIG. 35 show an example in which the end face 117a is located in the medium facing surface 90. The evanescent light generating surface 117e generates evanescent light based on the light propagating through the core 117.

As shown in FIG. 33, the plasmon generator 140 has a plasmon exciting portion 140a serving as a bottom surface, a top surface 140b, a front end face 140c located in the medium facing surface 90, and a rear end face 140d opposite to the front end face 140c. The plasmon exciting portion 140a is located at a predetermined distance from the evanescent light generating surface 117e of the core 117 and faces the evanescent light generating surface 117e. The cladding layer 119 is interposed between the evanescent light generating surface 117e and the plasmon exciting portion 140a. The top surface 140b includes an inclined portion and a flat portion, the inclined portion being located closer to the medium facing surface 90 than the flat portion. The distance from the top surface 1a of the substrate 1 to an arbitrary point on the inclined portion increases with increasing distance from the arbitrary point to the medium facing surface 90. The flat portion extends in a direction substantially perpendicular to the medium facing surface 90. For example, the plasmon generator 140 is rectangular in cross section parallel to the medium facing surface 90.

The front end face 140c has a near-field light generating portion 140g located at the front extremity of the plasmon exciting portion 140a. The near-field light generating portion 140g is located between the first end face 124a of the main pole 124 and the second end face R2a of the return path section R2. The near-field light generating portion 140g generates near-field light on the principle to be described later.

Although not illustrated, the plasmon generator 140 may include a narrow portion located in the vicinity of the medium facing surface 90, and a wide portion that is located farther from the medium facing surface 90 than is the narrow portion. The narrow portion has a front end face located in the medium facing surface 90. The front end face of the narrow portion also serves as the front end face 140c of the plasmon generator 140. The width of the narrow portion in the X direction, i.e., the direction parallel to the medium facing surface 90 and to the top surface 1a of the substrate 1, may be constant regardless of distance from the medium facing surface 90 or may decrease with increasing proximity to the medium facing surface 90. The wide portion is located on a side of the narrow portion farther from the front end face 140c and is coupled to the narrow portion. The width of the wide portion is the same as that of the narrow portion at the boundary between the narrow portion and the wide portion, and increases with increasing distance from the narrow portion.

The width (the dimension in the track width direction TW) of the front end face 140c is defined by the width of the narrow portion in the medium facing surface 90. The width of the front end face 140c falls within the range of 5 to 40 nm, for example. The height (the dimension in the Z direction) of the front end face 140c is defined by the height of the narrow portion in the medium facing surface 90. The height of the front end face 140c falls within the range of 5 to 40 nm, for example.

Now, the principle of generation of near-field light in the present embodiment and the principle of thermally-assisted magnetic recording using near-field light will be described in detail. Laser light emitted from a laser diode (not illustrated) enters the core 117. As shown in FIG. 34, the laser light 150 propagates through the core 117 toward the medium facing surface 90, and reaches the vicinity of the plasmon generator 140. The evanescent light generating surface 117e of the core 117 generates evanescent light based on the laser light 150 propagating through the core 117. More specifically, the laser light 150 is totally reflected at the evanescent light generating surface 117e, and the evanescent light generating surface 117e thereby generates evanescent light that permeates into the cladding layer 119. In the plasmon generator 140, surface plasmons are excited on the plasmon exciting portion 140a through coupling with the aforementioned evanescent light. The surface plasmons propagate to the near-field light generating portion 140g, and the near-field light generating portion 140g generates near-field light based on the surface plasmons.

The near-field light generated from the near-field light generating portion 140g is projected toward the recording medium 100, reaches the surface of the recording medium 100 and heats a part of the magnetic recording layer of the recording medium 100. This lowers the coercivity of the part of the magnetic recording layer. In thermally-assisted magnetic recording, the part of the magnetic recording layer with the lowered coercivity is subjected to a write magnetic field produced by the main pole 124 for data writing.

A method of manufacturing the magnetic head according to the present embodiment will now be described briefly. According to the present embodiment, like the first embodiment, the portions from the insulating layer 71 to the nonmagnetic layer 84 are formed in due order of succession on the top surface 1a of the substrate 1, and then the portions from the yoke layer 111 and the insulating layer 112 to the protective layer 70 are formed in due order of succession. The manufacturing method includes the steps of forming the magnetic path forming section M2, forming the first insulating film 127, forming the second insulating film 132, forming the first coil 126, and forming the second coil 131.

In the present embodiment, the first coil 126 and the second coil 131 are formed by the same method as the method of forming the first coil 20 or the method of forming the second coil 10 in the first embodiment. The second mask for use in the step of forming the first coil 126 and the second mask for use in the step of forming the second coil 131 may be formed by the same method as the method of forming the second mask 105 in the second embodiment.

The remainder of configuration, function and effects of the present embodiment are similar to those of the first or second embodiment.

The present invention is not limited to the foregoing embodiments, and various modifications may be made thereto. For example, as far as the requirements of the appended claims are met, the shapes and locations of the first magnetic material portion, the second magnetic material portion, the first mask, the second mask, the seed layer and the conductive layer, and the number, shape(s) and location(s) of the coil element(s) are not limited to the respective examples illustrated in the foregoing embodiments, but can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a thin-film magnetic head, the thin-film magnetic head comprising:
    a medium facing surface configured to face a recording medium;
    a coil for producing a magnetic field corresponding to data to be written on the recording medium;
    a magnetic path forming section formed of a magnetic material, for forming a magnetic path for passing a magnetic flux corresponding to the magnetic field produced by the coil; and
    an insulating film for insulating the coil from the magnetic path forming section, wherein
    the magnetic path forming section has a first end face located in the medium facing surface, and produces, from the first end face, a write magnetic field for writing the data on the recording medium,
    the magnetic path forming section includes a first magnetic material portion located away from the medium facing surface, a second magnetic material portion spaced from the first magnetic material portion and located between the first magnetic material portion and the medium facing surface, and a coupling portion for coupling the first magnetic material portion and the second magnetic material portion to each other,
    the coil includes one or more coil elements located between the first magnetic material portion and the second magnetic material portion,
    the first magnetic material portion has a first sidewall facing toward the one or more coil elements,
    the second magnetic material portion has a second sidewall facing toward the one or more coil elements,
    the one or more coil elements have a first side surface opposed to the first sidewall, and a second side surface opposed to the second sidewall,
    the insulating film includes a first interposition portion interposed between the first sidewall and the first side surface, a second interposition portion interposed between the second sidewall and the second side surface, and an underlying portion contiguous with the first and second interposition portions, and
    the one or more coil elements are located on the underlying portion,
    the method comprising the steps of:
    forming the magnetic path forming section;
    forming the insulating film; and
    forming the coil, wherein
    the step of forming the magnetic path forming section includes the step of forming the first and second magnetic material portions such that the first sidewall and the second sidewall face each other,
    the step of forming the insulating film forms the insulating film such that the first interposition portion and the second interposition portion face each other, the step of forming the insulating film being performed after the step of forming the first and second magnetic material portions, and
    the step of forming the coil includes the steps of:
        forming a first mask after the step of forming the insulating film, the first mask covering the first and second magnetic material portions and exposing at least part of the underlying portion of the insulating film, the first mask including a first coating portion and a second coating portion, the first coating portion covering the first interposition portion, the second coating portion covering the second interposition portion;

forming a seed layer of a conductive material selectively on the underlying portion by using the first mask, the seed layer comprising unwanted portions and having two opposing sidewalls, one of the two opposing sidewalls directly faces the first interposition portion, the other directly faces the second interposition portion;

removing the first mask after the step of forming the seed layer, thereby removing the first and second coating portions to create a first gap between the seed layer and the first interposition portion and a second gap between the seed layer and the second interposition portion;

forming a second mask after the step of removing the first mask, the second mask having an opening intended to receive a conductive layer for forming the coil;

forming the conductive layer by plating using the seed layer such that the conductive layer is received in the opening of the second mask;

removing the second mask after the step of forming the conductive layer; and removing the unwanted portions of the seed layer after the step of removing the second mask, the unwanted portions being portions of the seed layer other than a portion lying under the conductive layer.

2. The method of manufacturing the thin-film magnetic head according to claim 1, wherein the coil is wound around the first magnetic material portion.

3. The method of manufacturing the thin-film magnetic head according to claim 1, wherein the one or more coil elements are a plurality of coil elements including a first coil element and a second coil element, the first coil element has the first side surface, and the second coil element has the second side surface.

4. The method of manufacturing the thin-film magnetic head according to claim 1, wherein the magnetic path forming section includes a main pole and a return path section, the main pole having the first end face, the return path section being connected to the main pole and having a second end face located in the medium facing surface, and the return path section includes the first magnetic material portion and the coupling portion.

5. The method of manufacturing the thin-film magnetic head according to claim 4, wherein the return path section further includes the second magnetic material portion.

6. The method of manufacturing the thin-film magnetic head according to claim 1, wherein the step of forming the coil further includes, after the step of removing the unwanted portions of the seed layer, the step of forming an insulating layer for covering the conductive layer, and the step of polishing the insulating layer, the conductive layer, the first magnetic material portion and the second magnetic material portion to make their top surfaces even with each other.

7. The method of manufacturing the thin-film magnetic head according to claim 1, wherein the step of removing the unwanted portions of the seed layer removes the unwanted portions by ion beam etching.

* * * * *